Aug. 1, 1939.   C. W. GREEN   2,167,715
CASH REGISTER
Original Filed March 27, 1931   31 Sheets-Sheet 2

Inventor
Charles W. Green
By
His Attorney

Aug. 1, 1939.  C. W. GREEN  2,167,715

CASH REGISTER

Original Filed March 27, 1931   31 Sheets-Sheet 3

Inventor
Charles W. Green
By
His Attorney

Aug. 1, 1939.  C. W. GREEN  2,167,715
CASH REGISTER
Original Filed March 27, 1931    31 Sheets-Sheet 4

Aug. 1, 1939. C. W. GREEN 2,167,715
CASH REGISTER
Original Filed March 27, 1931 31 Sheets-Sheet 5

Inventor
Charles W. Green
By Kearl Benst
His Attorney

Aug. 1, 1939.　　　　　C. W. GREEN　　　　　2,167,715
CASH REGISTER
Original Filed March 27, 1931　　31 Sheets-Sheet 6

Inventor
Charles W. Green
By
　　Carl Benst
His Attorney

Aug. 1, 1939.                C. W. GREEN                2,167,715
                             CASH REGISTER
                Original Filed March 27, 1931    31 Sheets-Sheet 7
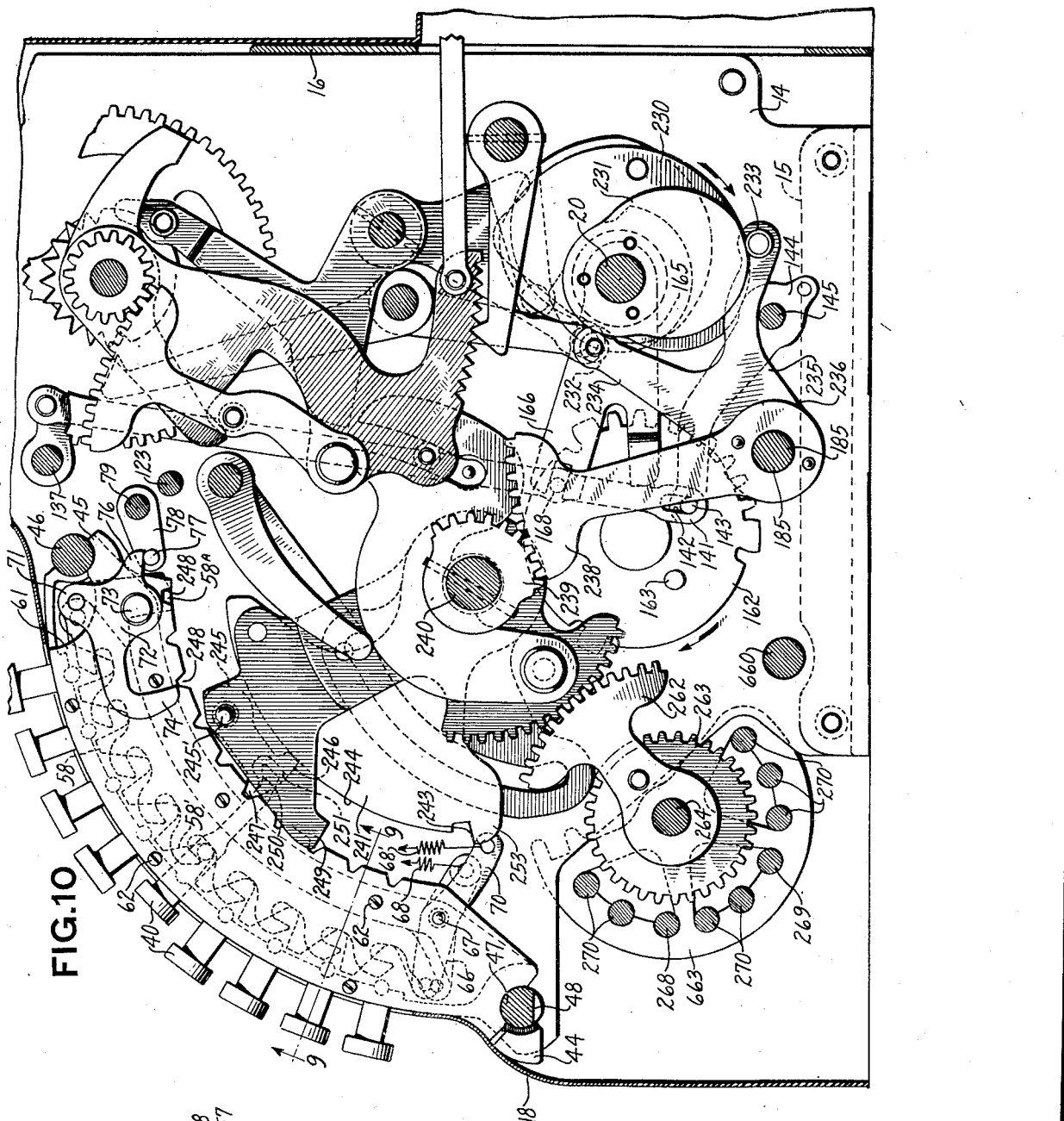
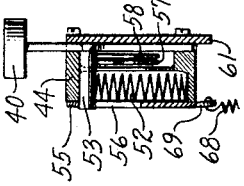
Inventor
Charles W. Green
By
*Earl Benst*
His Attorney Aug. 1, 1939. C. W. GREEN 2,167,715
CASH REGISTER
Original Filed March 27, 1931 31 Sheets-Sheet 8

Inventor
Charles W. Green
By Pearl Beust
His Attorney

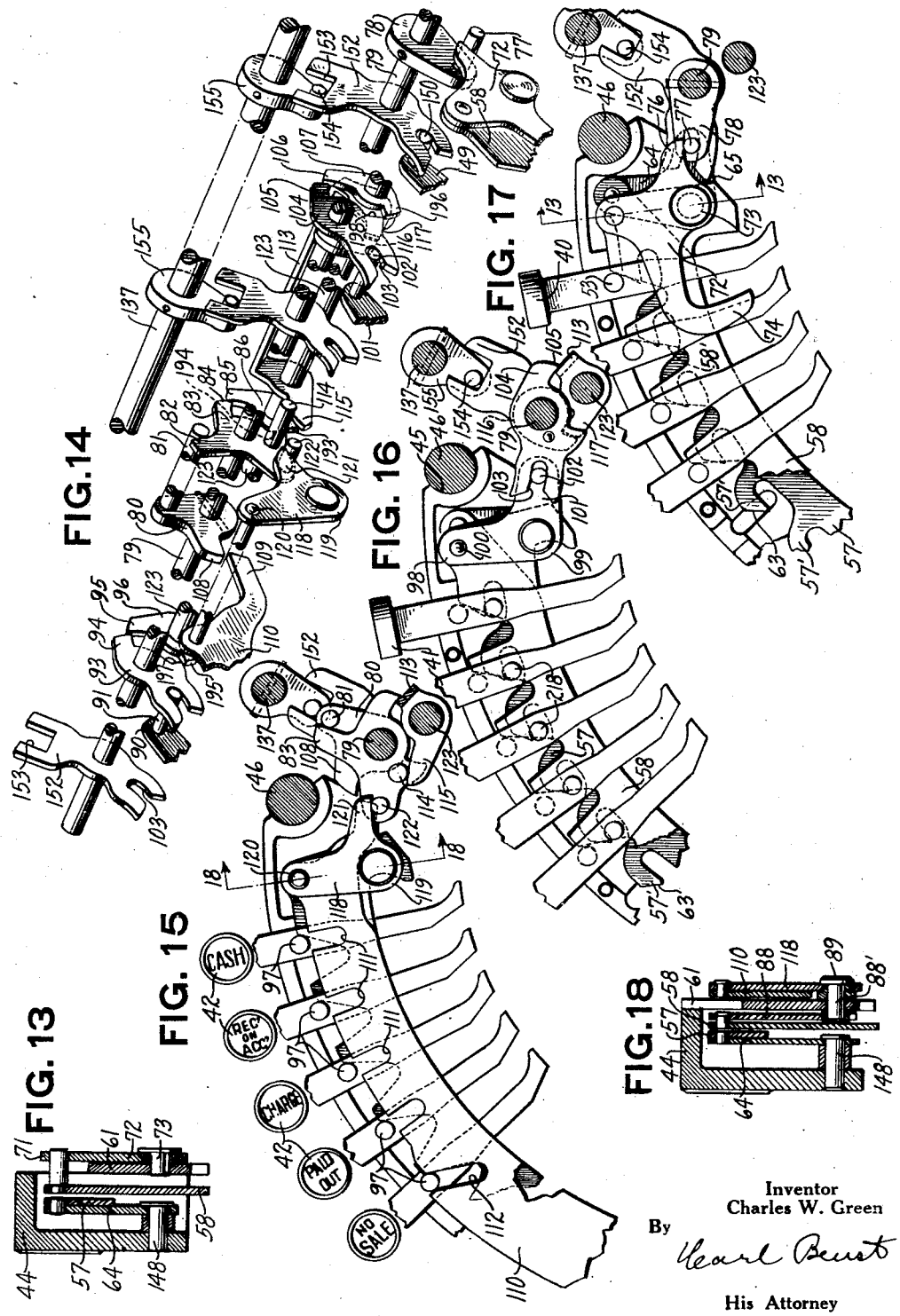

Aug. 1, 1939.   C. W. GREEN   2,167,715
CASH REGISTER
Original Filed March 27, 1931   31 Sheets-Sheet 11
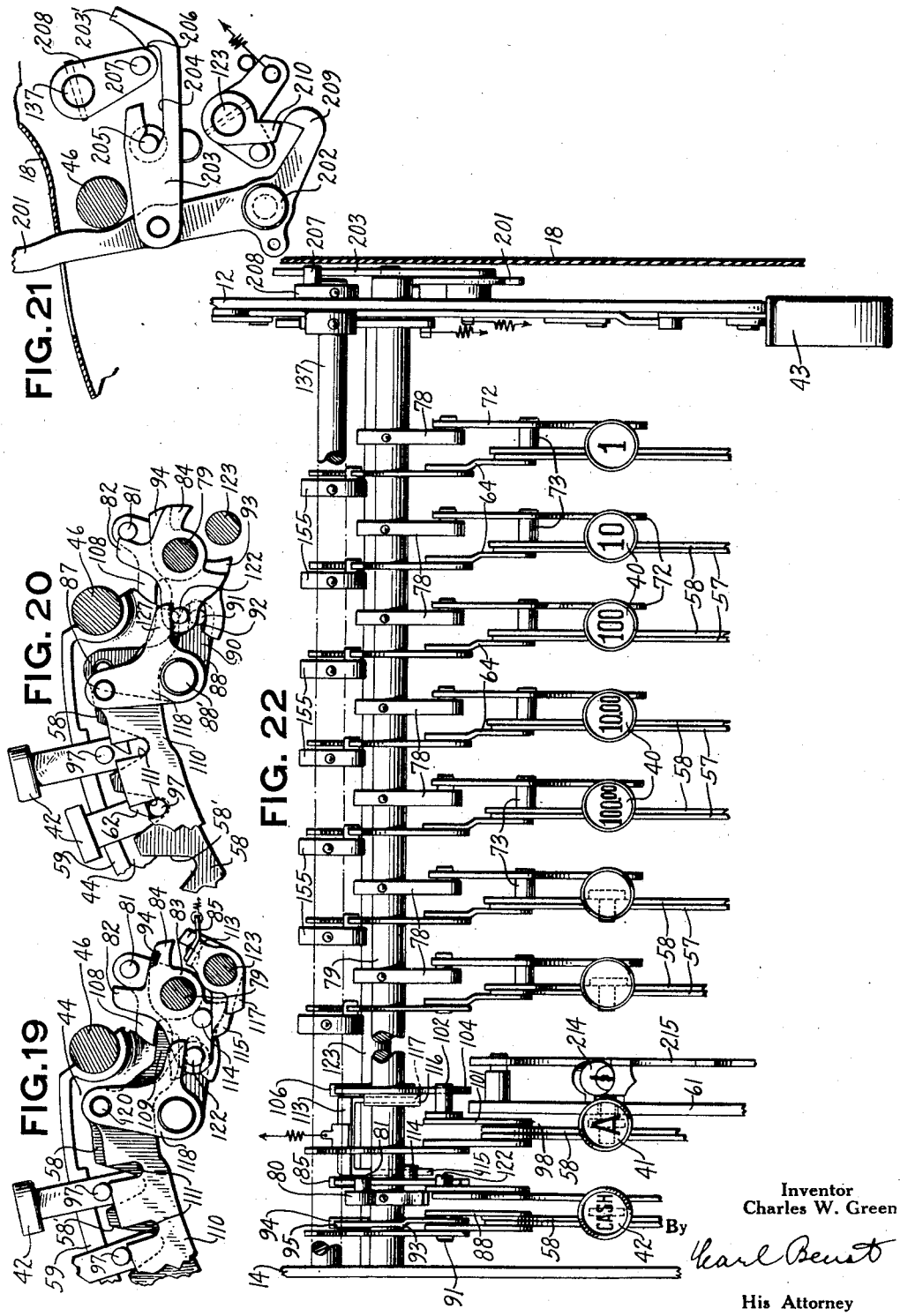
Inventor
Charles W. Green
By
Carl Benst
His Attorney Aug. 1, 1939.　　　　C. W. GREEN　　　　2,167,715
CASH REGISTER
Original Filed March 27, 1931　　　31 Sheets-Sheet 12
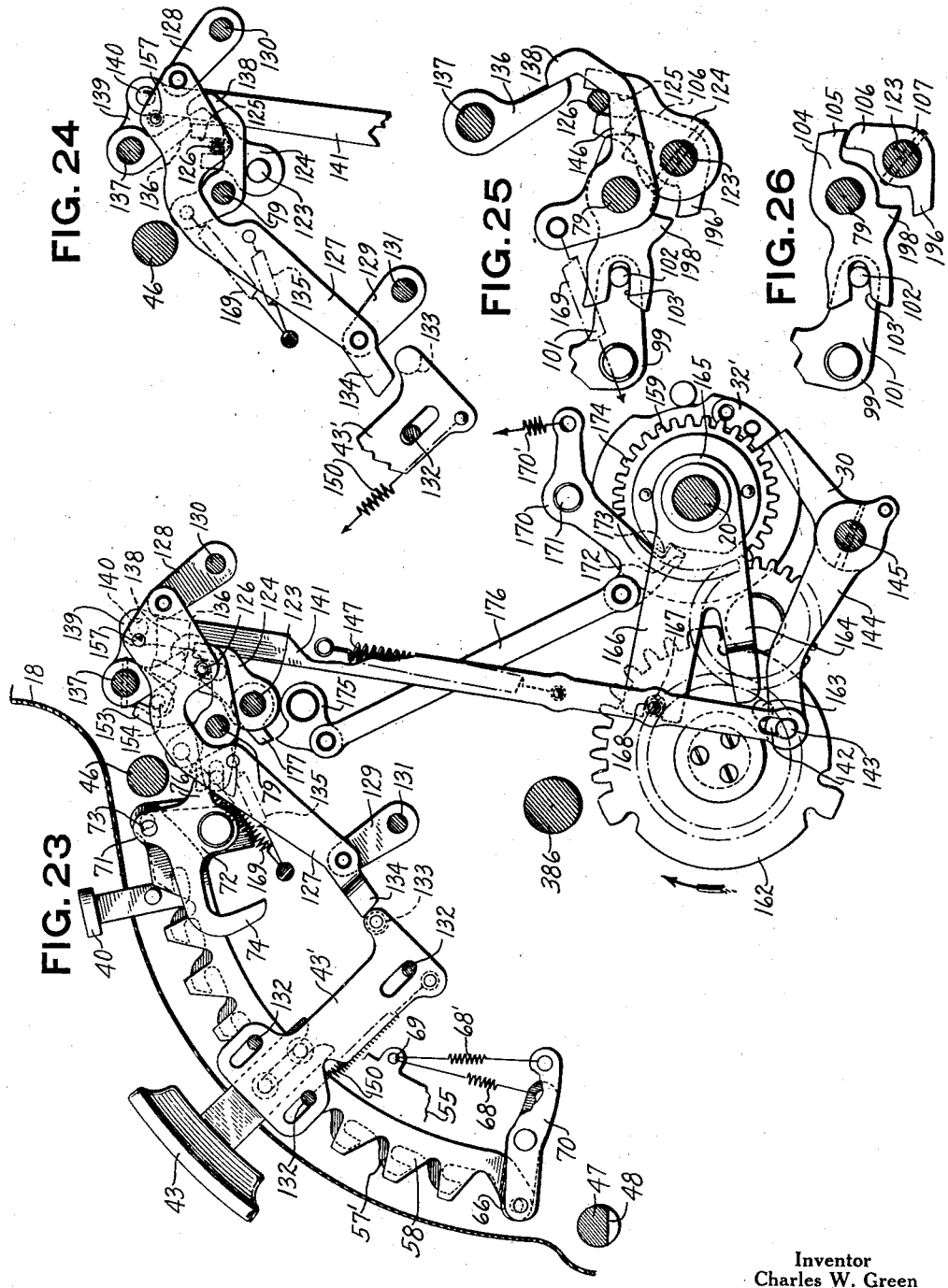
Inventor
Charles W. Green
By
His Attorney Aug. 1, 1939.   C. W. GREEN   2,167,715
CASH REGISTER
Original Filed March 27, 1931   31 Sheets-Sheet 13

Inventor
Charles W. Green
By Earl Benst
His Attorney

Aug. 1, 1939.  C. W. GREEN  2,167,715
CASH REGISTER
Original Filed March 27, 1931  31 Sheets-Sheet 14

Inventor
Charles W. Green
By
Kearl Beust
His Attorney

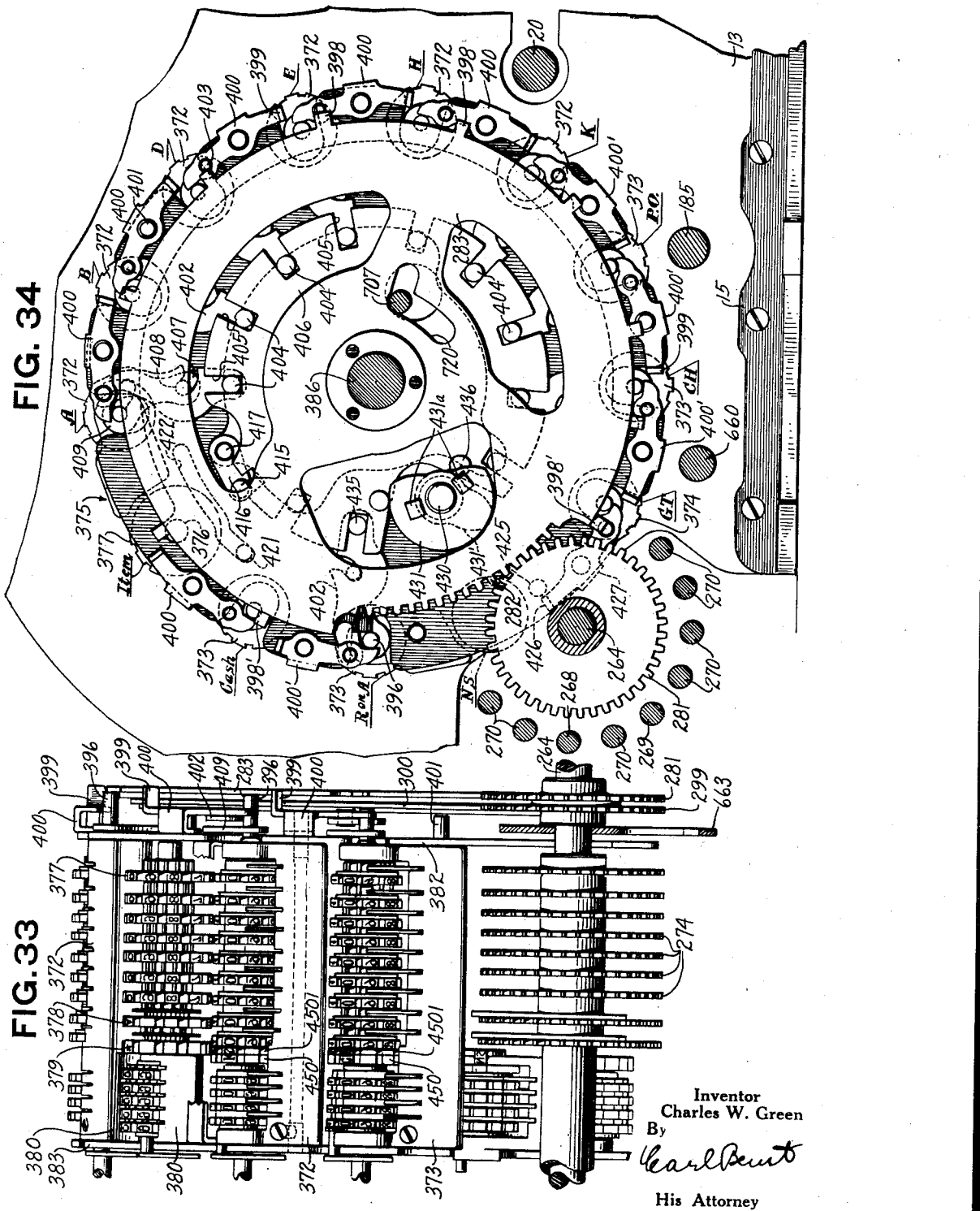

Aug. 1, 1939.  C. W. GREEN  2,167,715
CASH REGISTER
Original Filed March 27, 1931  31 Sheets-Sheet 16
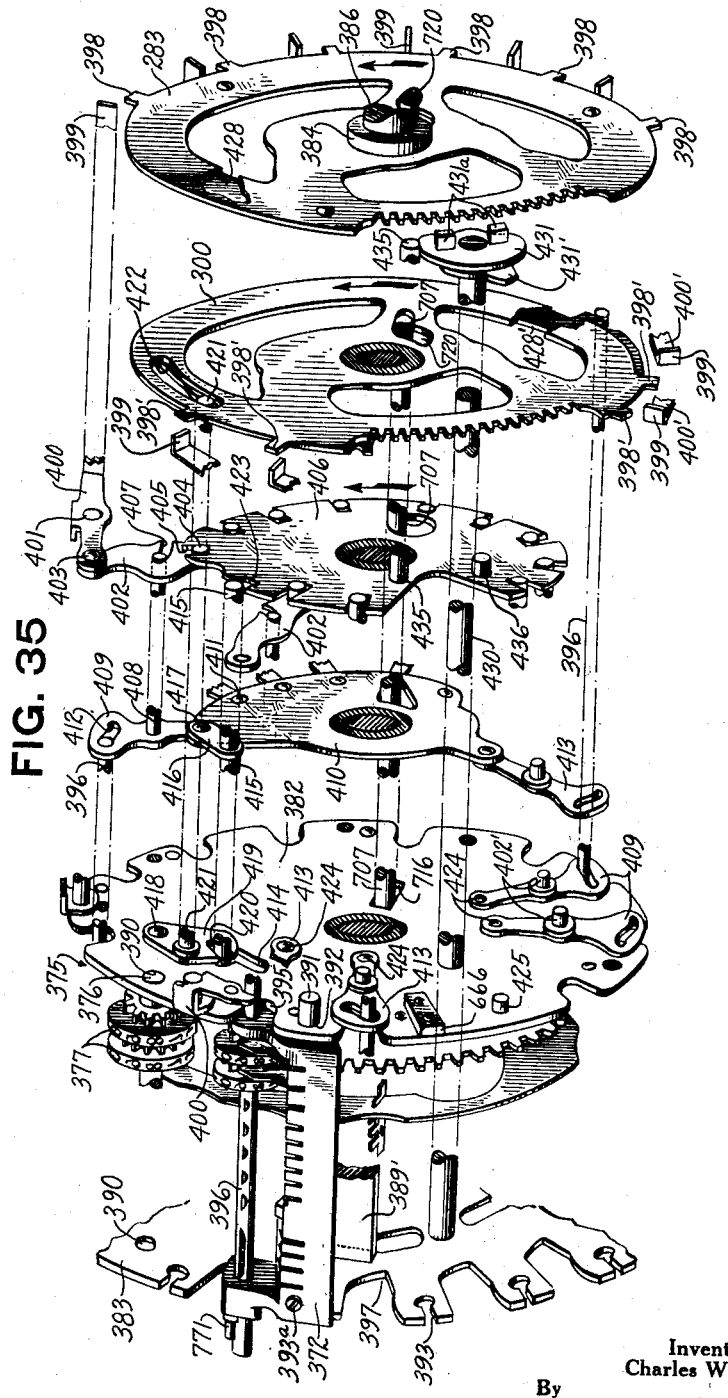
Inventor
Charles W. Green
By
Earl Beust
His Attorney Aug. 1, 1939.   C. W. GREEN   2,167,715
CASH REGISTER
Original Filed March 27, 1931   31 Sheets-Sheet 17

Inventor
Charles W. Green
By *Pearl Benst*
His Attorney

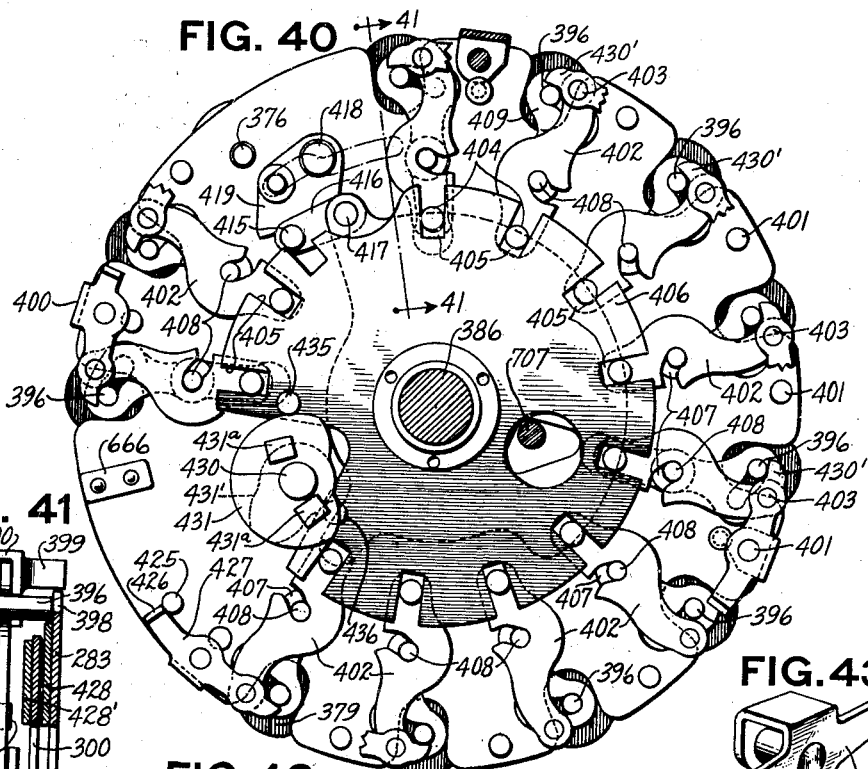
FIG. 40
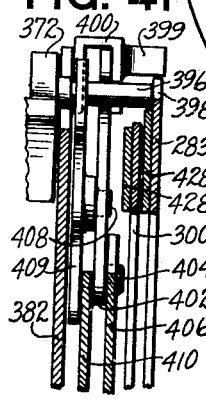
FIG. 41
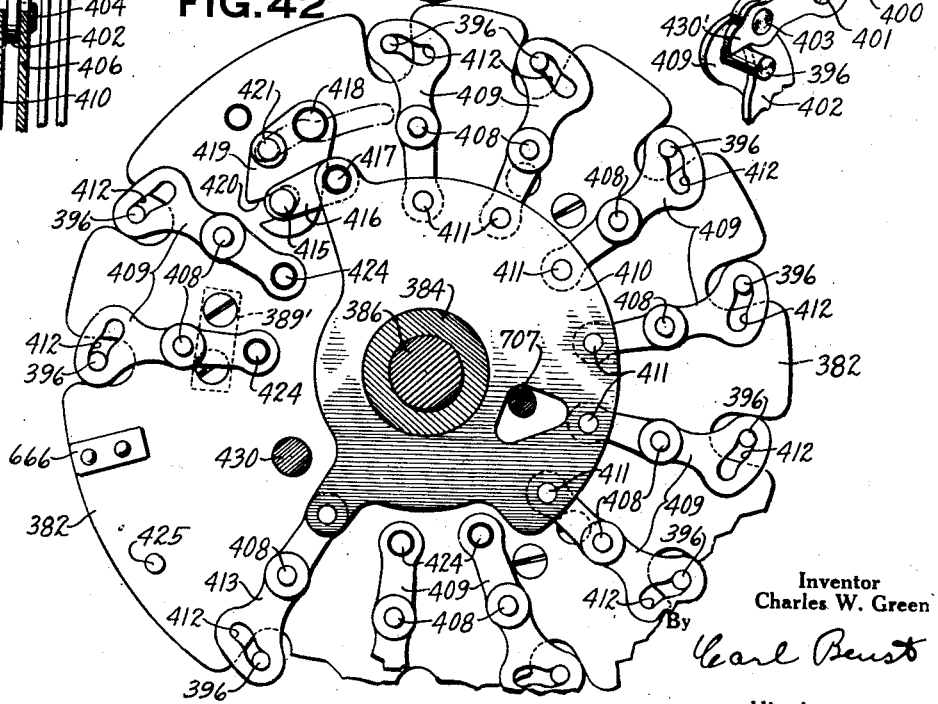
FIG. 42
FIG. 43
Inventor
Charles W. Green
By Carl Benst
His Attorney Aug. 1, 1939.  C. W. GREEN  2,167,715
CASH REGISTER
Original Filed March 27, 1931   31 Sheets-Sheet 19
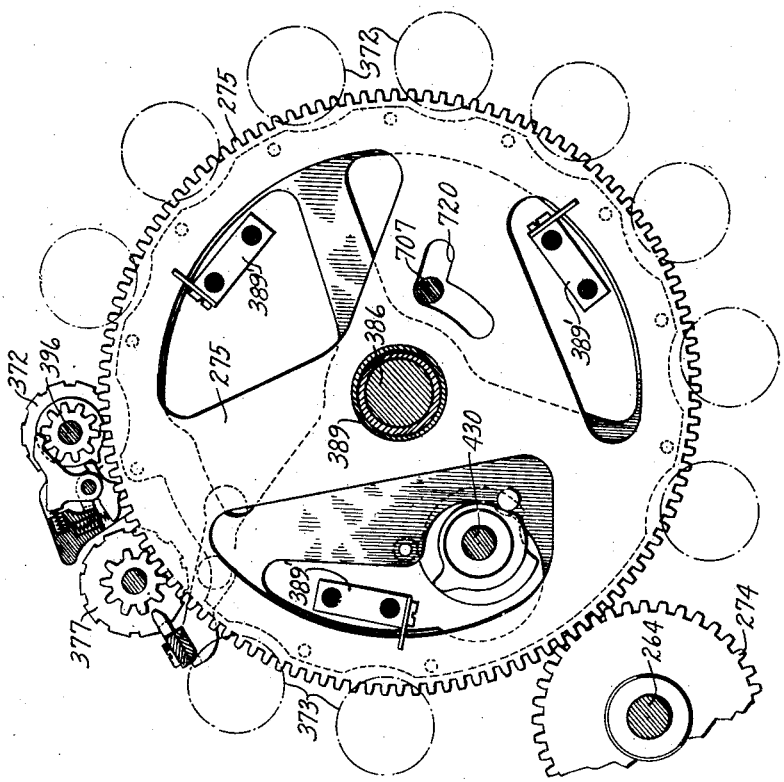
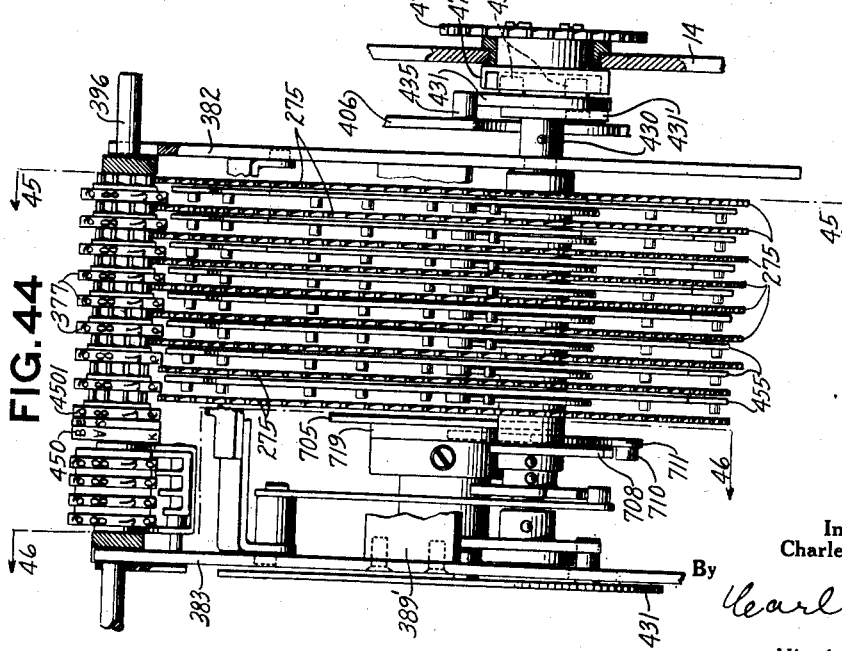
Inventor
Charles W. Green
By
His Attorney Aug. 1, 1939.  C. W. GREEN  2,167,715
CASH REGISTER
Original Filed March 27, 1931   31 Sheets-Sheet 20

Inventor
Charles W. Green
By
Earl Benst
His Attorney

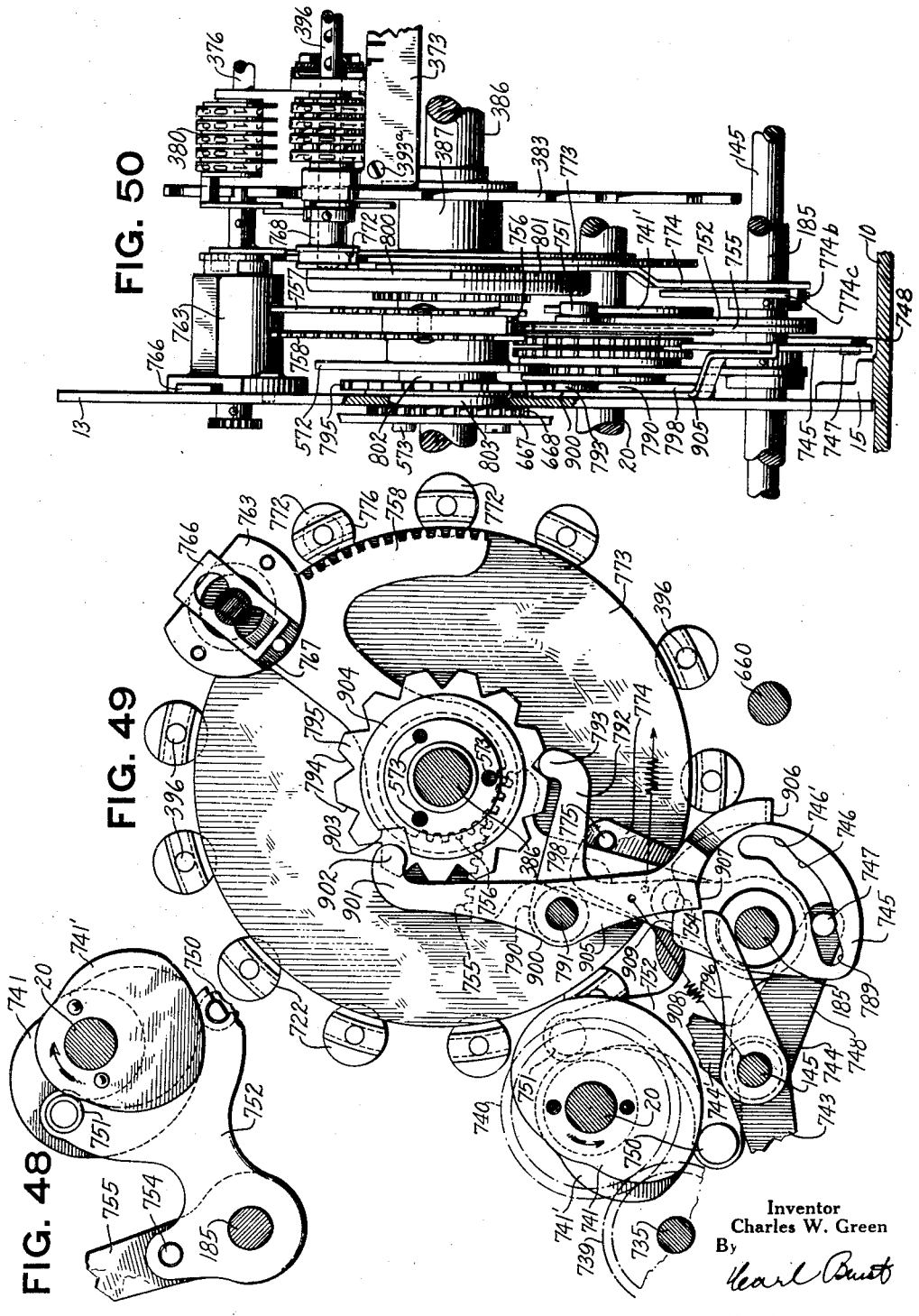

Aug. 1, 1939.  C. W. GREEN  2,167,715
CASH REGISTER
Original Filed March 27, 1931  31 Sheets-Sheet 22
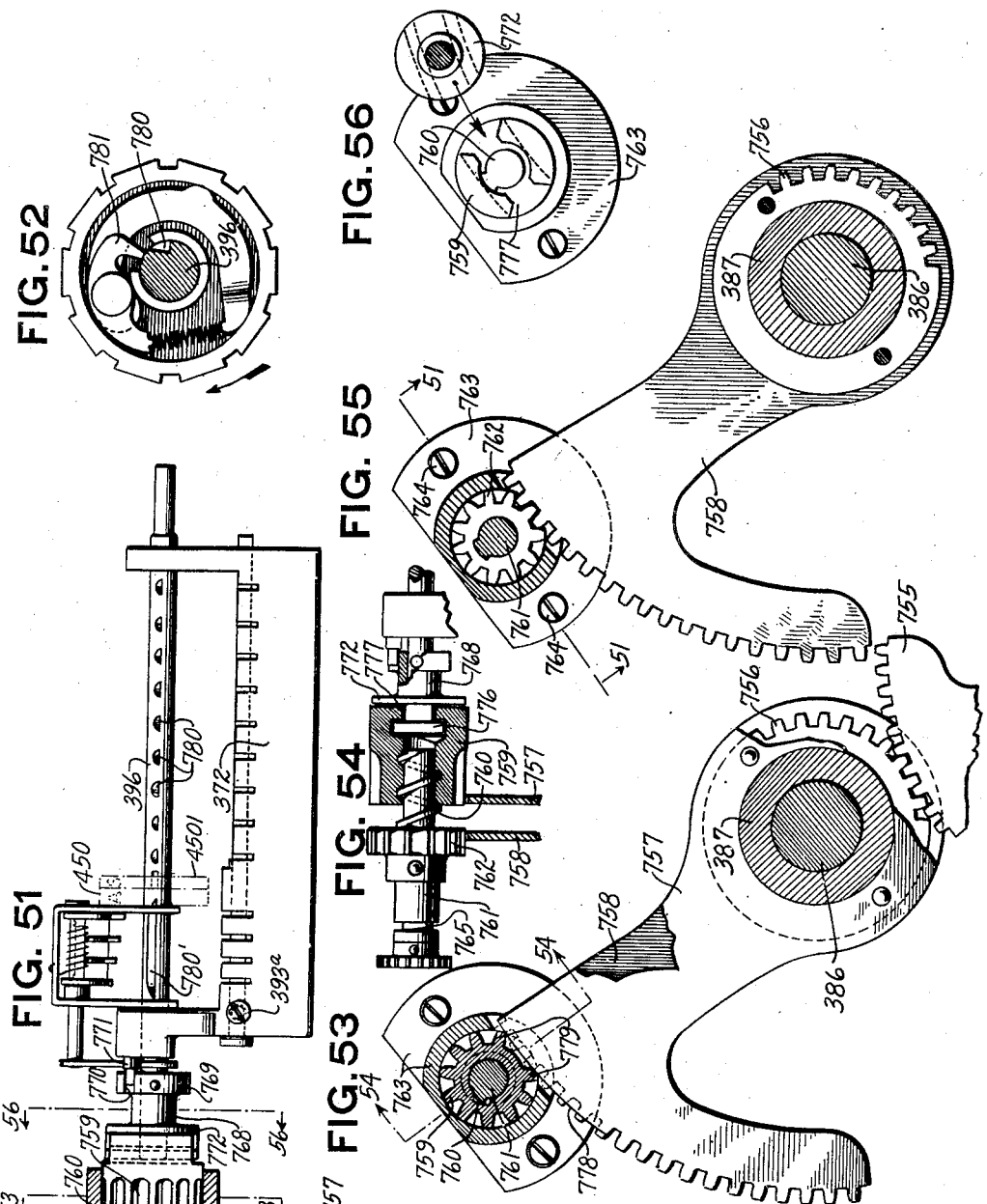
Inventor
Charles W. Green
By
*Earl Benst*
His Attorney Aug. 1, 1939.　　　　C. W. GREEN　　　2,167,715
CASH REGISTER
Original Filed March 27, 1931　　31 Sheets-Sheet 23

Inventor
Charles W. Green
By
His Attorney

Aug. 1, 1939.  C. W. GREEN  2,167,715
CASH REGISTER
Original Filed March 27, 1931   31 Sheets-Sheet 24
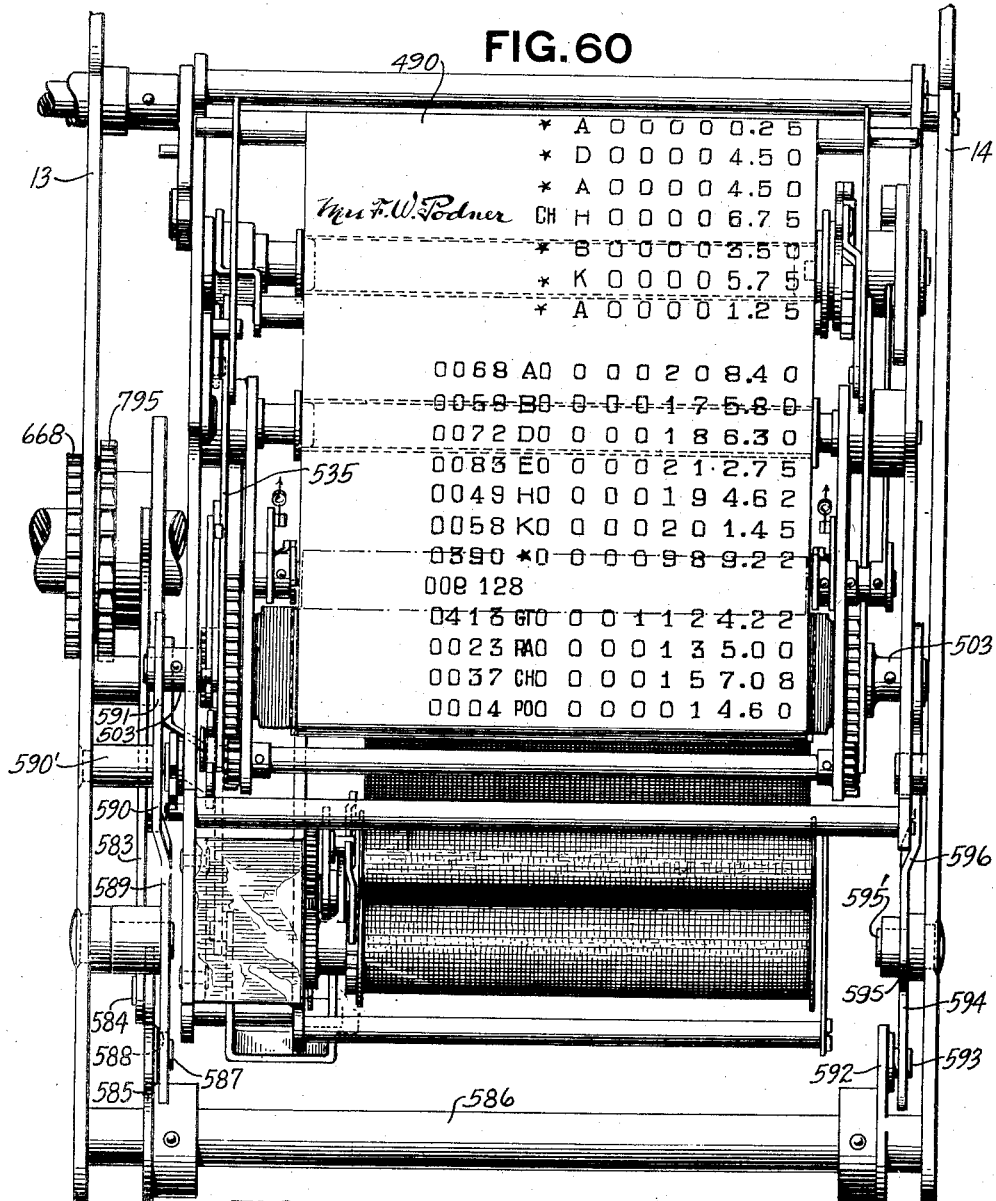
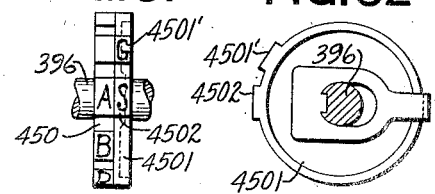
Inventor
Charles W. Green
By Earl Beust
His Attorney Aug. 1, 1939.
C. W. GREEN
2,167,715
CASH REGISTER
Original Filed March 27, 1931 31 Sheets-Sheet 25
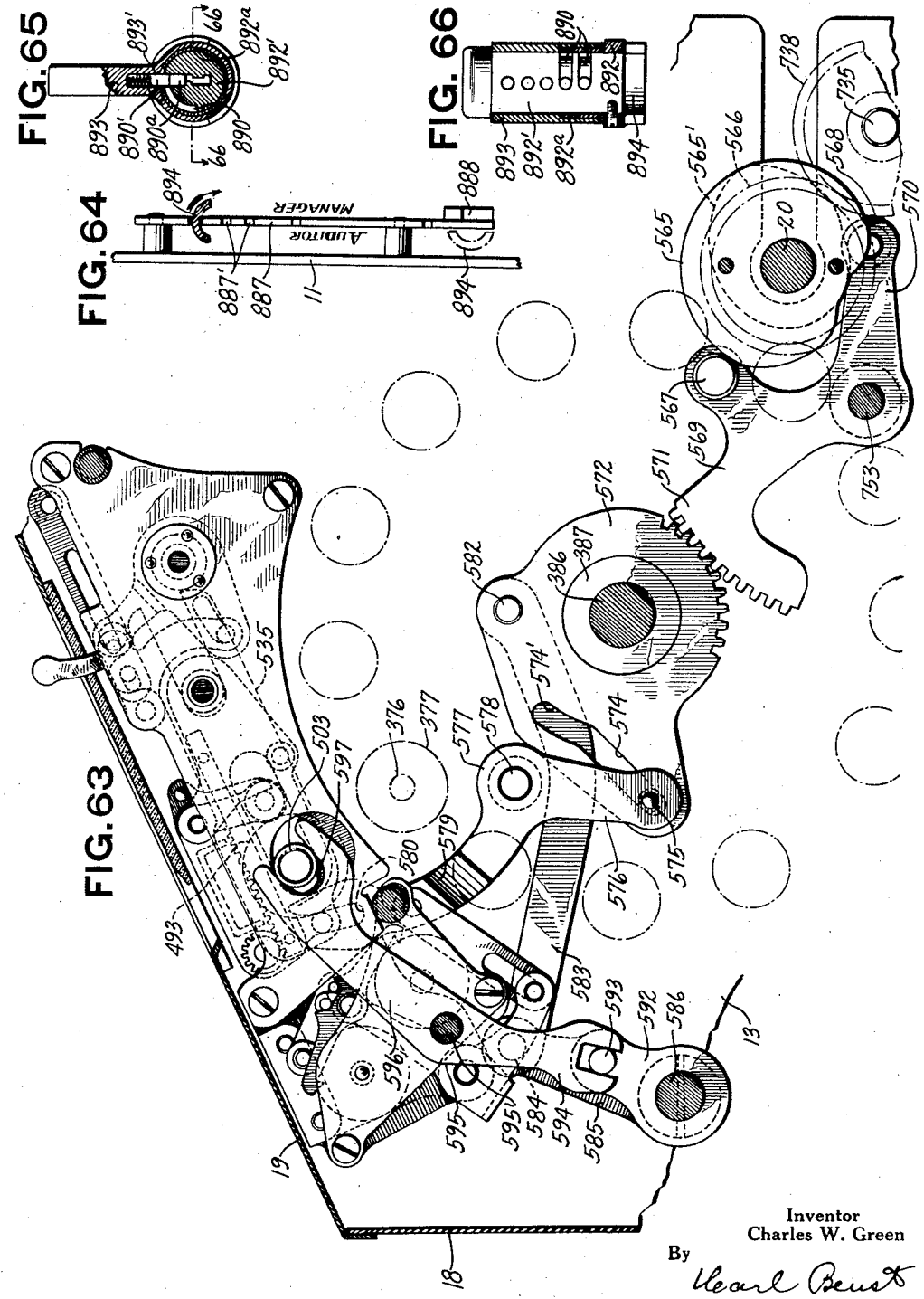
Inventor
Charles W. Green
By
Kearl Beust
His Attorney Aug. 1, 1939.                     C. W. GREEN                     2,167,715
CASH REGISTER
Original Filed March 27, 1931     31 Sheets—Sheet 26
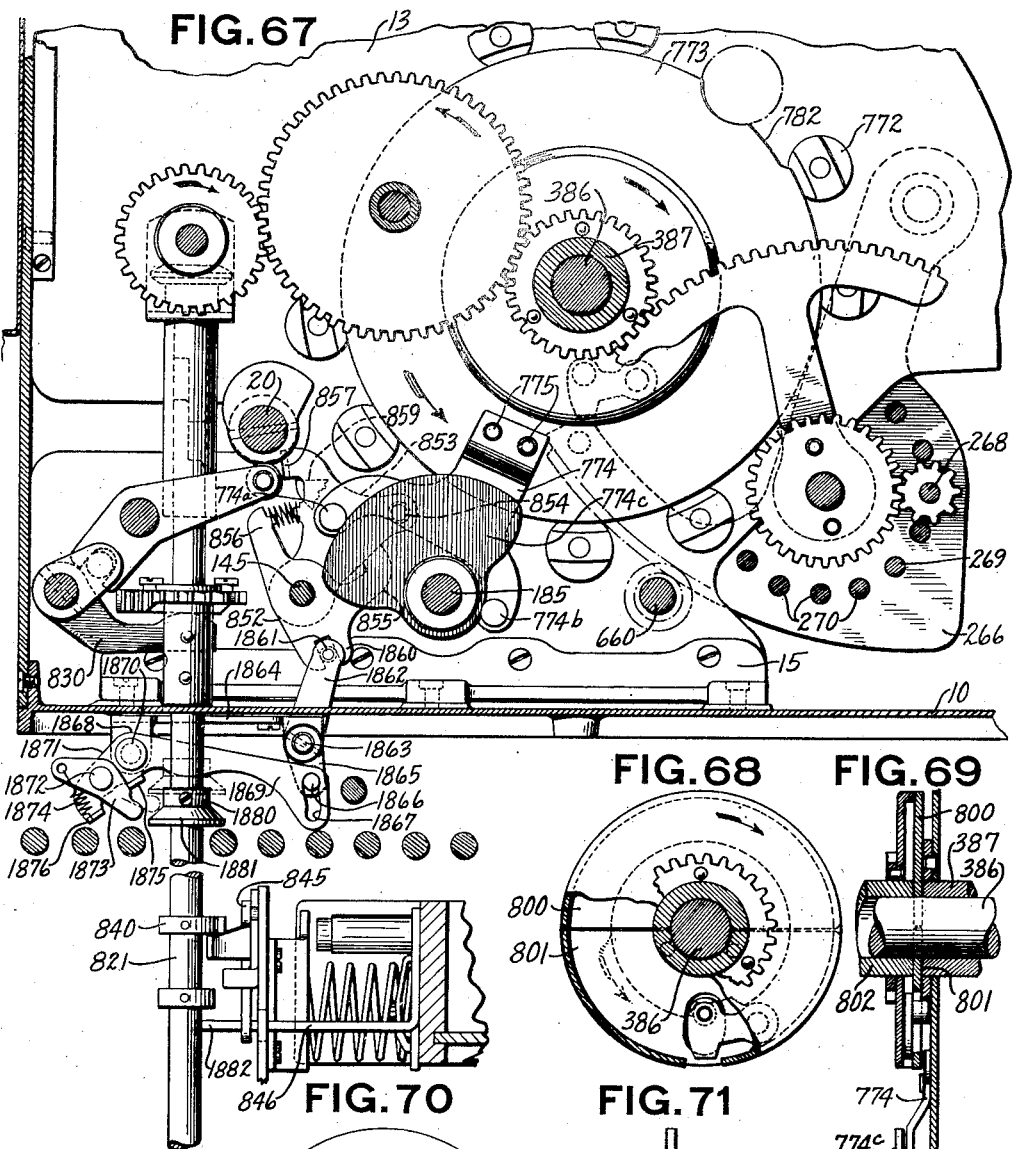
FIG. 67
FIG. 68   FIG. 69
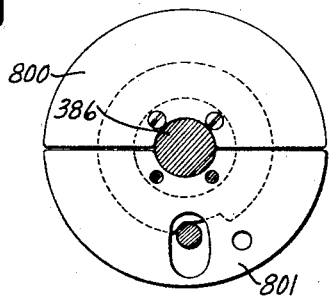
FIG. 70   FIG. 71
Inventor
Charles W. Green
By Carl Beust
His Attorney Aug. 1, 1939.   C. W. GREEN   2,167,715
CASH REGISTER
Original Filed March 27, 1931   31 Sheets-Sheet 27
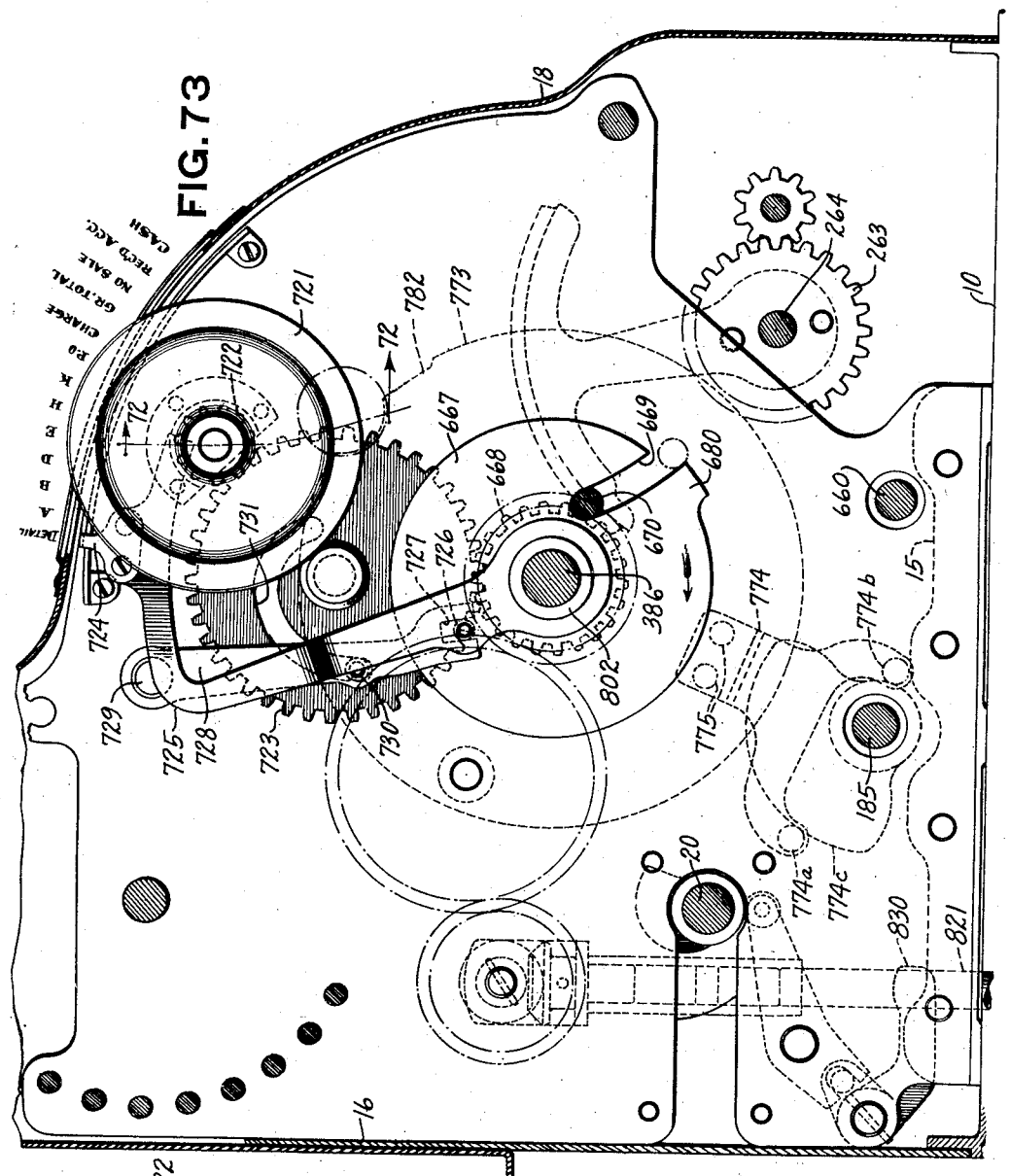
Inventor
Charles W. Green
By
Carl Benst
His Attorney

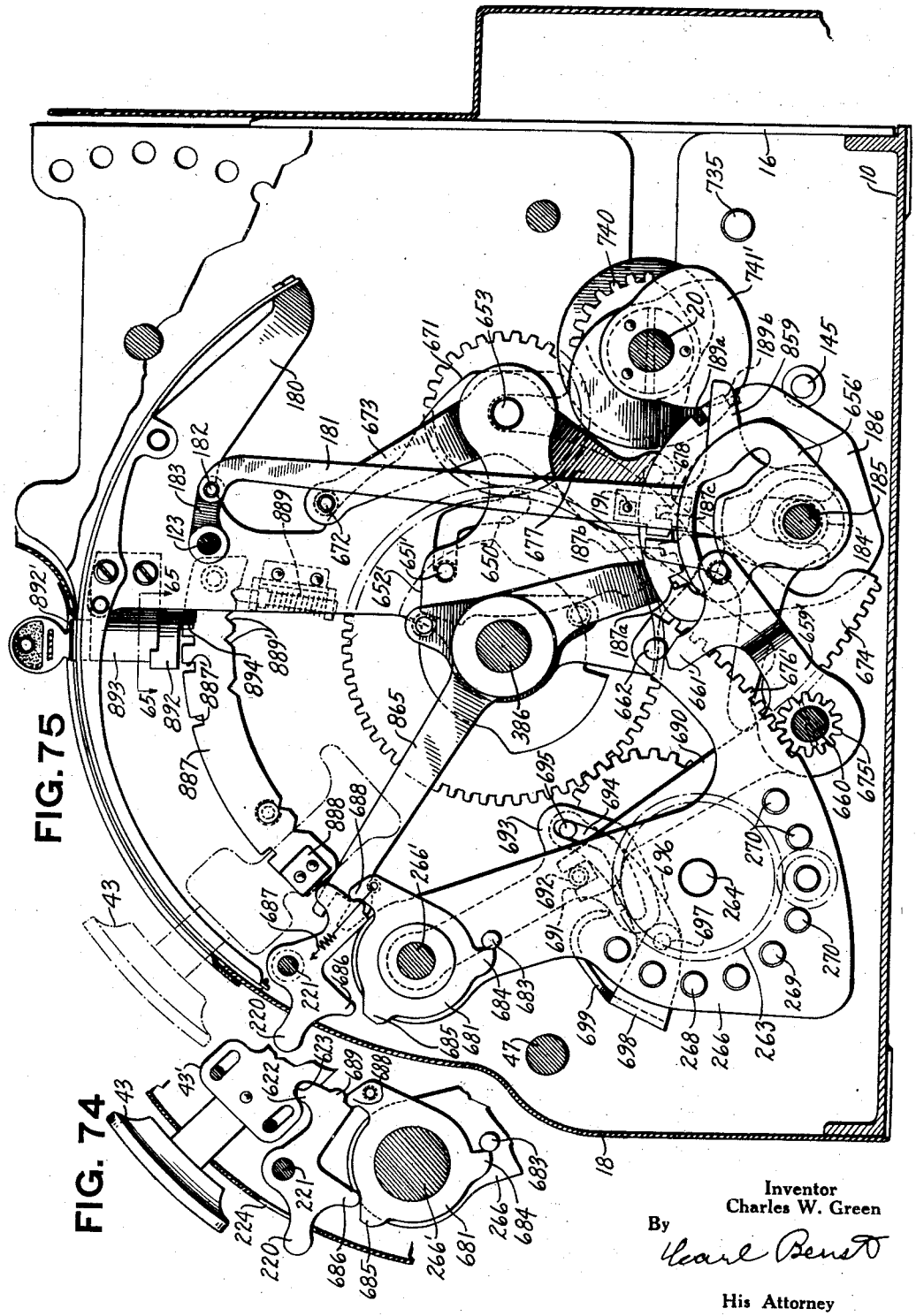

Aug. 1, 1939.                C. W. GREEN                2,167,715
                              CASH REGISTER
              Original Filed March 27, 1931    31 Sheets-Sheet 29

FIG.76

Inventor
Charles W. Green
By
Earl Beust
His Attorney

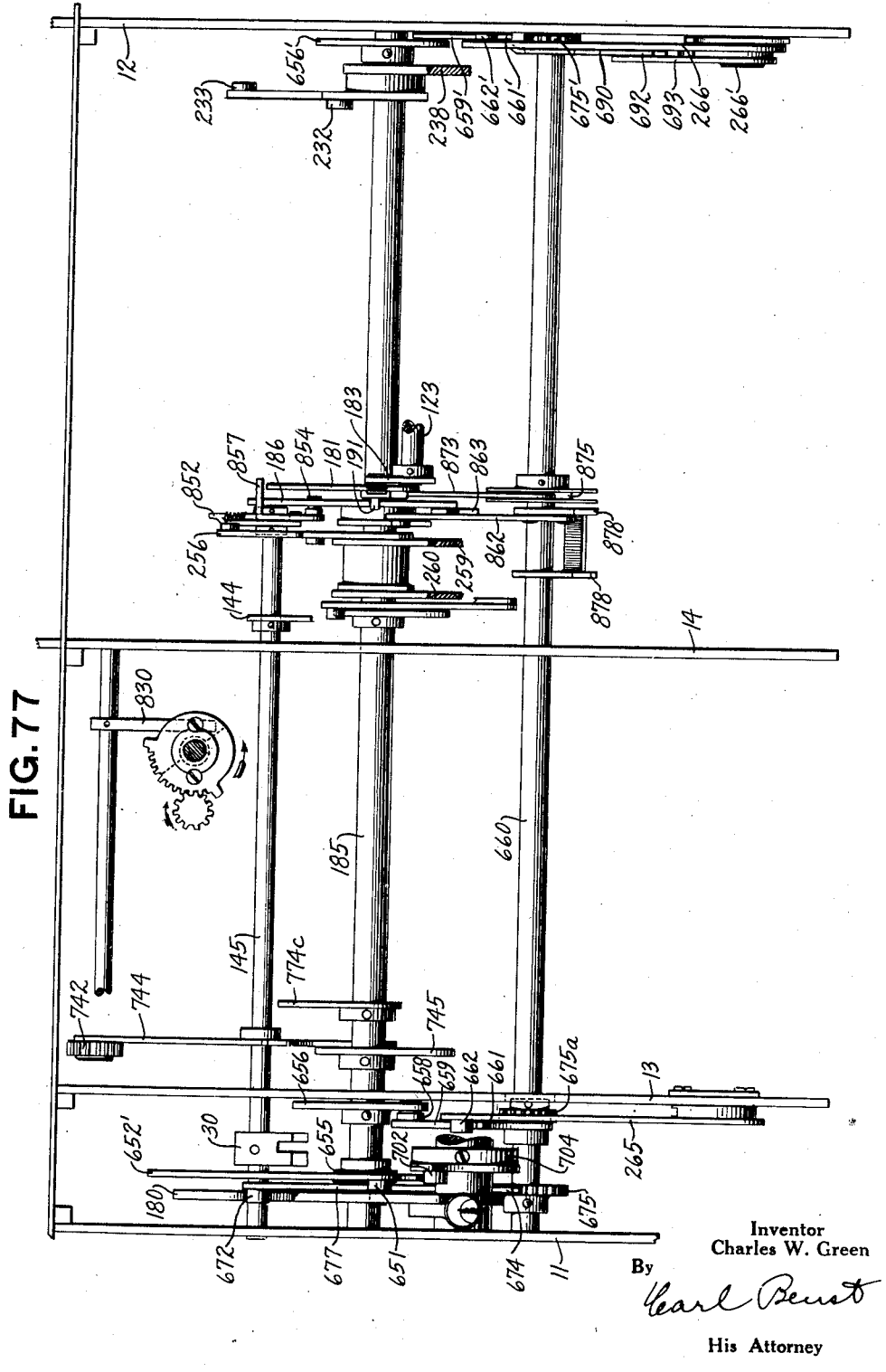

Aug. 1, 1939.    C. W. GREEN    2,167,715
CASH REGISTER
Original Filed March 27, 1931    31 Sheets-Sheet 31

Inventor
Charles W. Green
By
His Attorney

Patented Aug. 1, 1939

2,167,715

UNITED STATES PATENT OFFICE 2,167,715

CASH REGISTER

Charles W. Green, Dayton, Ohio, assignor to The National Cash Register Company, Dayton, Ohio, a corporation of Maryland Original application March 27, 1931, Serial No. 525,630, now Patent No. 2,063,091, dated December 8, 1936. Divided and this application April 10, 1936, Serial No. 73,623

23 Claims. (Cl. 235—8)

This invention relates to cash registers and analogous devices and particularly to that type having a plurality of totalizers some of which are provided for separately registering the totals of the various transactions entered in the machine by the individual clerks while others are provided for separately registering the totals of the different kinds of transactions entered in the machine, and is a division of the application for United States Letters Patent, Serial No. 525,630, of Charles W. Green, filed March 27, 1931, now Patent No. 2,063,091, issued December 8, 1936.

One important object of the present invention is to provide a number of printing totalizers in a reel arranged so that the total standing on each of the totalizers may be printed upon a record strip. This reel is so constructed that for item entering operations of the machine the various totalizers mounted therein may be selected for operation while the reel is held stationary. Printing from each of the totalizers is effected by first releasing the reel and then rotating the same to bring each totalizer and counter successively to the printing line whereupon the machine is operated to effect printing directly therefrom upon the record strip.

A further object of the present invention is to provide a unitary control mechanism for controlling the various modes of operation in the machine. A still further object is to provide a machine in which the various moving parts therein are positive in operation. Another important object of the present invention is to construct many of the parts in such a manner that they may readily be stamped from the sheet metal blanks, thus lowering the cost of manufacture to a minimum. Another object of the present invention is to construct the various mechanisms of the machine in such a manner that they may be assembled in units and then placed in the machine in their assembled state. This feature also tends to lower the cost of manufacture.

A further object of the present invention is to provide a single lock control mechanism with two keys, by which a limited number of operations of the machine may be controlled when unlocked by one key, while the said control mechanism when unlocked by the other key may be made to control all of the operations of the machine.

Further objects of the present invention are to effect improvements in totalizer selecting and operating mechanisms, differential mechanisms, keyboard and lock-line mechanisms, machine control mechanisms, interlocking mechanisms and totalizer resetting mechanisms, as well as a novel positive means for identifying grand totals from sub-totals when printed upon the record strip.

With these and incidental objects in view, the invention includes certain novel features of construction and combinations of parts, the essential elements of which are set forth in appended claims and a preferred form or embodiment of which is hereinafter described with reference to the drawings which accompany and form part of this specification. In the drawings:

Fig. 9 is a sectional view on line 9—9 of Fig. 10.

Fig. 10 is an elevational view illustrating the relative positions of the parts comprised in the differential when the revolution shaft has been operated susbtantially 100° and when a key in an amount section has been depressed.

Fig. 13 is a section on line 13—13 of Fig. 17.

Fig. 14 is an extended perspective view of the mechanism associated with each bank of keys for controlling the release of the machine.

Fig. 15 is a similar view of the transaction key section.

Fig. 16 is a similar view of a portion of the clerk's key section.

Fig. 17 is a side view of a portion of an amount key section with the retaining plate removed.

Fig. 18 is a section on line 18—18 of Fig. 15.

Fig. 19 is a view of the same key section showing arrangement of the parts when a no sale key is depressed.

Fig. 20 is a partial detail view of the transaction key section showing the received on account key depressed.

Fig. 21 is a detail view of the mechanism for manually releasing any depressed keys.

Fig. 22 is a plan view, with certain parts omitted, to show the mechanism for releasing the machine for operation and compelling a sequence of operation between the keys.

Fig. 23 is a general view of the motor release bar and all of the parts associated therewith for controlling the release of the machine and also shows the means for restoring the parts to normal during an operation of the machine.

Fig. 24 is a view showing the position of the parts immediately after the motor release bar has been depressed.

Fig. 25 is a detail view showing some of the locking elements for the operating mechanism in their normal positions.

Fig. 26 is a detail view showing the position of some of the locking elements immediately after the motor bar has been depressed.

Fig. 33 is a front elevational view of the totalizer reel.

Fig. 34 is a view of the totalizer reel taken on line 34—34 of Fig. 3.

Fig. 35 is an extended perspective view of the totalizer reel, showing particularly the elements comprising the totalizer selecting and engaging mechanisms.

Fig. 40 is a view taken substantially on line 40—40 of Fig. 37.

Fig. 41 is a sectional view taken on line 41—41 of Fig. 40.

Fig. 42 is a sectional view taken on line 42—42 of Fig. 37.

Fig. 43 is a detail perspective view of a portion of the totalizer engaging mechanism.

Fig. 44 is a front elevational view of the reel with parts omitted to show the totalizer actuating gears, the transfer plates, and the cam shaft for controlling the various mechanisms associated with the reel.

Fig. 45 is a view taken substantially on line 45—45 of Fig. 44.

Fig. 48 is a detail view of the cams for operating the resetting mechanism.

Fig. 49 is a view taken on line 49—49 of Fig. 3 showing particularly the resetting mechanism, and the interlocks between the totalizer reel and the motor control shaft.

Fig. 50 is a front view of the resetting mechanism showing certain of the mechanisms associated therewith.

Fig. 51 is a general view of the resetting mechanism with parts drawn in section to show the gearing for shifting and rotating the totalizer shaft.

Fig. 52 is a detail view of a totalizer wheel showing the pawl carried thereby and a notched portion of the totalizer shaft with which this pawl cooperates during a resetting operation.

Fig. 53 is a section taken on line 53—53 of Fig. 51.

Fig. 54 is a section taken on line 54—54 of Fig. 53.

Fig. 55 is a section taken on line 55—55 of Fig. 51.

Fig. 56 is a view taken on line 56—56 of Fig. 51.

Fig. 60 is a general view of the printer showing printed totals and their identifying characters.

Fig. 61 is a detail view showing the type wheels for printing characters on the record strip to distinguish grand totals from sub-totals.

Fig. 62 is a side view of the right-hand type wheel of Fig. 61.

Fig. 63 is a right-hand side view of the printer showing the operating mechanisms associated therewith.

Fig. 64 is a detail plan view of the parts associated with the control lever for controlling the grand total position of the lever.

Fig. 65 is a cross section of the control lever lock on line 65—65 of Fig. 75.

Fig. 66 is a section of the control lever taken on line 66 of Fig. 65.

Fig. 67 is a sectional view taken substantially on line 67—67 of Fig. 57 particularly showing the drawer mechanism.

Fig. 68 is an elevational view, with parts broken away, of the clutch associated with the drawer mechanism.

Fig. 69 is a vertical cross-sectional view of the clutch mechanism shown in Fig. 68.

Fig. 70 is a detail view showing the two semicircular plates of the clutch shown in Fig. 68.

Fig. 71 is a front view of the mechanism shown in Fig. 70 with the plates of the clutch separated.

Fig. 72 is a detail view of the manual means for rotating the reel to select a totalizer for total printing and resetting.

Fig. 73 is a sectional view taken substantially on line 73—73 of Fig. 57 showing particularly the mechanism for selecting a cash drawer by movement of the totalizer reel.

Fig. 74 is a detail view of the mechanism for controlling the motor bar retaining latch.

Fig. 75 is a general elevational view of the control mechanism and its associated parts.

Fig. 76 is a sectional view taken on line 76—76 of Fig. 3.

Fig. 77 is a general plan view of the control mechanism.

GENERAL DESCRIPTION

Figure 1:
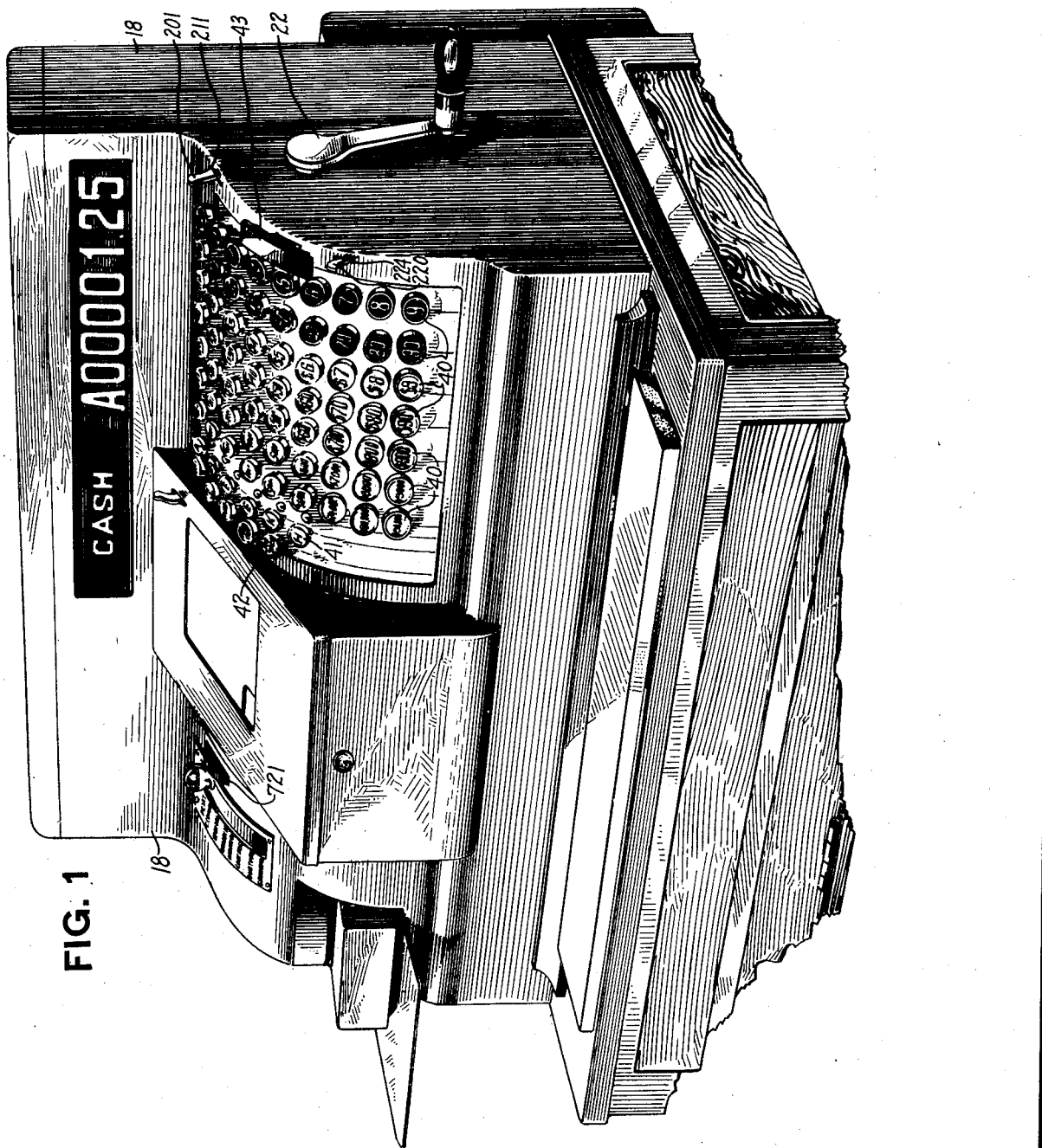
Fig. 1 is a perspective view of the complete machine embodying this invention.

Before describing the various mechanisms comprised in this machine in detail, a general description of the machine will first be given. This machine is of the well known key set motor or crank operated type. The illustrated machine contains seven banks of amount keys, one bank of clerks' keys and one bank of transaction keys. These keys operate with what is commonly known as a lock line which is so constructed that upon an adding operation of the machine it is necessary to depress a key in one of the amount banks, a transaction key, a clerk's key and a motor bar to release the machine for operation. This mechanism is also so constructed that for no sale transactions, it is only necessary to depress the no sale key, a clerk's key and the motor bar to release the machine for operation. Upon depression of the no sale key, all of the amount keys will be locked against operation. Likewise, upon depression of any one of the amount keys, the no sale key will be locked against operation. Mechanism is also provided to compel the depression of an amount key before a clerk's key can be depressed for all transactions involving the use of the amount keys. This interlock also compels the depression of the no sale key for no sale transactions before a clerk's key can be depressed. Associated with each bank of keys is a positively driven differential segment from which motion is imparted to the mechanisms for adjusting the various type carriers and totalizer elements provided in the machine.

Located approximately at the mid-portion of the machine is a normally stationary reel in which are mounted in the illustrated machine six clerks' totalizers, four transaction totalizers and one grand totalizer. The selecting mechanism for selecting one or more of the totalizers for operation comprises two selector plates which are adjusted through a transmission line by the differential segments associated with the clerks' and transaction banks of keys respectively. This mechanism is so constructed that for cash and received on account transactions, a clerk's totalizer, a transaction totalizer and the grand totalizer will be selected for operation and simultaneously operated by the actuating gears. For charge and paid out transactions, however, mechanism is provided for holding out the selected clerk's totalizer and the grand totalizer, thereby permitting operation only of the selected transaction totalizer.

The illustrated machine is provided with a two key single lock control mechanism comprising a control lever which is movable to seven positions of adjustment. The six upper positions or all except grand total are made accessible by a key in the hands of the store manager, and all positions including grand total are made accessible to an auditor by inserting a different key in the same lock. When this lever is in the uppermost position, the machine is conditioned to reset the consecutive counter provided in the reel and also that associated with the check and slip printing mechanism. When the control lever is moved to the next position, or open drawer position, the machine is conditioned for operation regardless of whether a cash drawer is open or closed. When the control lever is moved to the next position, or closed drawer position, the machine can be operated only when the cash drawers are closed.

The consecutive counters, the check and slip printing mechanisms and the drawer mechanisms are not shown or described in this divisional application. For further information relating thereto reference may be had to the parent case.

When the control lever is moved to the next position, or the unlocked clerks' keys position, the individual locks associated with the clerks' bank of keys may be moved to ineffective position so that any one of the clerks' keys may then be depressed without first unlocking the same by the individual lock associated therewith. This position of the control lever is not a permanent position, but is simply provided to permit release of the clerks' keys; the control lever must then be moved to either closed drawer or open drawer position to condition the machine for operation. Suitable mechanism is also provided to retain the individual clerks' locks in either effective or ineffective position.

When the control lever is moved to lock register position, the entire machine is locked against operation. When the control lever is moved to sub-total position, the transmission line is swung out of engagement with the gears in the machine proper and the totalizer reel may then be rotated to bring one of the totalizers or special counters to printing position. Upon depression of the motor bar, the machine will then effect a printing impression directly from the totalizer or counter so selected upon the detail record strip. When the control lever is unlocked by the second key or auditor's key it can be moved to grand total position, the resetting mechanism is conditioned for operation so that upon operating the machine for total taking a printing impression is effected upon the detail strip from the selected totalizer and special counter, and said totalizer and special counter are automatically reset to zero. Suitable locking mechanism is also provided for locking the control lever in any one of its positions of adjustment with the exception of the unlocked clerks' keys position, which position it is remembered is simply a temporary one, and the further exception of the grand total position.

Suitable interlocks are also provided to insure against any mis-operations of the machine.

Locks are also provided for locking all of the moving parts in the totalizer reel against movement so that they will remain in place when the reel is rotated during total taking operations. The gears of the transmission line are also locked against operation when it is out of normal position so that they will properly mesh with their related gears in the machine proper, when the transmission line is restored to normal position. An interlock mechanism is provided between the main operating mechanism of the machine and the reel so that the machine cannot be operated after the control lever has been moved to subtotal or grand total position unless the reel is moved to a printing position. Also an interlock is provided to prevent operation of the machine when the reel has been arrested between printing positions. A detail description of the mechanisms outlined above will now be given.

Frame work

The various parts of the machine are supported by a suitable frame work comprising a base casting 10 (Fig. 2), two main side supporting frames 11 and 12 and two intermediate supporting frames 13 and 14. These frames are fastened to brackets 15 attached to the base casting, by screws, rivets or any other suitable means. A plate 16 extending across the back of the machine is fastened to brackets 17 provided along the rear edge of each of the frames. This plate acts as a brace for all of the frames. The mechanisms contained in this machine are enclosed by a cabinet 18, which has hinged thereto a flat lid 19 so that access may be had to the printing mechanism for removing the printed record strip and also for replenishing the paper supply. The cabinet is also provided with suitable openings for receiving key sections and several of the control mechanisms as is clearly shown in Fig. 1.

Operating mechanism

Figure 3:
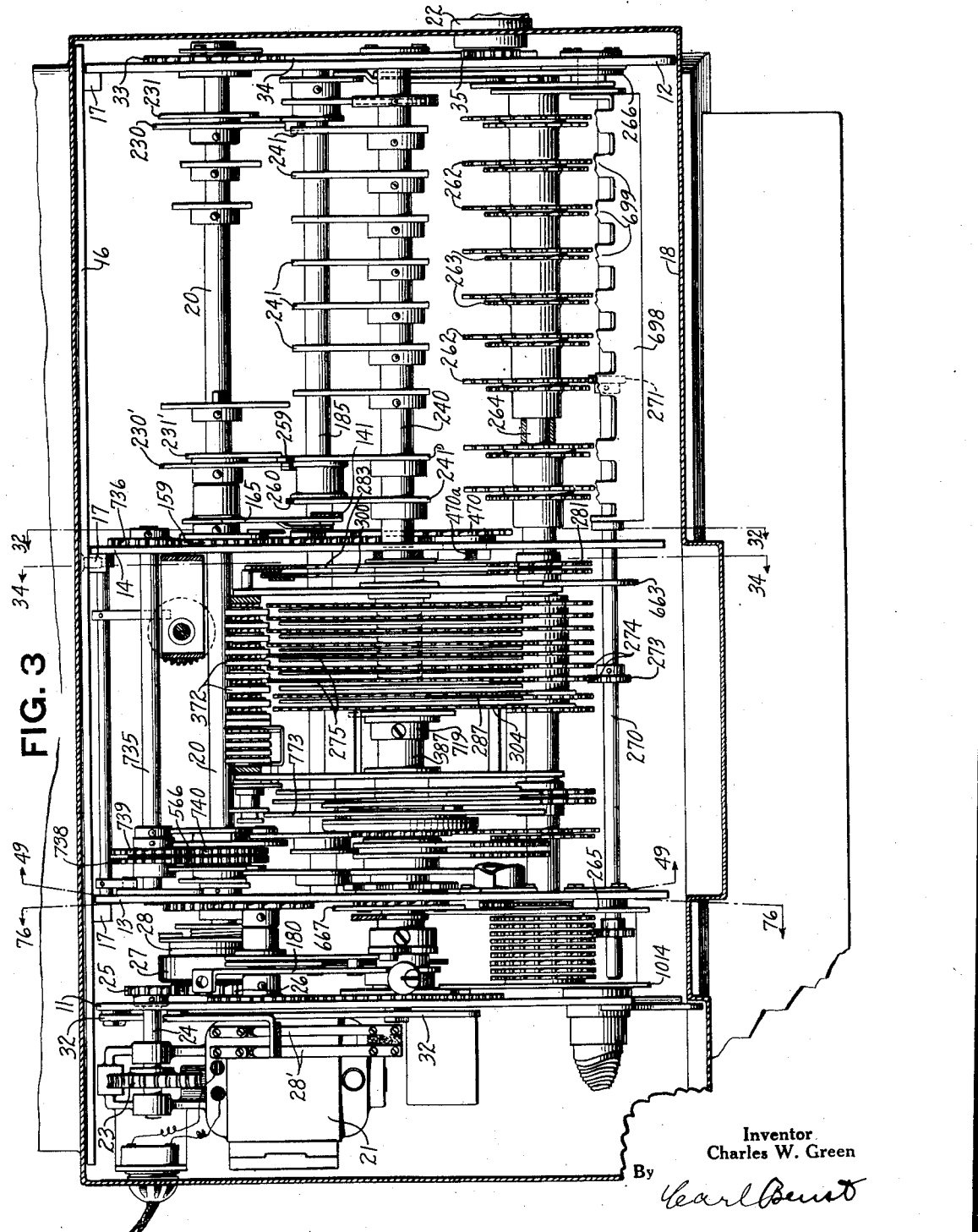
Fig. 3 is a plan view of the mechanisms located substantially below the mid-portion of the machine.

The power is imparted to various mechanisms of the machine my a main driving shaft 20 (Figs. 3 and 4), which is driven either by an electric motor 21 or a hand operated crank 22. Shaft 20 is given one complete rotation at each operation of the machine. As shown in Fig. 3 the usual reduction gearing, designated generally by reference character 23, is provided between the electric motor 21 and a short shaft 24. Shaft 24 extends through an enlarged opening in side frame 11 and carries a pinion 25 at the inner end thereof which meshes with a gear 26 attached to a flanged disc 27 of clutch 28. A cooperating clutch member 29 is fixed to the left-hand end of the main operating shaft 20 and operates within the flanged portion of disc 27 to cause the clutch members to drive shaft 20 when the motor is operated. The control mechanism for the motor switch 28' is also shown generally in Figs. 3 and 23. The clutch and the switch control mechanism associated with the electric motor 21 are of a well known type and will not be described in detail herein. For a full disclosure thereof reference may be had to United States Patent No. 1,144,418 issued June 29, 1915, to Charles F. Kettering and William A. Chryst. In order to cause operation of the motor it is only necessary to rock an arm 30 (Figs. 4 and 23) out of engagement with plate 32' and notches (not shown) provided in the locking plates associated with the clutch and switch control mechanism. The mechanism for performing this function and also that for restoring arm 30 to normal position will be fully described hereinafter.

The electric motor 21 is mounted on a support 32 which is attached to side frame 11 by screws or bolts. This not only facilitates assembling of the parts but renders the motor assembly readily detachable from the machine.

Figure 5:
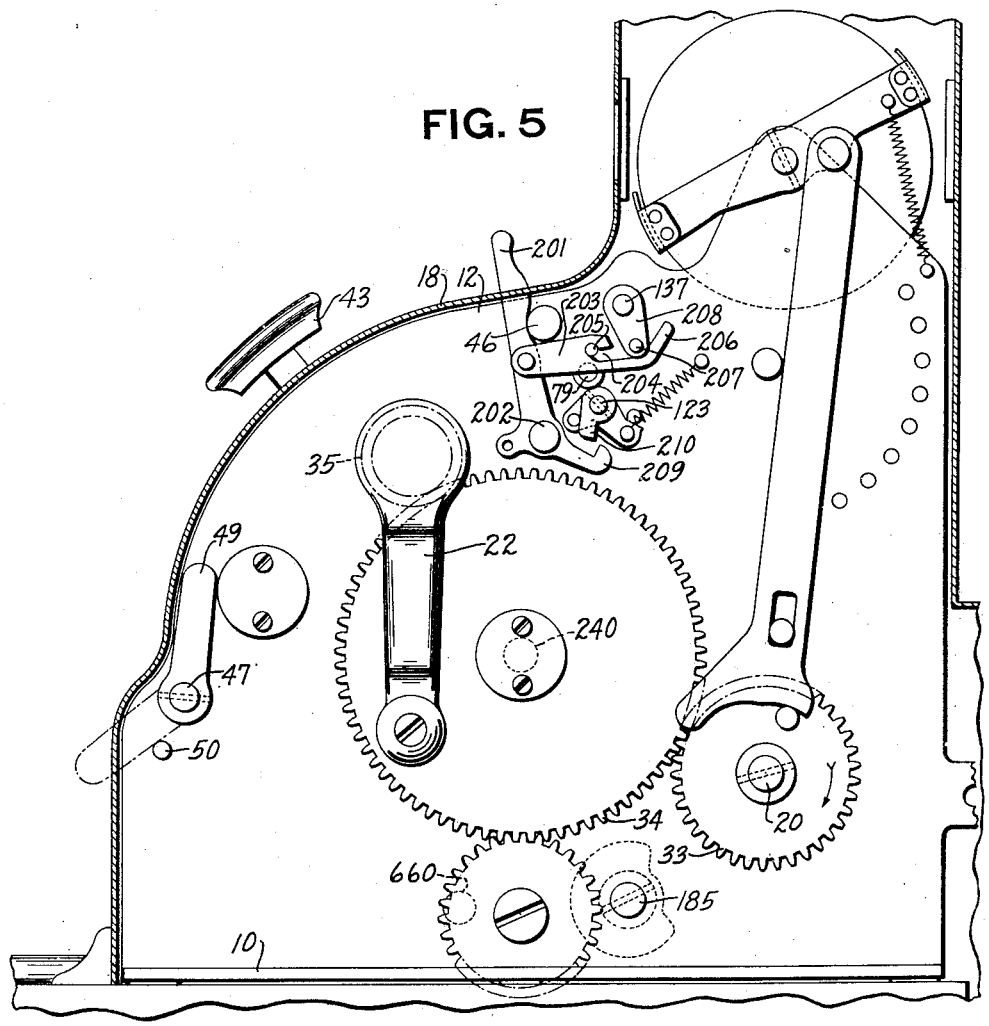
Fig. 5 is a right-end view of the machine with the end portion of the cabinet removed.
Figure 6:
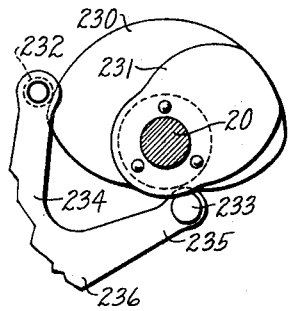
Fig. 6 shows the cams for operating the driving members for the amount differential segments.

Referring to Figs. 3 and 5 it will be seen that a pinion 33 is fixed to the right-hand end of shaft 20. This pinion meshes with a large idler gear 34 which gear in turn meshes with a smaller gear 35 which is driven by hand crank 22. Thus it is seen that mechanism is provided for driving shaft 20 either manually by crank 22 or automatically by electric motor 21. A suitable clutch mechanism is provided between hand crank 22 and pinion 35 which permits movement of gears 33, 34 and 35 without moving crank 22 when the machine is operated by the electric motor 21. Suitable mechanism is also provided to permit removal of crank 22.

Keyboard

The keyboard (Fig. 1) is comprised of seven banks of amount keys 40, one bank of clerks' keys 41, and one bank of transaction keys 42. A motor bar 43 is also provided for effecting release of the machine. Each bank of keys comprises a complete section which may be inserted in the machine or removed therefrom as a unit. The casting 44 (Figs. 27, 28, 30 and 31) forming the body of each of the key sections, is provided with slots 45 formed at either end thereof, which are received by a pair of parallel rods 46 and 47 (see also Fig. 27) journalled in frames 12 and 14. Rod 47 is provided with a flat surface 48 (Fig. 27) which permits the removal of the key sections from the machine. A lever 49 (Fig. 5) is fixed to the right-hand end of rod 47 and is positioned adjacent the outer side of frame 12. Thus, it is seen that in order to remove or insert the key sections in the machine, lever 49 is moved downwardly to the dotted line position shown in Fig. 5, thereby bringing the flat surface 48 and rod 47 adjacent the inner ends of the lower slots 45. The sections may then be lifted from the supporting rods. When the lever 49 is moved to the dotted line position shown in Fig. 5 a portion thereof extends beyond the front extremity of the cabinet and the cabinet obviously cannot be placed on the machine until lever 49 is moved to the full line position. A stud 50 acts as a stop for the lever 49 in the dotted line position. The parts are arranged in this manner to prevent the placing of the cabinet on the machine until the key sections are locked in place. To lock the key sections in position, the lever 49 is simply moved to the full line position shown in Fig. 5 which movement rotates rod 47 to the position shown in Fig. 27 thereby bringing the flat surface 48 thereof out of alinement with the inner end of the slots.

Figure 28:
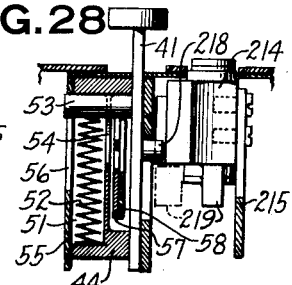
Fig. 28 is a sectional view taken on line 28—28 of Fig. 27.
Figure 29:
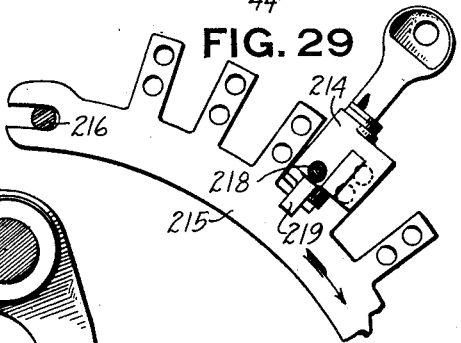
Fig. 29 is a detail view of a portion of the plate for supporting the individual locks for the clerks' keys.
Figure 31:
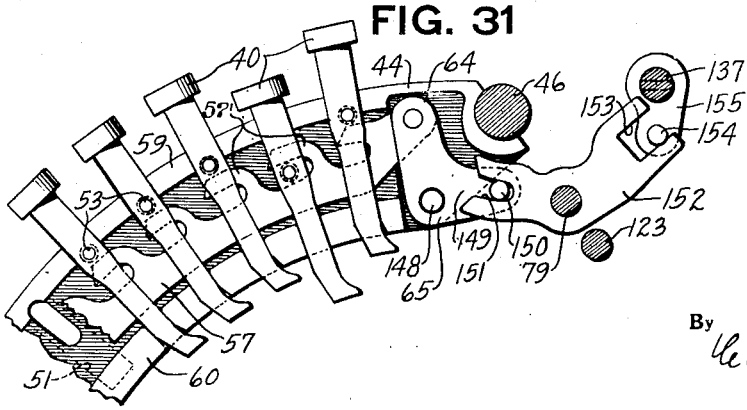
Fig. 31 is a view of the same parts during an operation of the machine.

Referring more particularly to Figs. 9, 28 and 31 it will be seen that each key section casting 44 is provided with a plurality of radial depressions 51 each of which receives a key restoring coil spring 52. A pin 53 carried by each key stem extends through an opening 54 provided in the wall of the casting and rests upon the spring associated therewith. These pins are thus effective to compress their respective springs when the keys are depressed. A side plate 55 is attached to each casting 44 for the purpose of retaining all of the springs 52 in position within their respective depressions. This plate is also provided with a series of radial guide slots 56 (Figs. 9 and 28) which receive the ends of pins 53 to prevent any lateral movement thereof during movement of the keys. The other side of each casting 44 is formed with an elongated depression for receiving the detent plate 57 (Figs. 23 and 28) and the segmental cam plate 58 associated with its related bank of keys. The flanged portions 59 and 60 respectively of the casting 44 are formed with radially alined notches for guiding the keys during their reciprocating movement. A differential latch detent plate 61 (Fig. 10) is fastened to the flanged portions of each casting by screws 62 and thus the keys, as well as the associated detent and segmental cam plates, are retained in proper position. Each casting 44 is also formed with depressions near the upper and lower ends thereof for receiving certain levers connected with the detent and segmental cam plates 57 and 58 respectively.

The type of keyboard embodied in this machine is that commonly known as the flexible type; that is, when a key is depressed in any one of the banks the remaining keys in that bank are not locked against operation but any one may be operated with the result that the initially depressed key is restored to normal position by its associated spring. The construction and operation of the mechanism for permitting such action of the keys is the same in all of the banks of keys so that a description of one will sufficie for all. For the purpose of illustration a description of the mechanism associated with an amount bank of keys will be given.

Referring to Figs. 9, 10, 17, 23 and 31 it will be seen that the detent plate 57 is provided with a plurality of hook-shaped portions 57' (Fig. 17) one for each key. Each portion 57' is provided with an inclined cam face 63 positioned immediately beneath a pin 53 provided on its associated key. The upper end of the detent plate 57 is pivoted to the substantially vertical arm 64 of a bell crank lever 65, while the lower end thereof is pivoted to a lever 66 (Fig. 10) which is pivoted intermediate its ends on a stud 67 provided in the casting 44. A spring 68 is attached at one end to the inner end of lever 66 and at its other end to a projection 69 (Fig. 9) provided on key spring retaining plate 55. It is, therefore, clear that when a key is depressed detent plate 57 will be cammed upwardly against the tension of spring 68 until pin 53 has cleared the cam face 63 when the spring 68 will restore the detent plate 57 to normal position. The pin 53 of the depressed key will thus be engaged by the hooked portion of its corresponding detent and consequently the key will be held in depressed position. It is obvious that when another key in the bank is depressed the detent plate 57 will again be moved upwardly thereby freeing the previously depressed key, which is then immediately restored to normal by its spring 52, and the second key is retained in depressed position in the manner just stated.

The segmental cam plate 58 is pivoted at its lower end to lever 70 which also is pivoted on stud 67. A spring 68' is connected at one end to the inner end of lever 70 and at the other end to projection 69 of key spring retaining plate 55. The upper end of plate 58 is pivoted to the substantially vertical arm 71 of zero stop pawl 72 pivoted at 73. Cam plate 58 is provided with a series of inclined cam faces 58', one for each key which are located adjacent their respective pins 53 as shown in Figs. 10, 15, 16 and 17. Thus, it is clear that when a key in any bank is depressed both detent plate 57 and cam plate 58 associated therewith will be moved upwardly. When pin 53 moves past cam 63, the detent plate 57 will be restored to normal position by spring 68, but cam plate 58 will be held in its operated position by pin 53 and will remain in this position until the depressed key is restored to normal position, when its associated spring 68' will restore it to normal position.

In all transactions with the exception of the no sale transaction, it is necessary to depress a key in each of the groups and also the motor bar in order to release the machine for operation. For no sale transactions, however, it is only necessary to depress the no sale and a clerk's key, together with the motor bar, to effect release of the machine. Mechanism is also provided to compel the depression of an amount key before a clerk's key can be depressed for transactions in which the amount keys are depressed. Mechanism is also provided for locking the no sale key against operation when an amount key has been depressed and also for locking the amount keys against operation when the no sale key has been depressed. The mechanisms for accomplishing these functions will now be described in detail.

Each segmental cam plate 58 associated with the amount banks of keys as has been pointed out is pivoted to the upper arm 71 of its associated zero stop pawl 72 as shown in Figs. 13 and 17. This pawl is provided with a depending arm 74 which is adapted to effect disengagement of the differential latch from its driver when no key in a bank has been depressed. The pivot 73 of pawl 72 extends only through the differential latch retaining plate 61. A rearwardly extending arm 76 of this pawl engages a pin 77, provided on an arm 78 fixed to a rod 79, which is journaled in side frames 12 and 14. As is clearly shown in Fig. 22 there is a similar arm 78 fixed to rod 79 for each bank of amount keys. Rod 79, near the left-hand end thereof has pinned thereto, a two-arm lever 80, as shown in Figs. 14 and 22. When an amount key 40 is depressed the segmental cam plate 58 associated therewith will be moved upwardly, thereby rocking zero stop pawl 72 on its pivot 73, thus removing the depending arm 74 from the path of movement of its associated differential segment. By this action rod 79 will be rocked in a counterclockwise direction, as viewed in Fig. 17, which movement is imparted to lever 80, which lever it will be remembered is also fixed to rod 79. The upper arm of lever 80 carries a pin 81 which is adapted to engage a projection 82 provided on a release arm 83 loosely mounted on rod 79. Release arm 83 is provided with a rearwardly extending projection 84 which normally lies in the path of movement of the upper arm 85 of a two-arm detent 86 pinned to shaft 123 (Fig. 14). It is therefore clear that when lever 80 is rocked in the manner aforesaid, pin 81 will engage projection 82 on release arm 83 thereby rocking the latter in a counterclockwise direction to bring the rearwardly extending projection 84 thereon out of the path of arm 85. All of the arms 78 provided on shaft 79 are moved in a counterclockwise direction upon the depression of a key in any one of the amount banks, and accordingly no further rocking of rod 79 will occur when the keys of the other amount banks are depressed.

Figs. 14, 15, 19, 20 and 22 show the mechanism associated with the transaction bank of keys. By reference to these figures it will be seen that the upper end of segmental cam plate 58 associated with this bank of keys is pivoted to the substantially vertical arm 87 (Fig. 20) of bell crank lever 88; bell crank lever 88 being pivoted on a collar 8' mounted on the supporting stud 89 (Fig. 18) fixed to plate 61. The substantially horizontal arm 90 (Fig. 20) of bell crank 88 carries a pin 91 which engages in an open slot 92 provided in the forward end of a release arm 93 pivoted on rod 79. Release arm 93 is provided with a rearwardly extending projection 94 which normally lies in the path of movement of the upper arm 95 (Fig. 14) of detent 96 which detent is also pinned to shaft 123. Thus, it is seen that when a transaction key is depressed, the pin 97 carried thereby will engage its corresponding cam face 58' provided on plate 58 and will cam the latter upwardly thereby rocking bell crank 88 in a clockwise direction which in turn will rock release arm 93 in a counterclockwise direction bringing the rearwardly extending projection 94 thereon upwardly and out of the path of movement of arm 95 of denten 96. A similar mechanism is also associated with the clerks' bank of keys. The segmental cam plate 58 (Figs. 16 and 22) associated with the clerks' bank of keys is pivoted to the upper arm 98 of bell crank lever 99 (Fig. 16) at 100. The substantially horizontal arm 101 of bell crank lever 99 carries a pin 102 which engages in slot 103 provided in the forward end of release arm 104. A rearwardly extending projection 105 is provided on release arm 104 which normally lies in the path of movement of the upper arm 106 (Fig. 14) of a detent 107 which is also fixed to shaft 123. Thus, it is seen that when a clerk's key is depressed, bell crank 99 will be rocked in a clockwise direction, thereby rocking release arm 104 in a counterclockwise direction to bring projection 105 out of the path of the upper arm 106 of detent 107.

The mechanism for compelling a sequence of operation between the keys and also the interlock between the amount keys and the no sale key will now be described. Referring particularly to Figs. 14, 15, 16, 18 and 22, it will be seen that lever 80 is provided with a forwardly extending arm 108 which is positioned adjacent a foot 109 provided at the rearward end of a plate 110. Plate 110 is pivoted at its upper end to the substantially vertical arm 118 of bell crank lever 119 and at its lower end to an arm (not shown) pivoted on a stud fixed to plate 61. As shown in Fig. 18, plate 110 lies adjacent the outer side of plate 61. Thus, it is seen that when arm 80 is rocked, upon depression of an amount key, arm 108 will be moved in the path of the inner end of foot 109 provided on plate 110 and obviously plate 110 is locked against operation. It will be noted that plate 110 is provided with a series of radial slots 111 positioned immediately beneath pins 97 on all transaction keys with the exception of the no sale key. An inclined cam slot 112 (Fig. 15) is formed in plate 110, the upper end thereof lying beneath the pin 97 extending from the no sale key. Therefore, when the no sale key is depressed pin 97 thereon will move plate 110 upwardly with the result that foot 109 will be brought beneath the arm 108 of lever 80, thereby locking the amount keys against operation.

In order to compel the depression of an amount key or a no sale key before a clerk's key can be depressed, a bail 113, shown in Figs. 14, 15, 19 and 22 is provided. Bail 113 is pivoted on shaft 123 to which are fixed the detents 86, 96 and 107, previously described. Release arm 83 is provided with a pin 114 which is adapted to engage an arm 115 provided at the left-hand end of bail 113.

Attached to release arm 104, as shown in Figs. 14, 16 and 22 is a lock arm 116. This arm is adapted to cooperate with arm 117 provided at the right-hand end of bail 113. Thus, it is seen that when an amount key is depressed, release arm 83 will be rocked in a counterclockwise direction as aforesaid causing pin 114 to rock bail 113 in a counterclockwise direction, thereby removing arm 117 from engagement with lock arm 116. A clerk's key may now be depressed. In order that the depression of a no sale key may permit the depression of a clerk's key the following mechanism is provided. As stated before plate 110 is pivoted to the upper arm 118 of bell crank lever 119 at 120. The rearwardly extending arm 121 of bell crank lever 119 is adapted to engage a pin 122 provided at the forward end of release arm 83. Thus, it is seen that when a no sale key is depressed plate 110 will be moved upwardly thereby causing bell crank lever 119 to also rock bail 113 in a counterclockwise direction to remove the arm 117 thereof from engagement with lock arm 116.

From the construction of parts just described, it is clear that when a key in each of the banks is depressed, the release arms 83, 93, and 104 are rocked out of the path of movement respectively of arms 85, 95 and 106 of their respective detents, which it will be remembered are pinned to shaft 123. Mounted on shaft 123 in close juxtaposition to the inner side of side frame 12 is an arm 124, as shown more clearly in Figs. 23 and 25. The upper portion of arm 124 is provided with an open slot 125 which receives a pin 126 provided on link 127. Link 127 is pivotally supported by arms 128 and 129 pivoted respectively on studs 130 and 131 provided in side frame 12. Fixed to motor release bar 43 is a plate 43' slidably mounted on studs 132 as shown in Fig. 23. A roller 133 provided at the lower end of plate 43' normally engages a foot 134 provided at the lower end of link 127. Thus, it is seen that when the motor bar 43 is depressed roller 133 will be moved out of engagement with foot 134 and spring 135 will move link 127 downwardly if shaft 123 has been released in the manner hereinbefore described. A depending arm 136 is fixed to a shaft 137, which shaft is also journaled in side plates 12 and 14, a hook member 138 pivoted on shaft 79 normally engages the lower end of arm 136 as shown in Fig. 25. Also fixed to shaft 137 is a substantially horizontal arm 139 having pivoted to the outer end thereof at 140, a spring urged link 141. The lower end of link 141 is provided with a slot 142 which receives a pin 143 attached to the forward end of an arm 144. Arm 144 is fixed to shaft 145 which, it will be remembered, has also fixed thereto the arm 30 which normally engages the locking plates associated with the clutch and motor switch control mechanism as shown in Fig. 23. Thus, it is seen that when a key in each of the banks has been depressed, or the no sale key and a clerk's key for no sale transactions, and the motor bar 43 is depressed, roller 133 will be moved out of the path of projection 134 and the spring 135 will move link 127 downwardly to the position shown in Fig. 24. This downward movement of link 127 will, through pin 126 and arm 124, cause the shaft 123 to rock in a counterclockwise direction. Pin 126 on link 127 will then engage cam face 146 (Fig. 25) provided at the upper side of hook 138, thereby disengaging hook 138 from arm 136. Spring 147 attached to link 141 will then move the latter upwardly thus rocking shaft 145 in a clockwise direction as viewed in Fig. 23, to remove arm 30 from locking engagement with plate 32', with the result that the switch control mechanism will close the electric motor switch and cause the motor to drive shaft 20 through the connections previously mentioned.

Figure 30:
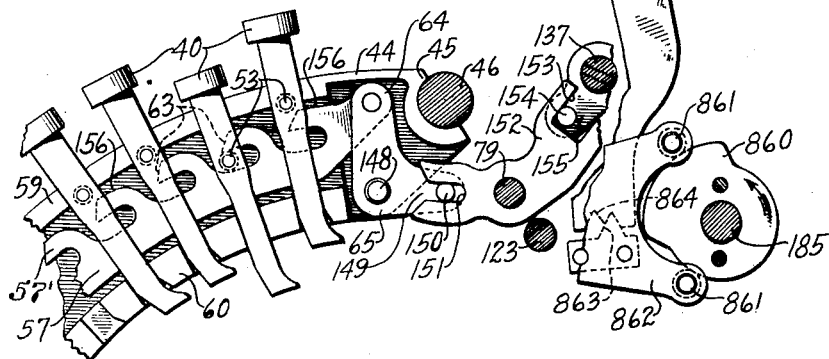
Fig. 30 is a detail view of a key section showing the position assumed by the detent plate and its associated parts after a key has been depressed.

Referring to Figs. 30 and 31 it will be seen that the detent plate 57 associated with each bank of keys as was pointed out hereinbefore, is pivoted at its upper end to the substantially vertical arm 64 of bell crank lever 65. Bell crank 65 is pivoted on a stud 148 provided in the key section casting 44 as shown in Figs. 13 and 15. The substantially horizontal arm 149 of bell crank lever 65 carries a pin 150 which engages in slot 151 of the substantially horizontal arm of a lever 152 pivoted on shaft 79. The rearwardly extending arm of lever 152 is provided with an enlarged open slot 153 which receives a pin 154 provided on an arm 155 fixed to shaft 137. The enlarged slot 153 is provided to permit relative movement between the keys and shaft 137 before the machine has been released for operation. From the above description it is clear that when link 141 (Fig. 23) is moved upwardly by spring 147, shaft 137 will be rocked in a counterclockwise direction and, obviously, through the connections just described, bell crank lever 65 will be rocked in a counterclockwise direction about its pivot 148, thereby moving detent plate 57 downwardly. By this movement each detent 62 will further embrace its related pin 53 associated with the key depressed in that bank and at the same time the flat surfaces 156 (Fig. 30) provided at the top of each detent will be brought beneath the pins 53 of the unoperated keys, thereby positively locking the latter against operation. Fig. 31 shows the above described parts in operated position.

Referring to Figs. 23 and 24, it will be seen that link 127 carries a pin 157 near the upper end thereof. This pin lies in the path of movement of arm 136 but is spaced therefrom to permit downward movement of link 127 to cam hook 138 out of engagement with arm 136. From the foregoing description, it is seen that immediately upon disengagement of hook 138 from arm 136, spring 147 will rock shaft 137 in a counterclockwise direction, causing arm 136 to engage pin 157 and thereby move link 127 upwardly. Since pin 126 of link 127 projects into slot 125 of arm 124, shaft 123 will be rocked in a clockwise direction, when link 127 is actuated by arm 136 in the manner just described. When this occurs it is obvious that abutment 134 will be moved clear of the path of movement of roller 133 and spring 150 will restore the motor bar 43 to normal position, thereby bringing roller 133 into engagement with abutment 134 of link 127 as is shown in Fig. 23.

Figure 32:
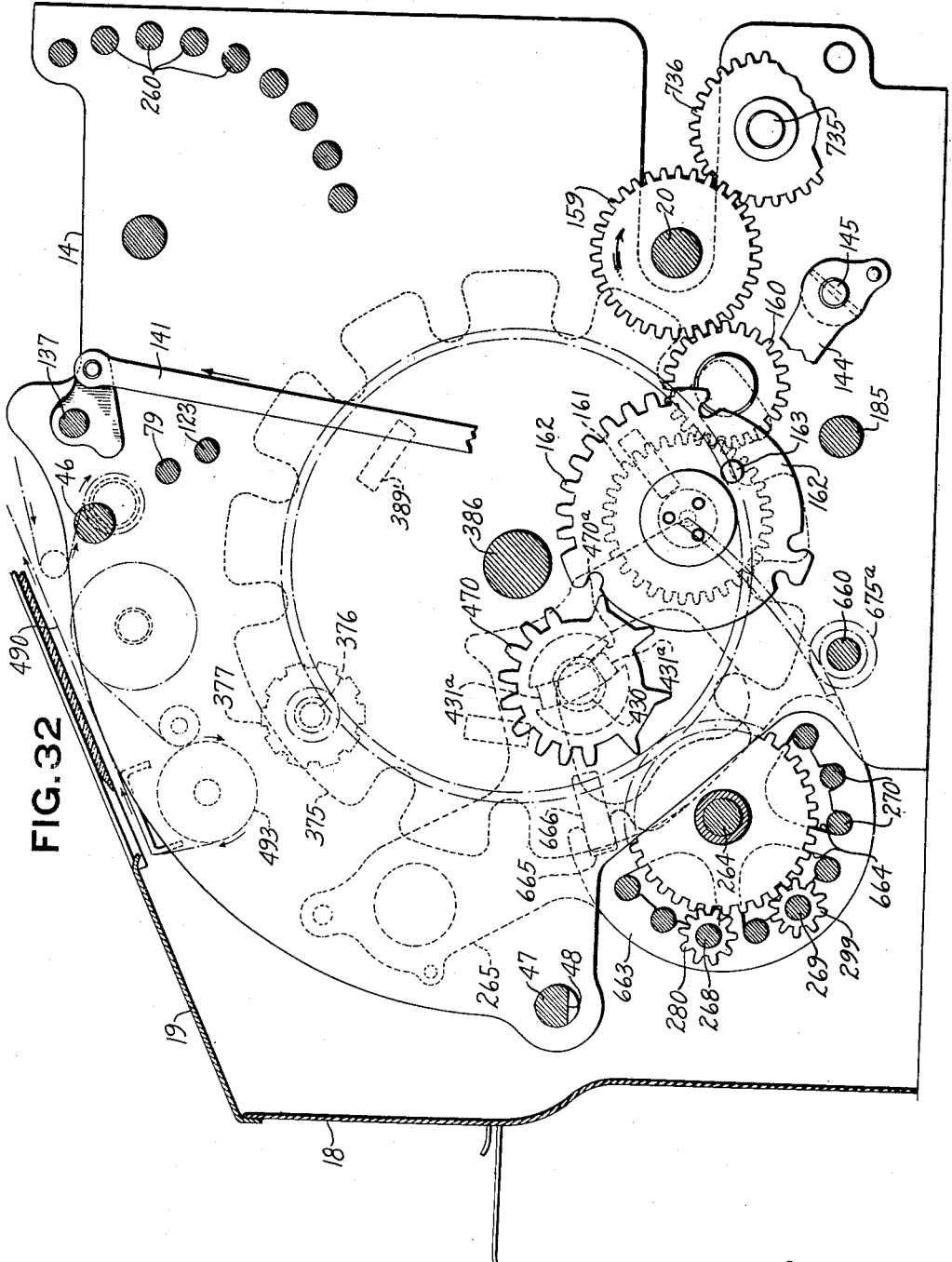
Fig. 32 is a sectional view taken on line 32—32 of Fig. 3 showing the driving mechanism for certain of the parts positioned within the totalizer reel.

Referring to Figs. 23 and 32, it will be seen that a pinion 159 is fixed to driving shaft 20. Pinion 159 meshes with an idler gear 160, which in turn meshes with a gear 161 fixed to an intermittent gear 162. Intermittent gear 162 carries a pin 163 which normally occupies a position a short distance below the lower arm 164 of a two-arm lever 165 (Fig. 23), which is loosely pivoted on shaft 20. The upper arm 166 of lever 165 is provided with an open slot 167 at its forward end which receives a pin 168 extending laterally from link 141. Intermittent gear 162 is driven in the direction of the arrow, shown in Fig. 23, and from the arrangement of the parts just described it is clear that near the end of a complete rotation of gear 162, pin 163 will engage arm 164, thereby rocking the same downwardly. By this action, arm 165 will move link 141 downwardly against the tension of spring 147. These parts are so constructed that by the engagement of pin 163 with arm 164 in this manner, rod 137 will be rocked in a clockwise direction substantially 20° beyond its normal position. When the parts have been thus moved, pin 163 will have moved out of engagement with arm 164 and spring 147 will restore the parts to normal position. By this movement of rod 137 beyond normal, the pins 154 provided on arms 155 shown in Figs. 30 and 31 will move across the slots 153 of their related levers 152. When pins 154 engage the left-hand wall of said slots, levers 152 will be rocked in a counterclockwise direction thereby rocking their associated bell crank levers 65 in a clockwise direction with the result that all of the detent plates 57 will be moved upwardly beyond their normal position to free the pins 53 from their normal position to free the pins 53 from their respective detents 62 and the springs 52 will then restore the depressed keys to normal position. When link 127 was elevated by arm 136 and held in its upper position by engagement of its lower end with roller 133, spring 169 rocked hook 138 in a counterclockwise direction so that the end of arm 136 reengaged the end of the hook when link 141 was drawn downwardly and released, thereby locking link 141 in normal position as shown in Fig. 23. A slot 142 provided at the lower end of link 141 permits a small movement of the link without a corresponding movement of lever 44.

Referring to Fig. 23 it is seen that a spring urged arm 170 is pivoted on a stud 171 located above the main driving shaft 20. A projection 172 provided at the lower end of arm 170, engages in a notch 173 provided in a cam 174. A pivoted locking pawl 175 is connected to arm 170 by a link 176. Locking pawl 175 is adapted to engage an arm 177 fixed to shaft 123 when the machine is operated by motor 21 or crank 22. The cam 174 is so designed that immediately upon rotation of shaft 20 pawl 175 will be moved into engagement with arm 177 and thereby lock shaft 123 against movement during an operation of the machine, as would be the case if the motor bar 43 was held depressed during the operation of the machine. A spring 170' is employed to restore arm 170 and the parts connected thereto to normal position.

The locking elements above described are also adapted to be controlled by movement of the control lever 180 (Figs. 74, 75, 76 and 78) toward sub-total and grand total positions. In these figures it is seen that a pitman 181 is pivoted at its upper end at 182 to a substantially horizontal arm 183 fixed to shaft 123. The lower end of pitman 181 is bifurcated to straddle a collar 184 provided on shaft 185. A cam plate 186 is fixed to shaft 185 and is adjusted by control lever 180 in a manner which will hereinafter be described. Plate 186 (Fig. 78) is formed with a plurality of radial slots 187a, 187b, and 187c, provided at the lower side of arcuate portion 188 thereof. Two radial slots 189a and 189b are provided along the outer periphery of arcuate portion 188. Pitman 181 is provided with a stud 190 which is adapted to move into any one of slots 187 depending upon the position of the control lever. The purpose for which slots 187 are provided will be fully described hereinafter. A second stud 191 is formed on the same side of pitman 181 as is projection 190 and is spaced therefrom a distance equal to substantially the width of arcuate portion 188. Cam faces 192 are provided at each side of portion 188 and are adapted to engage studs 190 and 191 to move pitman 181 downwardly when the control lever is moved to certain positions of adjustments. When the control lever is in the lock register or the subtotal position, stud 191 will register with slot 189a and when it is in grand total position, stud 191 will register with the slot 189b. It is seen from the construction of the parts just described that when the control lever is moved to lock register, sub-total or grand total position, pitman 181 is moved downwardly by the engagement of stud 190 with the inner cam face 192. This movement of pitman 181 rocks shaft 123 in a clockwise direction, thereby moving arm 124, Figs. 23, 24 and 25, in a clockwise direction so that the left-hand side thereof will assume a position beneath pin 126 provided on link 127. Upon movement of shaft 123 in this manner the lower arms 193, 195 and 196 (Fig. 14) of detents 86, 96, and 107, are brought into engagement with projections 194, 197, and 198 of release arms 83, 93, and 104, respectively, thereby locking all of the keys against operation. Upon depression of motor bar 43 (Fig. 23), link 127 will be moved to the left in the manner described heretofore, causing pin 126 carried thereby to move along the upper side of arm 124 and at the same time releasing hook 138 from engagement with arm 136 in the manner described hereinbefore. When hook 138 moves out of engagement with arm 136, spring 147 will urge link 141 upwardly with the result that arm 30 will be moved out of engagement with the motor switch control mechanism and the motor will again operate in the usual manner.

Mechanism is also provided to lock shaft 145 against movement until the totalizer reel has been properly positioned in bringing one of the totalizers and counters into printing position for a total taking operation.

The illustrated machine is also provided with mechanism for releasing any erroneously depressed keys before the machine has been released for operation. Referring to Figs. 1, 5, and 21, it will be seen that a lever 201 is pivoted on a stud 202 extending laterally from the outer side of supporting frame 12. Lever 201 carries a link 203 intermediate its ends, which is formed with an open cam slot 204. This cam slot also received a pin 205 fixed to supporting frame 12. Near the rearward end of link 203 a hook 206 is provided, which is adapted to engage a pin 207 attached to the lower end of depending arm 208 fixed to rod 137. The lower end of lever 201 is formed with a hook 209 which is adapted to move into engagement with a depending arm 210 fixed to shaft 123. It will be noted from Fig. 1 that a portion of lever 201 extends through a slot 211 provided in cabinet 18. Thus it is seen that in order to release the keys the operator simply grasps lever 201 and draws the same forwardly. By this action link 203 will be cammed upwardly, bringing the hook 206 provided thereon into engagement with pin 207 (see Fig. 21) carried by arm 208. Upon further movement of lever 201 in this manner shaft 137 will be rocked in a clockwise direction. By rocking shaft 137 in this manner detent plate 57 (Figs. 30 and 31) for each bank of keys will be moved upwardly by the train of connections shown, to release any depressed keys from their detent 62. The key spring associated with each of the depressed keys will return the latter to normal position. At the same time hook 209 (Fig. 21) will be moved into engagement with arm 210 and shaft 123 will be locked against movement. The concentric portion 203' provided at the outer end of link 203 permits movement of shaft 137 in a counterclockwise direction during a normal operation of the machine and therefore locks the lever 201 against movement when the parts are out of normal position.

As shown in Figs. 1, 27, 28 and 29, it will be seen that the bank of clerks' keys is also provided with a series of individual locks 214 one for each key. This mechanism is provided to prevent, in normal operations of the machine, anyone but the authorized clerk from depressing his key. These individual locks 214 are mounted on a plate 215 which is slidably supported on a pair of studs 216 and 217 (Fig. 27) provided near the top and bottom, respectively, of the differential latch retaining plate 61 associated with the clerk's bank of keys. Each lock 214 is attached to plate 215 by screws or other suitable means so that when it is desired to change a lock for some reason, it may be readily removed from plate 215 and another lock placed thereon. As shown in Fig. 28 each clerk's key 41 is provided with a laterally extending pin 218 which normally engages a projection 219 attached to the bolt of its corresponding lock. Thus in order to release his key the clerk simply inserts a key in the lock and rotates the bolt thereof to move the projection 219 out of the patch of pin 218 attached to a respective key 41. Mechanism is also provided whereby the proprietor or other authorized person may release all of the clerks' keys upon movement of the control lever 180 to one of its positions of adjustment. The mechanism for performing this function will be fully described hereinafter.

During rush hours it may be desirable to hold the motor bar 43 in depressed position so that it will only be necessary to depress a key in each group to release the machine for operation. To this end a lever 220 shown in Figs. 1, 74 and 75 is provided. This lever is pivoted on a stud 221 attached to the side frame 12, of the machine. The lower end of lever 220 is provided with a projection 622 which is adapted to engage in a notch 623 formed near the left end of the plate 43' attached to motor bar 43. The upper portion of lever 220 extends through a slot 224 provided in the top of the cabinet as shown in Figs. 1 and 74. It, therefore, is clear that by simply drawing lever 220 forward after the motor bar 43 has been depressed, projection 622 will enter notch 623 in plate 43' and the motor bar will thus be held in depressed position. In total taking operations, however, it is not desirable to hold the motor bar in a depressed position. To this end mechanism is provided for releasing lever 220 and holding the same in inoperative position. This mechanism is operated upon movement of the transmission frame when the control lever is moved to either sub-total or grand-total positions. The mechanism for performing this function will also be fully described hereinafter.

*Differential mechanism*

Figure 8:
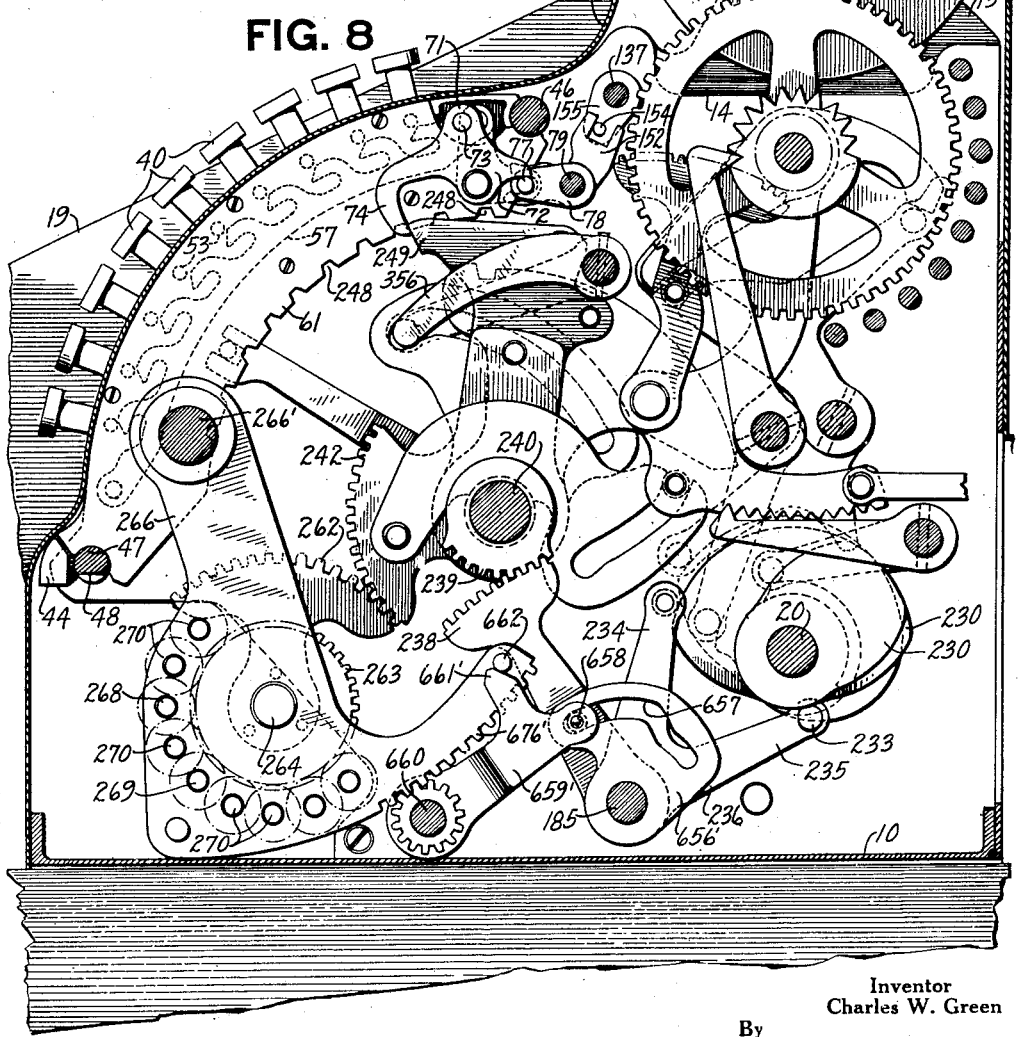
Fig. 8 is an elevational view taken on line 8—8 of Fig. 2.

The illustrated machine is provided with a mechanism for differentially positioning the various type carriers and actuating gears which is fully positive in operation. As is shown in Figs. 3, 4, 6, 8, 10 and 12, a cam 230 and its companion cam 231 are fixed to the main driving shaft 20 and cooperate with rollers 232 and 233 (Figs. 6, 10, and 12) provided, respectively, on arms 234 and 235 of a two-arm lever 236 loosely pivoted on shaft 185 (Figs. 8 and 10). Integral with lever 235 is a segmental gear 238 which meshes with a gear segment 239 fixed to shaft 240. Also fixed to shaft 240 is a series of driving segments 241, one for each bank of amount keys.

Since the structure and operation of the driving segments and the differential mechanism associated therewith is the same for all of the amount banks of keys a description of the structure and operation of one will suffice for all. For the purpose of illustration, a description of the differential mechanism associated with the units bank of keys will be given. Loosely mounted on shaft 240 adjacent driving segment 241 is a differential segment 242. As will be seen in Fig. 10, a pawl 245 pivoted to the upper portion of differential segment 242 at 245' is provided with a depending projection 246 at the forward end thereof which normally engages in a notch 243 provided near the forward end of its related driving segment 241. The forward end of pawl 245 is also provided with a projection 247 which is adapted to engage in any one of a series of notches 248 provided on the corresponding differential latch retaining plate 61. Fig. 8 shows the parts in normal position. In this position it will be noted that a nose portion 249 of differential segment 242 engages the depending arm 74 of the corresponding zero stop pawl 72. Thus, if no key in that bank is depressed, upon operation of driving shaft 20, cams 230 and 231 will rock lever 236 in a clockwise direction which, in turn, through segments 238 and 239 will rock the shaft 240 carrying all of the driving segments 241 in a counterclockwise direction. Immediately upon movement of shaft 20 as aforesaid, the differential segment 242 will be held against movement by the engagement of nose portion 249 thereof with the depending arm 74 of zero stop pawl 72 with the result that projection 246 (Fig. 10) of pawl 245 will be cammed out of the notch 243 in the segment 241, causing the upper projection 247 to enter into the first notch 248 in the differential latch retaining plate 61. The segments 241 continue their movement downwardly until they reach their limit of movement after which the cams 230 and 231 will return the segments to their normal positions. It will be noted that the segments 241 are provided with a surface 244 (Fig. 10) which is concentric with shaft 240 and provided to engage beneath projection 246 of pawl 245 to positively retain the pawl in engagement with notch 248 during the invariable movement of the driving segment 241. Upon return of the driving segment to normal position, notch 243 will again register with projection 246 and pawl 245 will drop into engagement therewith by gravity. When, however, a key is depressed in an amount bank, the depending arm 74 of zero stop pawl 72 will be swung out of engagement with nose 249 and the driver 241 associated therewith will carry the differential segment 242 downwardly until stopped by the particular key depressed.

When a key is depressed, a foot 58A (Fig. 10) on the segmental cam plate 58 associated therewith, will close the first notch 248 which normally is adapted to receive projection 247 of pawl 245 when the machine is operated and no key in the bank has been depressed. The lower end of each key has a cam face 250 and the forward end of each latch pawl 245 has a notch 251. Thus, it is clear that when a differential segment 242 is moved downwardly by its driving segment 241, the notch 251 provided in the associated pawl 245 will engage the end of the depressed key and will be cammed upwardly, as shown in Fig. 10, causing the upper projection 247 of pawl 245 to enter in a notch 248 adjacent the depressed key. In this manner the differential segment 242 will be disengaged from its driver 241, and will be held in adjusted position by virtue of the engagement of projection 246 of latch pawl 245 with the concentric surface 244 of the driver 241. During the same operation of the machine, each driver 241 will be returned to normal position, thereby causing the projection 253 provided at the forward end thereof to engage the projection 246 of its associated pawl 245. By this action projection 246 of pawl 245 will reenter notch 243 of its driving segment 241 and consequently, the associated differential segment 242 will also be returned to normal position. Thus, it is seen that during an item entering operation of the machine, the differential segments will first, be positively adjusted by their drivers a distance determined by the respective keys depressed, and then positively restored to normal position. Fig. 10 shows the parts associated with the pennies bank of keys in operated position when the five cent key has been depressed. The nose portion 249 of each differential segment 242 swings between a related retaining plate 61 and the key spring retaining plate 55 of the next adjacent key section. Thus, the differential segments are prevented from moving laterally.

The differential mechanism associated with the clerks' and transaction banks of keys is substantially the same as that associated with each of the amount banks with the exception that the drivers for the clerks' and transaction differential segments are not restored to normal position simultaneously with the restoration of the drivers for the amount differential segments. The clerks' and transaction banks of keys are not provided with zero stop pawls since the differential segments for these banks of keys will be operated for all transactions entered in the machine. For total taking operations the differential segments associated with the clerks' and transaction banks of keys will be held against movement by a mechanism which will be described hereinafter.

Figure 4:
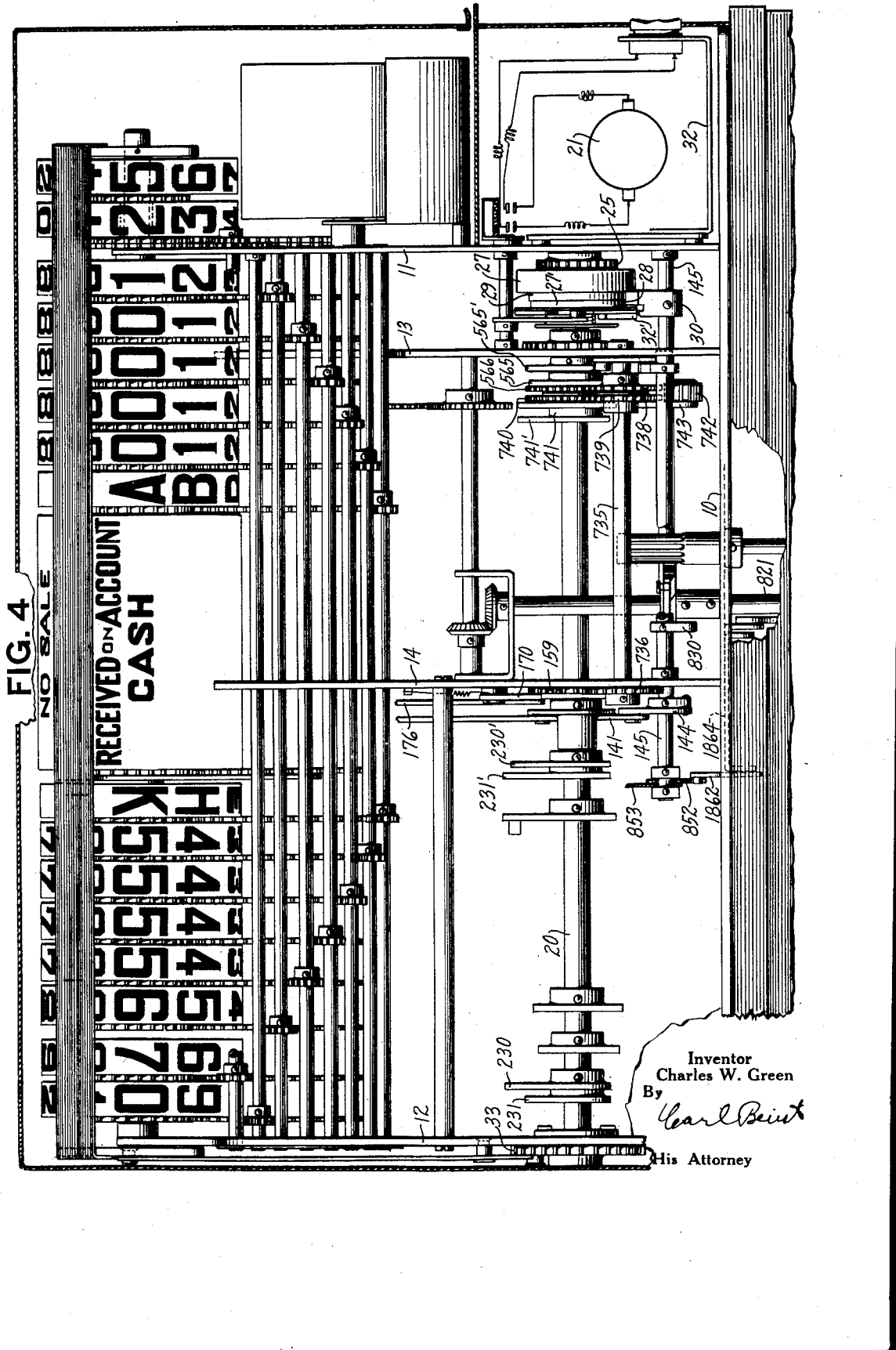
Fig. 4 is a rear elevational view of the machine with the back portion of the cabinet removed.
Figure 7:
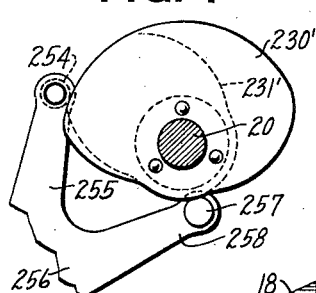
Fig. 7 shows the cams for operating the driving members for the clerks and transaction differential segments.
Figure 11:
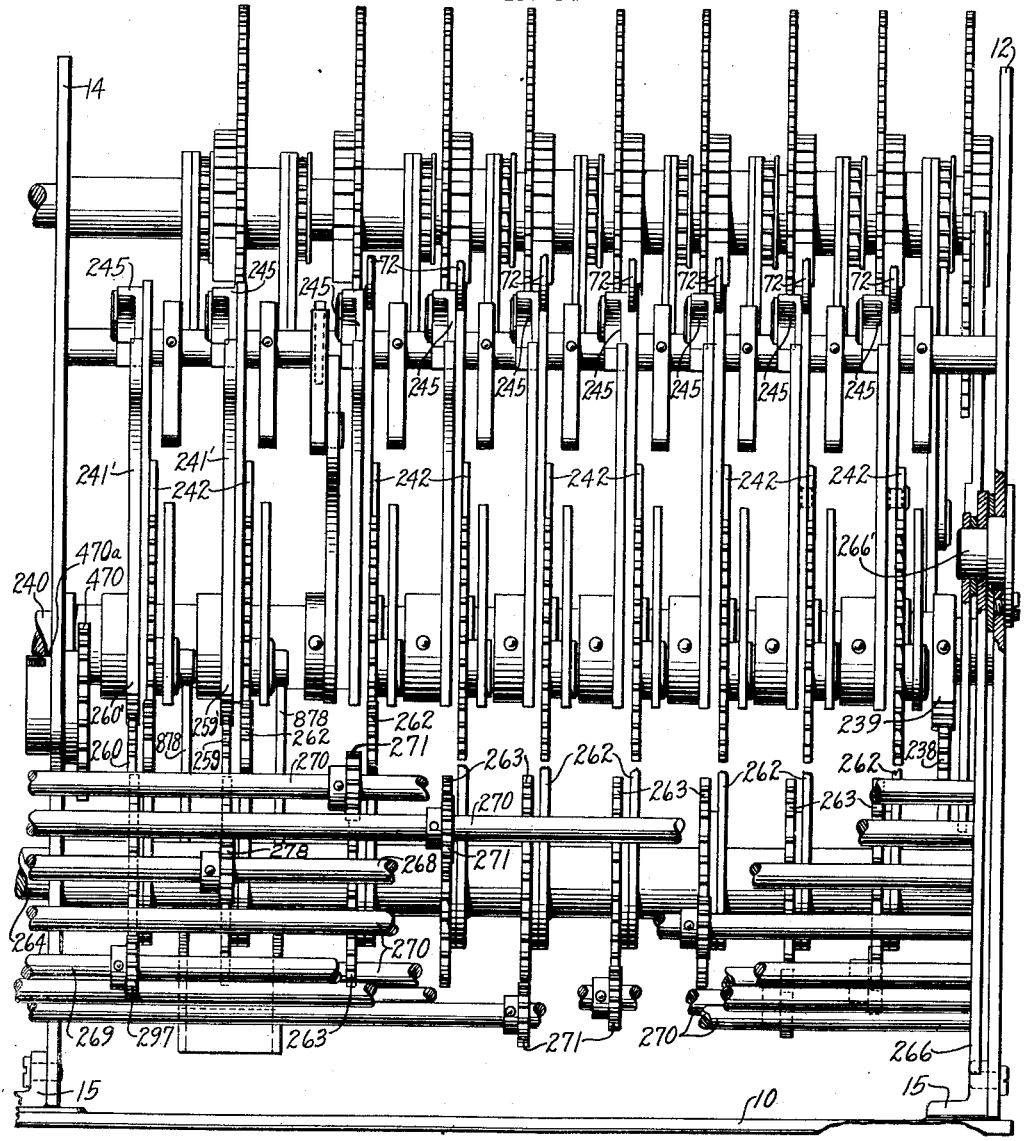
Fig. 11 is a partial front elevational view showing the differential mechanism and the associated transmission line.
Figure 12:
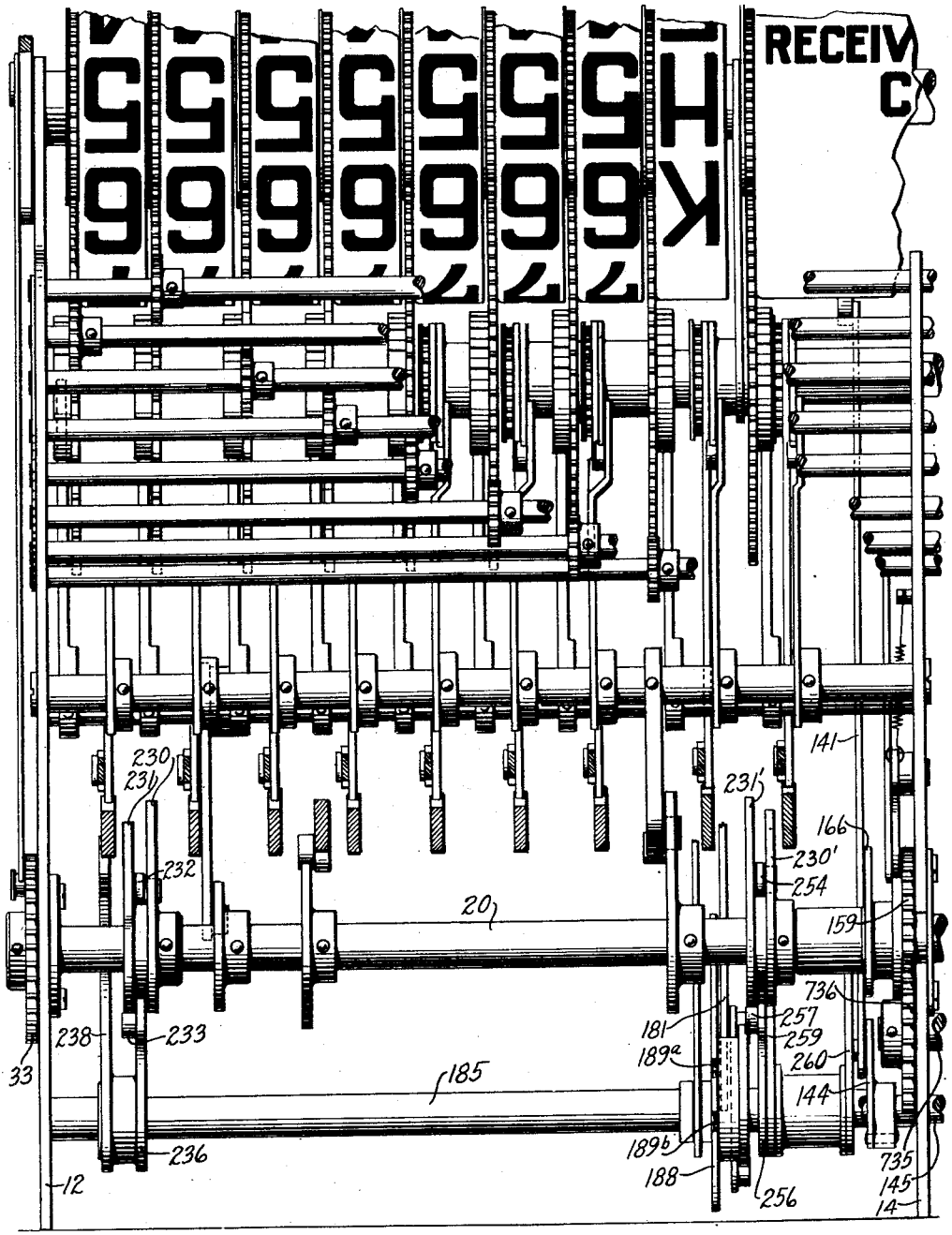
Fig. 12 is a partial rear elevational view showing the mechanisms located substantially to the rear of the differential mechanism.

Referring to Figs. 3, 4 and 11, it will be seen that a cam 230' and its companion cam 231' are provided for actuating the driving segments 241' for the clerks' and transaction differential segments 242. As will be seen in Fig. 7, these cams engage rollers 254 and 257 provided on arms 255 and 258 respectively of the two-arm lever 256. Lever 256 is also loosely pivoted on shaft 185. Integral with lever 256 are actuating segments 259 and 260 which mesh with gear segments 259' and 260' attached respectively to the drivers 241', see Figs. 11 and 12. Driving segments 241' are loosely mounted on shaft 240. Thus, it is seen that when shaft 20 is rotated, the driving segments 241' for the clerks' and transaction differential segments 242 will also be actuated to drive those segments the proper amounts. Cams 230 and 230' and their companion cams are so designed that both the driving segments for the amount differentials and those for the clerks' and transaction differentials will be moved downwardly at substantially the same time. However, as was pointed out before, the clerks' and transaction drivers will remain in their operated positions for a certain period while the drivers associated with the amount differentials are restored to normal position. During a later period in the operation of the machine, the drivers 241' will also be restored to normal position which, in turn, will restore their respective differential segments also to normal position.

Figure 2:
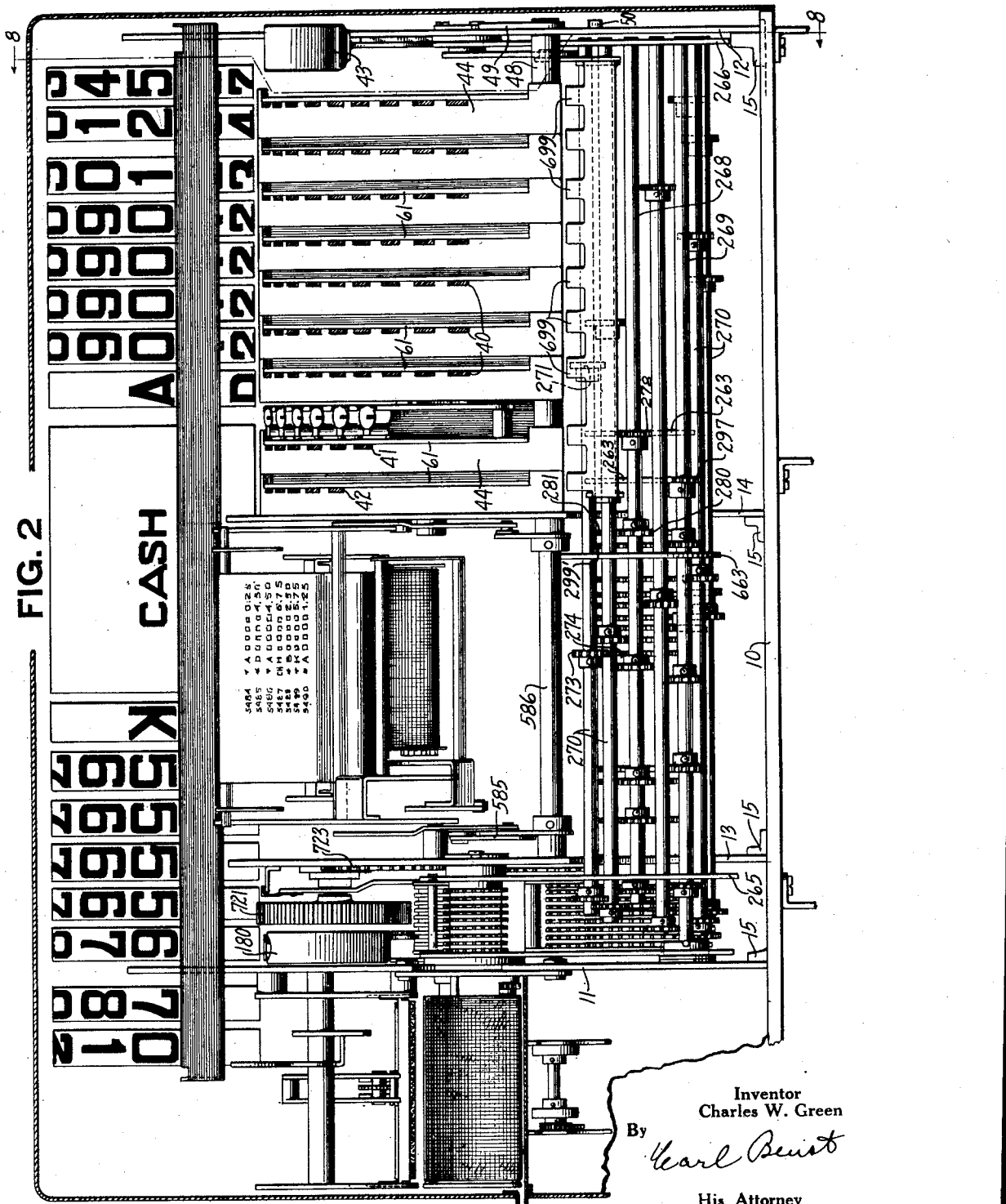
Fig. 2 is a front elevational view with the front portion of the cabinet removed, showing the general arrangement and location of various of the mechanisms contained in the machine.

Referring to Fig. 8 it will be seen that each differential segment 242 meshes with a segmental gear 262 which is fixed to a corresponding gear 263 loosely pivoted on a shaft 264 journaled in the frames 265, 266 and 1014 (Fig. 2). The transmission mechanism comprises nine shafts journaled in frames 265 and 266 which are mounted in an arc about gears 263 (see also Figs. 75 and 76). Frames 265 and 1014 (Fig. 2) are pivoted around shaft 1012 (Fig. 76) while frame 266 is pivoted on a stud 266' (Figs. 8, 75 and 77) fixed to supporting frame 12 (Fig. 2) and in axial alignment with shaft 1012. As shown in Figs. 2 and 11, it is seen that shaft 268 is provided to transmit motion from the differential segment associated with the clerk's bank of keys while shaft 269 is provided to transmit motion from the transaction differential segment. The shafts 270 of the transmission mechanism transmit motion from their respective amount differential segments 242 to the totalizers.

Referring to Figs. 2, 3 and 11, it will be seen that the top shaft 270 is that associated with the tens of thousands bank of amount keys. Pinned to this shaft is a pinion 271 (Fig. 11) which meshes with a gear 263 loosely mounted on shaft 264, which gear in turn, has a segment 262 fixed thereto which meshes with the differential segment 242 for the tens of thousands bank of keys. Spaced from pinion 271 is a second pinion 273 which is also pinned to shaft 270. This pinion meshes with a gear 274 similar to gear 263, and is also loosely mounted on shaft 264. Gear 274 meshes with a large gear 275 (Fig. 3) provided in the totalizer reel for adjusting the item type carriers and for actuating the totalizer element for the tens of thousands denominational order.

Each shaft 270 associated with an amount differential segment 242 is provided with a similar set of pinions for actuating corresponding gears in the totalizer reel.

The shaft 268 (Fig. 2) associated with the clerk's differential segment 242 is provided with six small pinions fixed thereto. However only those cooperating to select totalizers will be considered in this case. The first pinion 278 meshes with a gear 263 (Fig. 3) loosely mounted on shaft 264. Gear 263 has fixed thereto a segmental gear 262 which meshes with the differential segment 242 for the clerks' bank of keys. Spaced from pinion 278 on shaft 268 is a second pinion 280 also fixed to said shaft, which meshes with a gear 281 (Figs. 3 and 34), loosely mounted on shaft 264, which gear in turn meshes with gear segment 282 on the selecting plate 283 for selecting a clerk's totalizer for operation.

From the description of the above mechanism, it is clear that when gear 263 (Figs. 2 and 3) is adjusted by the clerk's differential segment 242, shaft 268 will be rotated which in turn will cause the pinions described to rotate and transmit the motion from the differential segment 242 to the mechanisms just described.

The shaft 269 associated with the transaction differential segment 242 has five pinions fixed thereto, but only those relating to totalizer selection will be considered in this case. The first pinion 297 meshes with a corresponding gear 263 loosely pivoted on shaft 264 which gear has fixed thereto a gear segment 262 which meshes with differential segment 242 for the transaction bank of keys. Spaced from pinion 297 is a second pinion 299 which meshes with a corresponding gear 299' loosely mounted on shaft 264, which gear in turn meshes with a gear segment integral with selector plate 300 (Fig. 3) for the transaction totalizers.

Thus, it is seen that when an amount key, a transaction key, and a clerk's key are depressed and the machine operated, the movement of the differential segments associated therewith will be positively transmitted to the various selecting mechanisms of the machine through the transmission line just described. For total taking operations the entire transmission line is swung out of engagement with the gears associated therewith by movement of the control lever to a total taking position. The mechanism for performing this function will be described in detail hereinafter.

Totalizer reel

In the illustrated machine there are six clerks' totalizers 372 (Figs. 33 and 34), four transaction totalizers 373, and one grand totalizer 374. Fig. 34 shows the arrangement of the totalizers and counters in the reel.

The A totalizer for registering the cash and received on account transactions effected by the A clerk is located substantially at the top of the reel. To the right thereof are arranged the B, D, E, H, and K totalizers for registering similar transactions effected by the B, D, E, H and K clerks, respectively. Next in order is the paid out totalizers for registering the total of the paid out transactions. Adjacent the paid out totalizer is the charge totalizer for registering the total of all charge transactions entered in the machine, and adjacent the charge totalizer is positioned the grand totalizer which registers the total of the cash and received on account transactions effected in the machine. Next in order is the no sale counter for registering the number of no sale transactions effected in the machine. Next to the no sale counter is mounted the received on account totalizer for registering each received on account transaction effected in the machine. Next in order is the cash totalizer for registering each cash transaction effected in the machine.

Figure 57:
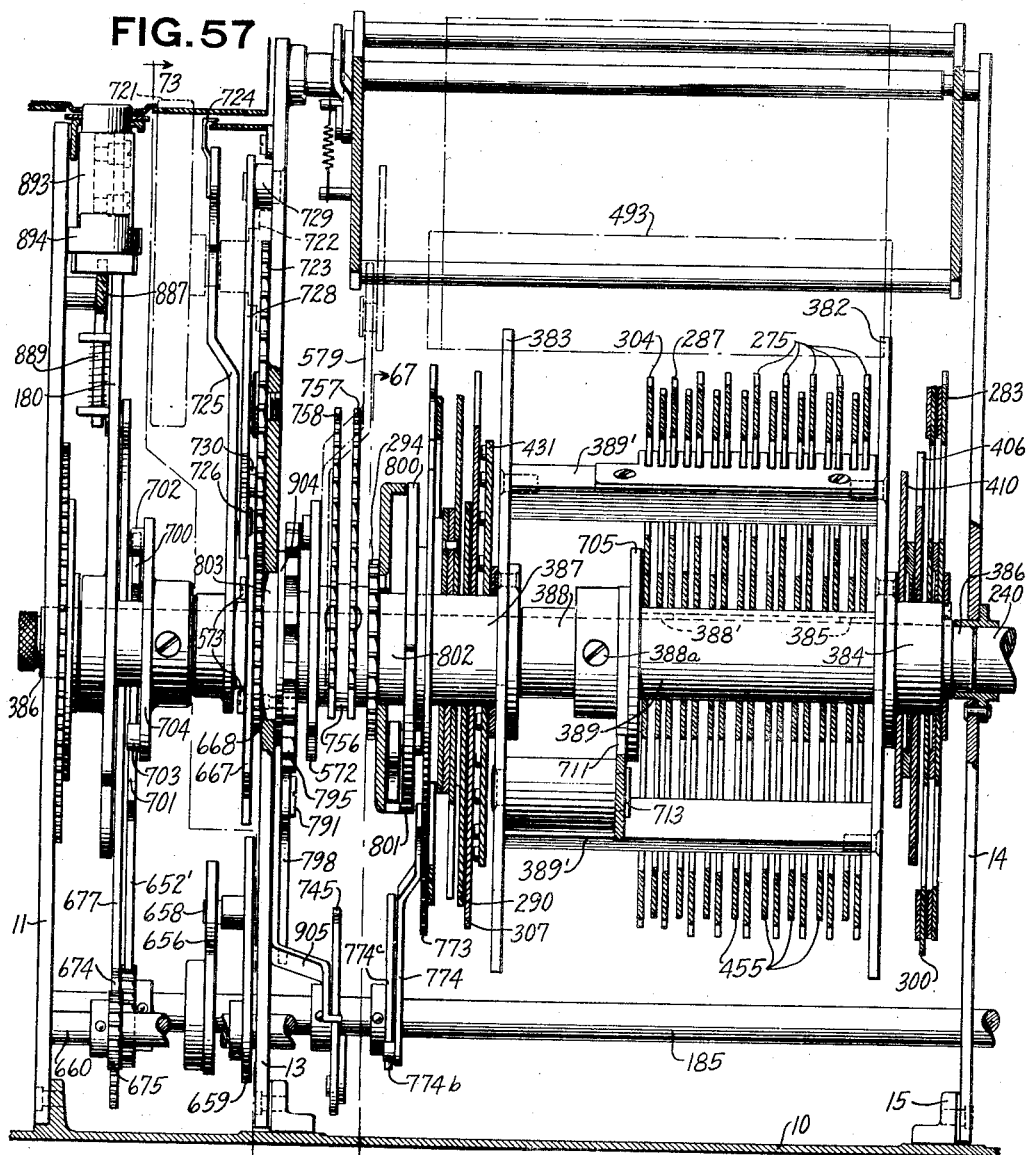
Fig. 57 is an elevational view taken substantially through the mid-portion of the totalizer reel, showing the relative positions of the various control mechanisms for the machine.

The structure of the reel in general will now be described in detail. The reel in general is indicated by the reference numeral 375 and comprises a pair of spaced end plates 382 and 383. End plate 382 has fixed thereto a sleeve 384 which extends to the right-hand side thereof, as is shown in Fig. 57. A reduced portion of the sleeve 384 extends through an aperture in end plate 382, Fig. 37. Sleeve 384 is mounted on a shaft 386 which extends through the center of the reel and which is journaled in side frames 11, 13 and 14, in axial alinement with shaft 240, as shown in Figs. 3 and 57. Fixed to the inner side of end plate 383 (Fig. 57) is a comparatively long sleeve 387 which extends through an aperture in said plate 383. The reduced portion of sleeve 387 extending the right of end plate 383 receives the end of a sleeve 388. A screw 388a passing through the enlarged portion of sleeve 388 fastens the latter to shaft 386. The reduced portion 388' of sleeve 388 extends to the right of the enlarged portion just mentioned. A relatively long sleeve 389 is loosely mounted on shaft 386. The inner diameters of the end portions of this sleeve are enlarged to receive the reduced portions 385 and 388', respectively, of sleeves 384 and 388. The actuating gears 275, 287 and 304, and the transfer plates 455, provided for actuating the totalizers and type carriers supported in the reel, are loosely mounted on sleeve 389. The purpose of providing this series of interconnecting sleeves is to permit shaft 386 to be removed without causing the inner mechanism supported thereby to drop out of engagement with the reel proper. When the shaft 386 is removed, the entire reel may be lifted from the machine as a unit.

Figure 46:
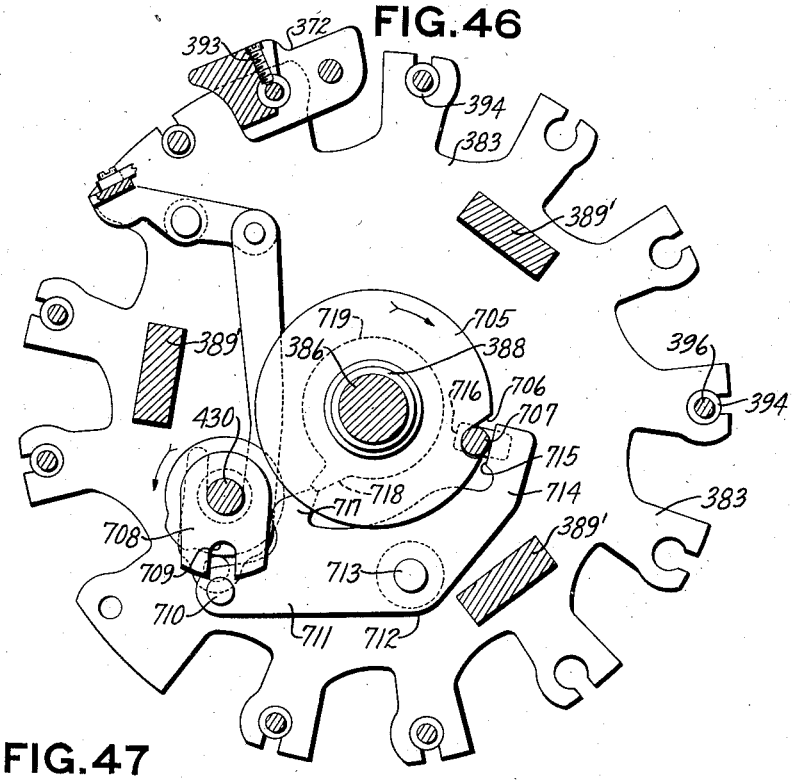
Fig. 46 is a sectional view taken substantially on line 46—46 of Fig. 44 showing the aligning mechanism for the item and special type carriers and the mechanism for automatically locking the moving parts within the reel when the machine is conditioned for total taking.

The end plates 382 and 383 of the reel are rigidly connected by three tie bars 389'. The shaft 376 which supports the item type carriers 377 (Figs. 33 and 34), the special type carriers 378 and 379 (Fig. 34), and the consecutive number counter 380, extends through alined apertures 390 (Fig. 35) provided in the end plates 382 and 383. Each totalizer frame carries a stud 391 at the right-hand end thereof which is received in an aperture 392 provided in end plate 382. A similar stud 391 is provided at the left-hand side of each totalizer frame and is adapted to be inserted in a slot 393 provided in end plate 383. The lower end of each slot 393 is substantially circular in form and has a diameter slightly larger than that of the stud 391. Thus, in order to properly place a totalizer frame in the reel, it is only necessary to insert stud 391 into its respective aperture 392 and then lower stud 391 at the left-hand end of the frame into the slot 393. A collar 394 (Fig. 46) is then placed on the stud 391 and pressed into the enlarged opening of the slot 393. This collar is held in place by any suitable means, such as a screw 393a. Thus, the totalizer frame is properly held in place. A notch 395 (Fig. 35) is provided adjacent each aperture 392 of end plate 382 for receiving the totalizer shaft 396 of a respective totalizer. A similar notch 397 is provided in plate 383 in alinement with notch 395. This permits the totalizer shaft 396 to be rocked into and out of engagement with the actuating gears 275. The particular construction of the totalizer and totalizer frame is of the well known type fully disclosed in the patent to Charles W. Green No. 1,793,795 and therefore will not be described in detail herein. All of the totalizer frames are placed in the reel in the manner just described.

The mechanism for selecting and engaging the totalizers with the actuating gears 275 will now be described in detail. The totalizer selecting mechanism provided in the illustrated machine is so constructed that for certain transactions a clerk's, a transaction, and the grand totalizer will be selected and simultaneously engaged with the actuating gears 275. For other transactions, only a transaction totalizer will be engaged with the actuating gears 275, mechanism being provided for holding out the selected clerk's totalizer and the grand totalizer for such transactions. The selecting mechanism is of such a character that by slightly modifying the same any number of the totalizers may be selected and simultaneously engaged with the actuating gears. For the purpose of illustration, however, the mechanism shown is capable of causing simultaneous operation of one or three of the totalizers. Referring to Fig. 2, it will be seen that after depressing a key in each group and then releasing the machine for operation, the movement of the differential segment 242 associated with the clerks' bank of keys will be transmitted through shaft 268 and pinion 280, which pinion as has been described hereinbefore, engages a gear 281 of the transmission line. Gear 281 meshes with a gear segment 282 (Fig. 34) integral with selector plate 283 for clerks' totalizers. This selector plate (Figs. 34 to 42) is provided with a series of radially extending projections 398, one for each clerk's totalizer. Each projection 398 is adapted to be positioned beneath an ear 399 formed on a related rock arm 400 which pivots about a stud 401 (Fig. 34) fixed to end plate 382. When a projection 398 registers with a related ear 399 the associated rock arm 400 is prevented from rocking in a clockwise direction about its pivot 401. A floating lever 402 is pivoted at the upper end thereof at 403 to a related arm 400. The other end of lever 402 (Fig. 35) is provided with a laterally extending stud 404 which is adapted to engage in a corresponding radial notch 405 provided in plate 406. A cam slot 407 is provided intermediate the ends of lever 402 and receives a pin 408 mounted intermediate the ends of an arm 409 (Fig. 42), which arm is pivoted on plate 410 at 411. The upper end of arm 409 is provided with a closed cam slot 412 which receives the right-hand end of a corresponding totalizer shaft 396. There are a series of such arms 409 pivoted on plate 410, one for each clerk's totalizer. There is also a similar arm 413 pivoted near the lower end of plate 410 for the grand totalizer. The plate 410 is normally latched to end plate 382 by the following mechanism.

Figure 38:
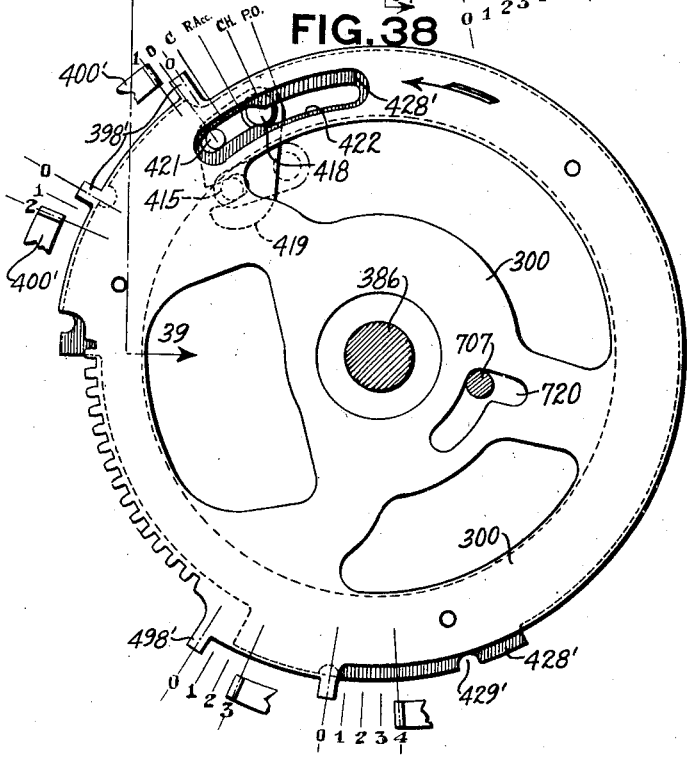
Fig. 38 is a detail view showing the selector plate associated with the group of transactions totalizers.
Figure 39:
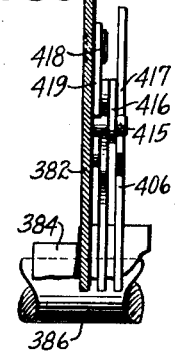
Fig. 39 is a sectional view taken substantially on line 39—39 of Fig. 38.

Referring to Figs. 35, 40 and 42, it will be seen that an L-shaped slot 414 is provided in end plate 382 which slot is adapted to receive one end of a stud 415 fixed to an arm 416 pivoted at 417 to plate 410. Pivoted on a stud 418 extending outwardly from end plate 382 is a plate 419. This plate is provided with an open slot 420 at the free end thereof which receives pin 415. A stud 421 is also provided on plate 419 which projects into a cam slot 422 formed in plate 428', as shown in Figs. 35 and 38. It will also be noted that pin 415 extends through the arm 416 and is adapted to engage in a notch 423 provided in plate 406. When, however, stud 415 is moved to the upper portion of slot 414, the projecting portion thereof will be moved out of engagement with notch 423. The selector plate 306 for the transaction totalizers is also provided with a series of radial projections 398', each of which is adapted to be positioned beneath an ear 399 of a corresponding rock arm 400'.

It will also be noted that the rock arms 400', levers 402', and the associated parts are similar in construction to those described in connection with the clerks' totalizers and, therefore, it will not be necessary to describe these parts in detail.

The arms 409 associated with the transaction totalizers, however, function in a slightly different manner from the arms 409 associated with the clerks' totalizers. In Figs. 35, 40 and 42, it will be seen that the arms 409 associated with the transaction totalizers are pivoted to end plate 382 at 424. These arms are attached to plate 382 because it will be remembered that a transaction totalizer will always be rocked into engagement with the actuating gears 275 regardless of whether a clerk's totalizer or the grand totalizer is rocked into engagement therewith.

The grand totalizer 374 is always selected for operation in spite of the fact that for certain transactions it is held out of engagement with the actuating gears. No projection 398 is provided on the selector plates for this totalizer. Instead, a laterally projecting pin 425 is provided on end plate 382, which projection is always in engagement with the ear 426 provided on rock arm 427, as shown in Figs. 34, 40 and 42. The other connections cooperating with rock arm 427 are similar to those associated with the clerk's totalizer and need not be further described.

Figure 36:
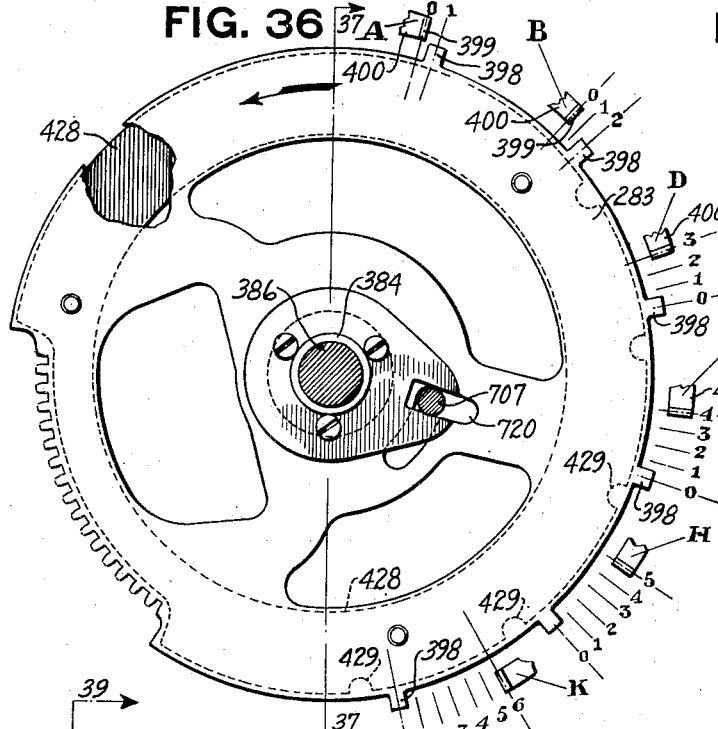
Fig. 36 is a detail view showing the selector plate associated with the group of clerks' totalizers.
Figure 37:
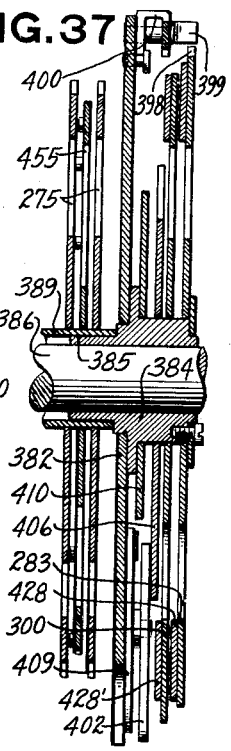
Fig. 37 is a cross-sectional view of a portion of the totalizer reel taken substantially on line 37—37 of Fig. 36, showing the location of the selector plates and related parts.

Referring to Figs. 36 and 37, it will be seen that a circular plate 428 is attached to selector plate 283 by screws or rivets. This plate is provided with a plurality of notches 429, one of which is positioned adjacent each totalizer shaft 396 when that totalizer is selected for operation. It will be noted that this plate has a diameter slightly less than that of the concentric portion of the selector plate 283. A similar plate 428' is fixed to the selector plate 300 associated with the transaction totalizers and also is provided with a similar series of notches 429', see Fig. 38. These notches are provided to receive the end of a selected totalizer shaft when the latter is rocked into engagement with the actuating gears 275. As shown in Figs. 35, 44 and 45, a cam shaft 430 is journaled in end plates 382 and 383, a portion thereof extending beyond the outer extremities of plate 382. A cam 431, and its companion cam 431', are fixed to shaft 430 (Figs. 34 and 40), and are adapted to cooperate with pins 432 and 433, respectively, attached to plate 406. Thus, it is seen that when shaft 430 is rotated by a mechanism which will be described in detail hereinafter, plate 406 will first be rocked in a counterclockwise direction, which movement causes engagement of selected totalizers with the actuating gears 275. Later, during the same cycle of movement of shaft 430, plate 406 will be rocked in the reverse direction and thereby disengage the selected totalizers from their actuating gears.

The operation of the various mechanisms just described is as follows:

Upon depression of a key in each group and of the motor bar, the differential movement of the segments 242 (Fig. 8) associated with the various banks of keys will be transmitted through the transmission line to the actuating gears 275 (Fig. 3), 287 and 304 of the reel. The motion of the differential segments 242 associated with the clerks' and transaction banks of keys, respectively, will also be transmitted to selector plates 283 and 300 respectively (Fig. 35), thereby adjusting these plates to bring a projection 398 and 398' respectively, beneath the ears 399 of rock arms 400 and 400' (Fig. 34), associated with the clerks' and transaction totalizers. If the transaction be cash or received on account, both the selected transaction totalizer and the selected clerk's totalizer will be rocked into engagement with the actuating gears. The grand totalizer 374 will also be rocked into engagement with the actuating gears for these transactions. After selector plates 283 and 300 (Fig. 35) have been positioned as aforesaid, shaft 430 will be rotated, causing the cam 431' to rock plate 406 (Figs. 34 and 40) in a counterclockwise direction. By this action levers 402 of the totalizers to be engaged will be rocked in a clockwise direction about their pivots 403 since their respective rock arms 400 are held against clockwise movement. Cams 407 provided in the respective levers 402 engaging pins 408 will rock arms 409 for the selected clerks' and transaction totalizers, and arm 413 for the grand totalizer in a counterclockwise direction about their pivots 411 and 424 (Fig. 42), with the result that cams 412 provided at the upper ends thereof will cam totalizer shafts 396 downwardly to bring the gears attached to the totalizer wheels into engagement with their related actuating gears 275.

If, however, the transaction is paid out or charge, selector plate 300 (Fig. 38) will be moved a greater distance in a counterclockwise direction causing the cam portion of slot 422 provided in plate 428' attached thereto, to rock plate 419 (Fig. 42) downwardly about its pivot 418 with the result that the pin 415 on arm 416 will register with the elongated portion of slot 414 (Fig. 35) provided in end plate 382. At the same time, the portion of pin 415 projecting from the opposite side of arm 416 will enter into notch 423 of plate 406 (see also Fig. 40). Thus, it is seen that plates 406 and 410 are coupled together and will move in unison when the machine is operated with the result that arms 409 for the clerks' totalizers and 413, which it will be remembered are pivoted to plate 410, will rock about their totalizer shafts 396 as pivots. It is therefore seen that cam slots 412 provided at the upper ends of arms 409 and arm 413, respectively, will be rendered ineffective to cam their respective totalizers into engagement with the actuating gears. As stated before, the plates 428 and 428' (Figs. 36 and 38) attached respectively to selector plates 283 and 300 are provided with notches 429 and 429' respectively. These notches are adapted to register with the totalizer shafts of the selected clerks' and transaction totalizers, respectively, so that when plate 406 (Fig. 40) is rocked in the manner just described, the end portion of the shafts for the selected totalizers will enter these notches. All of the other shafts of the unselected clerks' totalizers however will ride on the concentric portion of plate 428 (Fig. 36) while the shafts of the unselected transaction totalizers will ride on the concentric portion of plate 428' (Fig. 38). Thus, it is seen that these totalizers will be positively held out of engagement with the actuating gears.

It is understood that the radial projections 398 (Fig. 36) provided on selector plate 283 are so arranged that only one will register with its respective ear 399 provided on rock arm 400 when the selector plate is differentially adjusted. All of the other projections will be out of registering position with their respective ears 399. The same is true with respect to the projections 398' (Fig. 38) provided on selector plate 300. Consequently, when plate 406 is rocked in the manner aforesaid, rock arms 400 and 400' for the unselected totalizers will not be held against movement by their respective projections 398 and 398', with the result that these arms 400 and 400' will be rocked in a clockwise direction about their respective pivots (see Fig. 40). As stated before, the totalizer shafts for the unselected totalizers will not register with the notches 429 or 429' of plates 428 and 428', but engage the concentric portions thereof and thus are positively held out of engagement with the actuating gears. It is clear however, that if rock arms 400 and 400' were not permitted to move in a clockwise direction when their respective totalizers are not selected for operation, damage to the parts would result when plate 406 is rocked to engage the selected totalizers with the actuating gears 275 due to the camming action of cam slots 407 provided in the floating levers 402 acting upon their related pins 408 fixed to arms 409.

Referring to Fig. 36, it will be seen that the radially extending projections 398 on selector plate 283 are so arranged that when this plate is moved through substantially 3° in a counterclockwise direction as viewed in Fig. 36, the first projection 398 will register with the ear 399 associated with the A totalizer. When the selector plate is moved through substantially 6°, the second projection 398 will register with ear 399 associated with the B totalizer, and when plate 283 is moved through substantially 9°, the third projection 398 will register with the ear 399 associated with the D totalizer. Thus, it is seen that any one of the six clerks' totalizers may be selected by moving selector plate 283 from 3° to 18°. Fig. 38 shows the positions to which the selector plate 300 for the transaction totalizers may be adjusted to select any one of those totalizers for operation.

When selector plate 300 is moved through substantially 3° in a counterclockwise direction the cash totalizer will be selected for operation. When this plate is moved through substantially 6°, the received on account totalizer will be selected, when moved through substantially 9°, the charge totalizer will be selected, and when the plate 300 is moved through substantially 12°, the paid out totalizer will be selected. From the construction of the plates 283 and 300, it is clear that only the ears 399 on rock arms 400 and 400' for the selected totalizers will register with their respective projections 398 and 398'. All of the other projections 398 and 398' will be positioned out of registering position with their ears 399. Consequently, arms 400 and 400' for the unselected totalizers will be caused to rock in a clockwise direction about their respective pivots and only the selected totalizers will be engaged with the actuating gears. It will also be noted that each rock arm 400 and 400' is provided with a projecting portion 430' (Fig. 40) which is adapted to engage over its respective totalizer shaft 396. These projections are provided to prevent overthrow of arms 400 when the parts just described are restored to normal position.

Printing mechanism

The mechanism for effecting printing upon the record strip is mounted in unitary supports and is so constructed that it may be readily placed in the machine or removed therefrom as a unit. This mechanism is adapted to print sub-totals and grand totals from each of the totalizers mounted in the reel. However only that part of the printing mechanism relating to sub-total grand total printing is shown and described herein, and then but very briefly. Reference may be had to the parent case, now Patent No. 2,063,091, for a more detailed illustration and description of the whole printing mechanism.

Referring to Figs. 4 and 63, it will be seen that a cam 565 and its companion cam 565' are attached to a gear 566 loosely mounted on driving shaft 20. Gear 566 (Fig. 63) meshes with a pinion 738 fixed to a shaft 735 journaled in supporting frames 13 and 14. Shaft 735 has pinned thereto a second pinion 736 (Figs. 4 and 32) which meshes with a gear 159 fixed to the main driving shaft 20 as previously described. Thus it is seen that upon operation of main driving shaft 20 movement will be imparted to cams 565 and 565' to actuate the mechanisms for shifting and feeding the record strip and also the mechanism for effecting printing thereon. Cams 565 and 565' engage rollers 567 and 568 provided on arms 569 and 570, respectively, of a segmental gear 571 pivoted on shaft 753. Segmental gear 571 meshes with a segmental gear 572 which is loosely mounted on sleeve 387 provided on shaft 386. The upper portion of segment 572 is provided with a cam slot 574 which receives a stud 575 provided on the lower arm 576 of a bell crank lever 577 pivoted on a trunnion 578 fixed to frame 13. The upper arm 579 of bell crank lever 577 is provided with an open slot 580 which receives a laterally extending stud 581 fixed to slidable member 535 (Fig. 63). A laterally projecting stud 582 is also provided on segment 572 to which is pivoted the rearward end of a link 583. The forward end of link 583 is pivoted to a stud 584 provided at the upper end of an arm 585 fixed to a shaft 586. Shaft 586 is journaled in the frames 13 and 14 as is clearly shown in Fig. 60. Intermediate the ends of arm 585 is an inwardly extending stud 587 which engages in an open slot 588 provided in the lower arm 589 of a bell crank lever 590 pivoted on an inwardly extending stud 590' fixed to supporting frame 13. The upper rearwardly extending arm 591 of lever 590 is bifurcated to receive platen shaft 503. Also pinned to shaft 586 is a second arm 592 (Fig. 63) having a stud 593 in axial alinement with stud 587 on arm 585. Stud 593 operates in an open slot in the lower arm 594 of a lever 595 similar to that provided at the lower end of lever 590. Lever 595 is pivoted on a stud 595' extending inwardly from frame 14 (Fig. 60) and has an arm 596 (Fig. 63) which also is provided with a bifurcation 597 for receiving the platen shaft 503. The two arms 590 and 595 are provided to equalize the movement of the platen 493. Thus it is clear that when cams 565 and 565' are operated by gear 566, segment 572 will be rocked in a counterclockwise direction as viewed in Fig. 63, with the result that bell crank 577 will also be rocked in a counterclockwise direction which, through its connection with sliding member 535, will move the same forwardly to shift the record strip 490 to printing position. At this time stud 575 will enter the dwell 574' of cam slot 574 and the record strip will be held in shifted position. Dwell 574' is provided so that the record strip 490 will be held stationary during a printing operation. As segment 572 is rocked in a counter clockwise direction, as aforesaid, shaft 586 will also be rocked in a counterclockwise direction due to the engagement of link 583 with arm 585. This motion is transmitted to the platen shaft by levers 590 and 595 respectively. The parts are so constructed that when the paper has been shifted to printing position and stud 575 has entered the dwell 574' in slot 574, platen 493 will also have been rocked downwardly to a position slightly above the type carriers. At substantially the time that the record strip 490 has been brought to rest in shifted position, further movement of segment 572 will cause platen 493 to be brought into engagement with the type carriers thereby effecting a printing impression upon the record strip. When segmental gear 572 is rocked in the reverse direction it is seen that because of the dwell 574' provided in cam slot 574, the platen will be moved out of engagement with the type carriers before the record strip 490 will be shifted in the reverse direction. When the cam portion of slot 574 reaches stud 575 the record strip will be shifted in the reverse direction and at the same time the platen will be restored to normal position.

Total printing

When the machine is operated for item entering operations, as has been described hereinbefore, the selection of totalizers in the totalizer reel is effected by properly adjusting selector plates 283 and 300 (Fig. 35), but the reel itself remains stationary. In total taking operations, however, it is necessary to rotate the reel to bring each totalizer to printing position in order to effect printing therefrom. Before the reel can be rotated, it is necessary to swing the transmission line, which it will be remembered normally transmits the motion of the differential segments to the actuating gears of the reel, so that it will not interfere with the movement of the reel. It is also important that the actuating gears, the transfer plates, and the cam shaft provided within the reel be locked against movement when the reel is rotated so that these parts will not vary from normal position during total taking operations. The mechanisms controlling total printing will now be described in detail.

Figure 47:
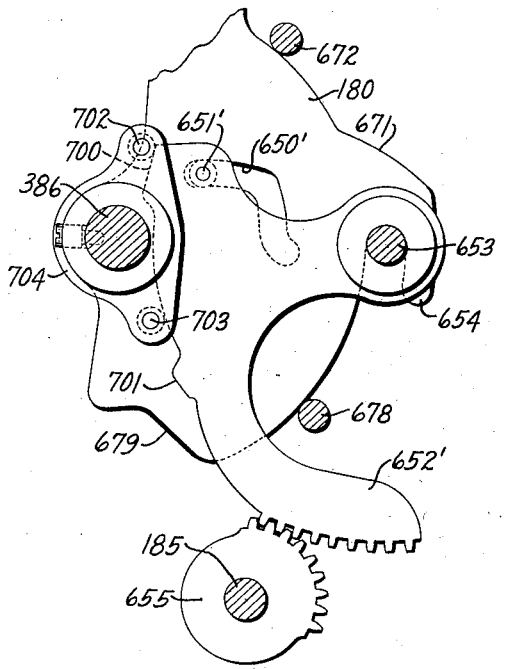
Fig. 47 is a view of the portion of the control mechanism which controls the locking mechanisms associated with moving parts within the reel.

Referring to Figs. 47 and 75 it will be seen that the control lever 180 is provided with a cam slot 650' which receives a pin 651' provided on a segmental gear 652' loosely pivoted on shaft 653 journaled in supporting frames 11 and 13. A hook 654 is formed at the rearward edge of control lever 180 which engages shaft 653. These parts assist in guiding the control lever during its movement and also positively stop the same when reaching its uppermost position of adjustment. Segmental gear 652' meshes with a pinion 655 fixed to control shaft 185. Also fixed to control shaft 185 is a segmental plate 656 (Figs. 76 and 77), provided with a cam slot 657 which receives a stud 658 provided at the inner end of an arm 659 pivoted on shaft 660. A projection 661 is provided on arm 659 which engages a pin 662 provided on support frame 265 of the transmission line. There is a similar arm 659' (Fig. 77) pivoted on shaft 660 near the right hand end thereof provided with a projection 661' normally engaging a stud 662' provided on the other support frame 266 supporting the transmission line. A similar cam plate 656' fixed to shaft 185 cooperates with arm 659' in the same manner as cam plate 656 cooperates with arm 659. By this construction it is seen that the transmission line is positively held in normal position. A plate 663, Figs. 2 and 32, is spaced intermediate the end frames 265 and 266 of the transmission line. This plate is provided with a series of internal notches 664 for receiving the various shafts of the transmission line and also with an aperture through which shaft 264 passes. The upper inner end of plate 663 is formed with a notch 665 which receives a projection 666 provided on end plate 382 of the reel. These parts are provided to positively hold the reel against movement about its shaft 386 when the transmission line is in operative position. As shown in Figs. 2, 3, 49, 50, 57, 73 and 76, a disc 667 (Figs. 50 and 57) is fixed to an enlarged portion 803 of sleeve 802 by screws 573. Sleeve 802 is mounted on shaft 386 adjacent sleeve 387 and has fixed thereto, a semicircular disc 801 (Figs. 50, 57, 68 and 70) lying in the same plane as a similar disc 800 fixed to sleeve 387 which sleeve it will be remembered is fixed to end plate 383 in the reel. Screws 573 also rigidly connect gear 668 (Figs. 50, 57 and 73) and notched disc 795 (Figs. 49, 50 and 57) to sleeve 802 so that all of these members will be moved as a unit when the reel is rotated. Disc 667 is provided with an arcuate slot 669 (Figs. 73 and 76) which receives a pin 670 provided at the inner of side frame 265 (Fig. 76). Slot 669 is concentric with the pivots about which side frames 265 and 266 swing. Figures 73 and 76 show the position of the stud 670 when the transmission line is in operative position. When in this position it will be noted that stud 670 assumes a position at the inner end of slot 669. Therefore, stud 670 when in the position shown in Figs. 73 and 76 is also effective to positively lock the reel against rotation.

Control lever 180 is also provided with a cam edge 671 (Figs. 75 and 76) at the rear end thereof which engages a stud 672 provided on the upper arm 673 of a segmental gear 674 which is pivoted on shaft 653. Segmental gear 674 meshes with pinion 675 (Figs. 57 and 77) pinned to shaft 660. A similar pinion 675a (Figs. 76 and 77) fixed to shaft 660 meshes with a rack segment 676 provided along the lower edge of side frame 265. Spaced from pinion 675a, shaft 660 has pinned thereto a similar pinion 675 (Figs. 75 and 77) which meshes with a rack segment 676' provided at the lower edge of side frame 266. The lower arms 677 (Fig. 75) of segmental gear 674 carries a stud 678 (Figs. 47 and 75) which engages cam surface 679 provided at the lower edge of control lever 180. Cam surface 679 acts as a companion cam for cam 671 and is provided to positively restore segmental gear 674 to normal position when the control lever is moved in the reverse direction. Cam surface 671 provided on control lever 180 is so constructed that during the initial movements of control lever 180, pin 672 will ride on the portion thereof which is concentric with shaft 386. Thus no movement will be imparted to gear segment 674. However, when the control lever is moved to sub-total position, the raised portion of cam 671 will engage with stud 672 thereby causing segment 674 to rock in a clockwise direction, which motion is imparted to shaft 660, causing pinions 675a and 675' (Fig. 77) to actuate the support frames 265 and 266 thereby swinging the transmission mechanism out of engagement with the associated gears in the machine proper and also disengaging projection 666 (Fig. 32) from the notch 665 in plate 663. At the same time stud 670, shown in Figs. 73 and 76 will be moved to the dotted line position abutting against a projection 680 provided on disc 667. Projection 680 is provided so as to prevent rotation of the reel in the counterclockwise direction as viewed in Fig. 73.

For total taking operations it is not desirable that the motor bar 43 (Figs. 74 and 75) be held in depressed position. Accordingly, mechanism has been provided to automatically release the latch 220 from engagement with the notch 623 in plate 43' when the transmission has been disengaged by movement of the control lever 180 to sub-total position. In Figs. 74 and 75 it will be noted that a cam disc 681 is loosely pivoted on stud 266' which supports side frame 266. A pin 683 is provided on side frame 266 which is adapted to engage a projection 684 depending from the lower end of disc 681. Disc 681 is also provided with a cam surface 685 which is adapted to engage a projection 686 provided on latch lever 220. Thus it is clear that when the transmission frames 265 and 266 are swung forwardly, pin 683 will engage projection 684 and rock plate 681 about stud 266' thereby camming latch lever 220 in a clockwise direction to remove projection 622 from notch 623 provided in plate 43' attached to the motor bar 43. It will also be noted that a spring 687 tends to rock disc 681 in a counterclockwise direction to restore it to normal position when the transmission line is restored to normal position. A nose portion 688 is also provided at the rearward end of disc 681 which is adapted to engage either side of projection 689 provided at the lower end of latch lever 220. This acts as a lock to retain the latch lever 220 in the position shown in Fig. 75 and also in the position shown in Fig. 74 when the motor bar is locked in depressed position. However, when frames 265 and 266 are moved by the mechanism just described, latch lever 220 will be positively held out of engagement with motor bar 43 and before release of the machine can be effected operation of this bar is necessary.

Integral with arm 659' (Fig. 75), is a forwardly and upwardly extending arm 690 which is provided with an open slot 691 at its upper end for receiving a stud 692 provided near the lower end of a depending arm 693 pivoted on stud 266'. The lower end of arm 693 is provided with a cam slot 694 which receives a stud 695 provided on an arm 696 which pivots about a stud 697 provided at the inner side of frame 266. Integral with arm 696 is a bail 698 which carries a series of fingers 699 which are adapted to engage gears 263 which it will be remembered are loosely pivoted on shaft 264 of the transmission line.

It will be noted in Fig. 76 that cam slot 657 in plate 656 is provided with a dwell portion which permits movement of control lever 180 without rocking arms 659 (Fig. 76) and 659' (Fig. 75) during the first portion of its movement. The operation of control lever 180 and the mechanisms controlled thereby will be fully described hereinafter, however, it may be stated here that when lever 180 is moved to sub-total position, arms 659 and 659' will be cammed downwardly with the result that projections 661 and 661' respectively thereon will be moved out of engagement with studs 662 and 662' provided on the side frames of the transmission line. At the same time, arm 690 will rock arm 693 in a counterclockwise direction thereby causing cam 694 to rock the alining fingers 699 into engagement with gears 263 and thereby hold the latter against movement. When the control lever 180 is restored to its uppermost position, the parts just described will assume the position shown in Figs. 75 and 76. It will be noted that cams 650' and 671 (Fig. 47) are so designed that while the former is effective to rock plate 656 (Fig. 76), the latter is ineffective and when cam 671 becomes effective to actuate segment 674 the dwell portion of cam slot 650' (Fig. 47) will have reached pin 651' and thereby movement of disc 656 will be arrested. It will be further noted that segment 652' is provided with a pair of camming projections 700 and 701 which engage laterally extending projections 702 and 703, respectively, on a two-arm lever 704 which is pinned to shaft 386. Also pinned to shaft 386 is a cam disc 705 (Figs. 44 and 46) which is provided with a cam portion 706 which engages a lock rod 707. This lock rod 707 extends through the entire reel. A depending arm 708 is pinned to cam shaft 430 and is provided with an open slot 709 at the lower end thereof for receiving a laterally extending stud 710 carried by the substantially horizontal arm 711 of a bell crank lever 712 pivoted at 713 to end plate 383 of the totalizer reel. The upper arm 714 of bell crank 712 is provided with a surface 715 which engages one end of rod 707. End plates 382 and 383 (Fig. 44) of the reel are each provided with a radial slot 716 (Fig. 46) which receives and guides lock rod 707. Also provided on the substantially horizontal arm 711 of bell crank lever 712 is a projection 717 which is adapted to engage a cam face 718 provided on a disc 719 also fixed to shaft 386. When control lever 180 is moved counterclockwise to lock register, sub-total or grand total position (for positions see Figs. 78 and 79), segmental gear 652' (Fig. 58) will be cammed in a clockwise direction, causing projection 701 to engage projection 703, thereby slightly rocking shaft 386 in a clockwise direction with the result that cam 706 (Fig. 46) provided on disc 705 will move rod 707 outwardly which, in turn, will actuate bell crank lever 712 in a clockwise direction to bring stud 710 into slot 709 provided in the arm 708. Thus, it is seen that cam shaft 430 is also positively locked against movement. The selector plates for both the counters and the totalizers, as well as the registering gears are provided with axially alined L shaped slots 720 (Figs. 36, 38 and 45) for receiving lock rod 707. During normal operations of the machine, the portion of L shaped slots 720 which is substantially concentric with shaft 386 will register with lock rod 707 thereby permitting these members to oscillate. However, when the control lever has been moved counterclockwise to lock register, sub-total or grand total position, and disc 705 (Fig. 55) has been rotated in the direction of the arrow, rod 707 will be moved in the manner aforesaid, assuming a position in the substantially radial portion of L slots 720 of the members previously mentioned, thereby positively locking them against movement. The operating plate 406 (Fig. 40) is provided with studs which are positively engaged by their operating cams and, therefore, this plate will also be positively held against movement when cam shaft 430 is locked against operation in the manner just described. It will therefore be remembered that when control lever 180 is moved to any of the above mentioned positions, the various elements associated with the reel are locked against operation. It will be seen later when the control mechanism is described in detail that no motion is imparted to segmental gear 652' (Fig. 49) or shaft 185 when the control lever 180 is moved from lock register position to sub-total position. During this movement of the control lever, shaft 660 (Figs. 75 and 76), will be rotated however to swing the transmission line out of engagement with the gears in the machine proper with which it cooperates for item entering operations of the machine. It is therefore seen that mechanism is provided for positively swinging the transmission line out of engagement with the actuating gears in the reel, at which time all of the moving parts within the reel and transmission line are locked against operation so that when the latter is again brought back into operative position all of the parts will be in proper alinement and therefore no interference will occur between the cooperating parts.

In order to rotate the reel to bring the totalizers into printing position, the following mechanism is provided: Referring to Figs. 1, 2, 57 and 73 it will be seen that a ridged thumb wheel 721 protrudes through a slot provided near the top left-hand end of the cabinet. Fixed to thumb wheel 721 is a pinion 722 which meshes with a large gear 723 which in turn meshes with a gear 668 which, it will be remembered, is fixed to sleeve 802 mounted on shaft 386. Adjacent thumb wheel 721 on the cabinet is a legend plate bearing legends representing the various totalizers and counters provided in the reel. An index pointer 724 is attached to the top of a bent arm 725 and is adapted to be moved variable distances to designate the totalizer or counter which has been moved to printing position. Bent arm 725 is loosely mounted on sleeve 802, as shown in Figs. 57 and 73, and is provided with a laterally extending stud 726 which engages in an open slot 727 provided at the lower end of a depending arm 728 pivoted at 729 to side frame 13. Arm 728 is provided with a laterally extending stud 730 intermediate its ends which operates in a cam slot 731 provided in gear 723. Thus, it is clear that when the control lever 180 has been moved to one of its total taking positions, in order to bring any one of the totalizers or special counters to printing position, it is only necessary to rotate thumb wheel 721 until the index finger 724 registers with the legend corresponding to the particular totalizer that it is desired to take the total from.

It has been pointed out heretofore that when the control lever 180 is moved to one of its total positions, all of the keys are locked against operation but the mechanism for releasing the machine is so conditioned that after the reel has been rotated to bring one of the totalizers or counters to printing position, depression of the motor bar will release the machine for operation. Thus, after bringing a selected totalizer to printing position in the manner just described, it is only necessary to depress the motor bar 43, which will cause the machine to operate to effect a printing impression therefrom.

The printing and paper shifting mechanisms operate in the same manner for total taking operations as they do for item entering operations and, therefore, it will be unnecessary to repeat the description of the operation of those mechanisms at this time.

Figure 78:
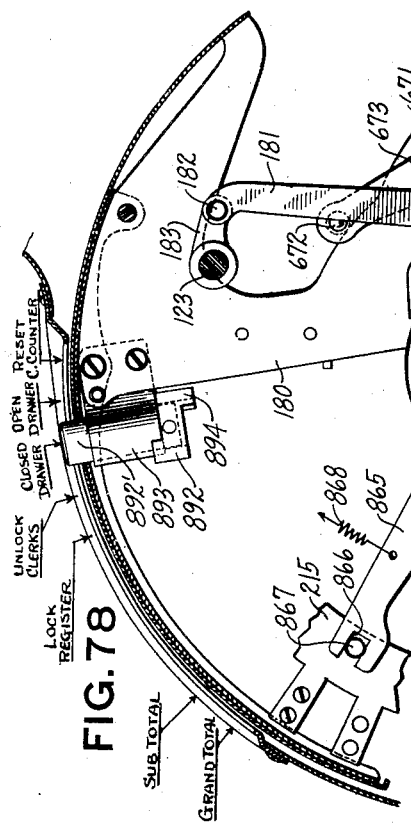
Fig. 78 is a general elevational view of the control mechanism, showing particularly the associated release mechanism for the machine and the series of interlocks controlled by the control mechanism.

When the control lever 180 is moved to subtotal position the reset mechanism is not conditioned for operation. However, when control lever 180 is moved to its grand total position, resetting of the selected totalizer will be effected after a printing impression has been taken therefrom. Referring to Figs. 3 and 4, it will be seen, as was pointed out hereinbefore, that journaled in frames 13 and 14 slightly to the rear of the main driving shaft 20 is a short shaft 735. Adjacent supporting frame 14 shaft 735 has pinned thereto a gear 736 which meshes with a gear 159 fixed to the main driving shaft 20. Near its other end shaft 735 has pinned thereto a gear 738 which meshes with gear 566 which it will be remembered is loosely mounted on main driving shaft 20. Fixed to gear 566 are cams 565 and 565' which it will also be remembered are also loosely mounted on shaft 20. Thus it is seen that when main driving shaft 20 is rotated upon operation of the motor, cams 565 and 565' will be driven by gear 738 through the train of gears just described to operate the printing mechanism. Adjacent gear 738 is a gear 739 which is loosely mounted upon shaft 735. Gear 739 meshes with a gear 740 loosely mounted on shaft 20 which gear is located adjacent gear 566. Gear 740 has fixed thereto a cam 741 and its companion cam 741' (see also Figs. 48 and 49) which are also loosely supported on shaft 20. It therefore, is clear that for normal operations of the machine since gear 739 is loosely mounted on shaft 735, cams 741 and 741' for operating the resetting mechanism will not be moved. However, when the control lever is moved to grand total position a wide pinion 742 mounted on an arm 743 of a three-arm lever 744 (Figs. 49 and 78) will be rocked upwardly into mesh with gears 738 and 739. Thus it is seen that upon movement of shaft 20 both gears 738 and 739 will be operated to actuate their respective cam members. Referring to Fig. 78 it is also seen that the substantially vertical arm 744' of lever 744 is provided with a projection which moves into engagement with gear 740 when pinion 742 is moved to inoperative position. This prevents movement of gear 740 when out of engagement with pinion 742 and also insures proper meshing of latter with gear 740 when it is moved to operative position.

Referring to Figs. 49 and 50 it is seen that fixed to control shaft 185 is segmental disc 745 which is provided with a cam slot 746. Cam slot 746 receives a pin 747 mounted on arm 748 of the three-arm lever 744. Fig. 49 shows the position of the parts when control lever 180 is in the open drawer position of adjustment (for positions see Figs. 78 and 79). It will be noticed that when control lever 180 is in this position, pin 747 assumes a position in the portion of cam slot 746 which is concentric with shaft 185. Thus no movement of three-arm lever 744 will be effected until segmental disc 745 is moved to bring the cam portion 746' or 789 into engagement with pin 747. The portion 746' of cam slot 746 is brought into engagement with pin 747 when control lever 180 is moved from sub-total position to grand total position. When this occurs three-arm lever 744 will be rocked in a clockwise direction, as viewed in Fig. 49, thereby causing the engagement of gear 742 with gears 738 and 739. As shown in Figs. 48 and 49, the cams 741 and 741' engage rollers 750 and 751 respectively, provided on a two-arm lever 752 pivoted on shaft 185. Also pivoted on shaft 185 and fixed to arm 752 at 754 is a gear segment 755 (see also Fig. 50). Segmental gear 755 meshes with a gear segment 756 which is journaled on sleeve 802, as shown in Figs. 50 and 57. Fixed to gear 756 on either side thereof are gear segments 757 and 758. Referring to Figs. 51, 53 and 54, it will be seen that gear segment 757 cooperates with a gear 759 which is provided with an internal thread for receiving a worm gear 760 formed at the righthand end of shaft 761. Pinned to shaft 761 adjacent worm gear 760 is a pinion 762 which meshes with gear segment 758. Gear 759 and pinion 762 are supported within the hollow portion of a bracket 763 which is fixed to the inner side of supporting frame 13 by screws 764 as shown in Fig. 51. The left-hand end of shaft 761 is journaled in suitable bearings provided in side frame 13 as is also shown in Fig. 51. Adjacent the inner side of frame 13 shaft 761 is provided with a peripheral groove 765 which receives a rectangular key 766 (Figs. 49 and 50) which is fitted within an elongated slot 767 formed in the flange of bracket 763 and lies in close juxtaposition to frame 13. Thus it is clear that shaft 761 is held against axial movement. Pinned to each totalizer shaft 396 (Fig. 51) is a collar 768 which is provided with an enlarged portion 769 at the inner side thereof. This enlarged portion is provided with a slot 770 which receives a pin 771 projecting from its related totalizer frame when the totalizer shaft is in normal position. This mechanism is provided to hold its shaft against rotary movement. Spaced from enlarged portion 769 is a flange 772, as shown in Figs. 49, 51 and 56, which lies adjacent the inner side of a retaining disc 773 (Fig. 49) near the outer periphery thereof. This disc is loosely mounted on sleeve 802 and is provided to prevent axial movement of the totalizer shafts, during normal operations of the machine. An arm 774 is fixed to disc 773 by rivets 775 as shown in Figs. 49, 50, 57, 67 and 73. Arm 774 is provided with pins 774a and 774b (Figs. 67 and 73) which are engaged by a cam 774c fixed to control shaft

185. Adjacent flange 772 (Fig. 54), collar 768 is provided with an arcuate flanged clutch member 776 (Fig. 49) which is concentric with shaft 386. The cross section of clutch member 776 is substantially T-shaped. This flanged clutch member is adapted to move into engagement with a cooperating clutch portion 777 provided at the inner end of gear 759, as is shown in Fig. 54, when the totalizer reel is rotated to bring a totalizer supported thereby into printing position. It will be noted in Fig. 53 that gear segment 757 is provided with a concentric portion 778 upon which teeth 779 of gear 759 rest. This forms a lock for the gear 759 until the concentric portion 778 moves past the gear 759 when the teeth of gear segment 757 will engage the teeth of gear 759 to rotate the same. The operation of the parts just described is as follows. In order to select a totalizer for operation thumb wheel 721 (Fig. 73) is actuated to rotate the reel to select the proper totalizer. By this movement the arcuate clutch member 776 provided at the end of collar 768, which it will be remembered is pinned to totalizer shaft 396, will move into engagement with the cooperating clutch member 777 provided at the inner end of gear 759 as shown in Fig. 54. Now upon operation of the machine the cams 741 (Fig. 49) and 741' will actuate gears 757 and 758 in a clockwise direction as viewed in Figs. 53 and 55. From the construction of segments 757 and 758 it will be seen that the latter will engage its pinion 762 and rotate the same immediately while gear 759 remains stationary with the result that upon rotation of pinion 762 (Figs. 51 and 54) worm gear 760 will also be rotated causing gear 759 to move axially thereof due to the action of worm gear 760 with the cooperating internally threaded portion of gear 759. By this movement the totalizer shaft will be moved axially causing notches 780 (Figs. 51 and 52) provided therein to register with their respective spring urged pawls 781 (Fig. 52) provided on the totalizer wheels. When gear 759 and a totalizer shaft are moved axially, in this manner, it is clear that the slot 770 (Fig. 51) provided in the enlarged portion 769 of collar 768 will be disengaged from the stud 771 projecting from its related totalizer frame. Gear 759 will be moved in this manner until the teeth of gear segment 757 engage the teeth of gear 759 when the latter, as well as gear 762, will then rotate as a unit causing totalizer shaft 396 to rotate in the direction of the arrow shown in Fig. 52 a distance equal to slightly more than nine-tenths of a complete revolution. Upon the return movement of gears 757 and 758, the totalizer shaft will be rotated in the reverse direction and the notches 780 therein will engage their respective pawls 781 and thereby rotate the totalizer wheels associated therewith to zero, at which time the teeth of gear segment 757 will have moved out of engagement with the teeth of gear 759 and the concentric portion 778 will again prevent said gear from rotating further. Gear 762, however, will continue to rotate with the result that gear 759 and the totalizer shaft connected thereto will be moved axially to the right to restore the parts to normal position as shown in Fig. 51. The mechanism just described is so timed with the printing mechanism that printing occurs before a resetting operation is effected.

Figure 58:
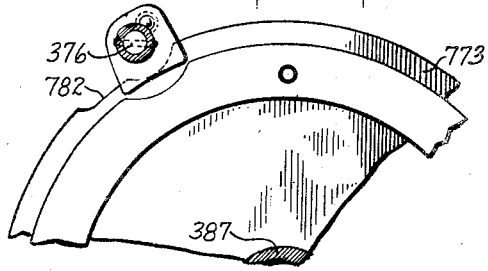
Fig. 58 is a fragmentary view showing a portion of the means for controlling the totalizer resetting.
Figure 59:
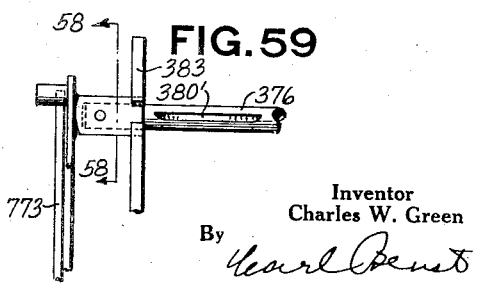
Fig. 59 is a side view of the mechanism of Fig. 58.

As shown in Fig. 58, disc 773 is provided with a notched portion 782 which when brought into position adjacent a flange 772 permits, the associated totalizer shaft to move axially. Notch 782 is normally out of registering position with the resetting mechanism. However, when the control lever is moved toward a total taking position, disc 733 will be moved by a cam 774c (Fig. 73) thereby alining notch 782 with the resetting mechanism, and upon operation of the machine the totalizer shaft will be shifted axially to effect resetting of the associated totalizer wheels.

When a sub-total is taken, a gear 742 (Fig. 78) is not moved into engagement with gears 738 and 739 (Fig. 4) and thus only printing will be effected from the selected totalizer. However, when the control lever is moved to grand total position, pinion 742 will be moved into engagement with gears 738 and 739 with the result that the resetting gears will be caused to operate and consequently the totalizer will be reset to zero after printing has been effected therefrom. This mechanism it is clear is so constructed that each of the totalizers may be printed from and reset by successively bringing them to printing position, and then releasing the machine for operation. This procedure is repeated until a printing impression has been taken from all of the totalizers and counters of the reel.

In order to prevent movement of the reel during a total taking operation of the machine or to prevent operation of the machine when a totalizer has not been properly brought to printing position the following mechanism is provided. As shown in Figs. 49, 50, and 57, it is seen that a bell crank lever 790 is pivoted on a stud 791 provided on the inner side of frame 13. The substantially horizontal arm 792 thereof is provided with a nose portion 793 which is adapted to engage in any one of a plurality of notches 794 provided in a disc 795 fixed to sleeve 802. Fixed to shaft 145, (Fig. 49) which shaft it will be remembered has pinned thereto the arm 30 (Figs. 4 and 23) associated with the motor switch control mechanism, is a substantially horizontal arm 796 (Fig. 49). Bell crank lever 790 is provided with a depending arm 798 which is adapted to move into engagement with arm 796. From this construction it is obvious that when the reel is rotated and the nose portion 793 of arm 792 rests upon the high portion between the notches of disc 795, bell crank lever 790 will be rocked in a clockwise direction as viewed in Fig. 49 thereby bringing the lower end of arm 798 over arm 796 and thus preventing shaft 145 from rocking in a counterclockwise direction to release the motor switch control mechanism. It also follows that when the machine is released for operation shaft 145 will be rocked in a counter-clockwise direction which will bring the end of arm 796 into engagement with the left side of depending arm 798 thereby preventing rotation of the reel. This mechanism forms an effective interlock to insure against any mis-operation of the associated parts.

It will also be remembered that the disc 667 (Fig. 76), which is provided with arcuate slot 669 for receiving a pin 670 provided at the rearward end of transmission side frame 265, is also moved with the reel. Consequently, when the transmission line has been disengaged and the reel rotated to bring any one of the totalizers or counters to printing position, the concentric portion of disc 667 will engage stud 670 and thereby prevent restoration of the transmission line to operative position until the reel has been restored to its normal position. Thus, an effective interlock is also provided between the control lever and the reel which prevents restoration of the transmission line until the reel has been properly positioned.

Referring to Figs. 3, 32, 35 and 44, it will be seen that cam 431 (Figs. 35 and 44) is provided with a pair of laterally extending studs 431a which are adapted to engage in an arcuate slot 470a (Figs. 3, 32 and 44) provided in the hub portion of intermittent gear 470. The arcuate slot 470a is concentric with shaft 386 (Fig. 3). Thus, it is clear that when the reel is rotated in the manner aforesaid studs 431a will move out of engagement with intermittent gear 470 which, it will be remembered is journaled in frame 14 (Figs. 3 and 44). Intermittent gears 162 and 470 (Fig. 32) are held in fixed position by the virtue of their specific construction. These gears cooperate to form a lock when in normal position. Therefore, it is seen that since the parts are held against movement during movement of the reel, studs 431a will again move into engagement properly with arcuate slot 470a when the reel is restored to normal position.

Control mechanism

Figure 79:
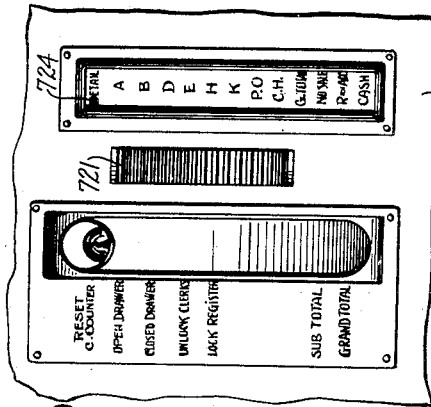
Fig. 79 is a view of the legend plates associated with the control lever and reel operating means.

The illustrated machine is provided with a single lock control mechanism which enables the proprietor or other authorized person having a key thereto to condition the machine for its various modes of operation. As shown in Figs. 78 and 79, the control lever may be moved to seven different positions of adjustment. In its uppermost position, the control lever through its associated mechanism will condition the machine for printing from and resetting the consecutive number counter. When moved to the next position or open drawer position, the machine may be operated regardless of whether the drawer is open or closed. The next position in order is the closed drawer position. When the control lever is in this position the machine is locked against operation when the drawer is open and is not released until the drawer has been fully closed. The next position in order is the unlock clerks' keys position. When the control lever is in this position the plate supporting the individual locks for the clerks' keys may be shifted so that the clerks' keys may be operated in the usual manner without first releasing them from their individual locks. The control lever must then be moved to either open drawer or closed drawer position to condition the machine for operation. The next position in order is the lock register position, in which position all of the keys are locked against operation. The next positions in order are the sub-total and grand total positions, respectively. When the control lever is moved to sub-total position, the keys are locked against operation but the machine may be operated to effect printing, after the reel has been rotated to bring one of the totalizers to printing position, by simply depressing the motor bar. When the control lever is moved to grand total position, the resetting mechanism is conditioned for operation so that after a total is printed from the selected totalizer, it will be reset to zero by the resetting mechanism. The mechanisms associated with the control lever for conditioning the machine for the various modes of operation just outlined will now be described in detail.

Referring particularly to Figs. 47, 75, 76 and 78, when the control lever 180 is moved to reset consecutive counter position, cam 650' (Fig. 47) provided therein will rock gear segment 652' in a counterclockwise direction about its pivot 653 to the position shown in this figure. Gear segment 652' meshes with a gear 655 fixed to control shaft 185 and thus the latter will be moved slightly in a clockwise direction with the result that the cam portion 789 (Fig. 49) of slot 746 provided in disc 745, which it will be remembered is also fixed to shaft 185, will rock the three-arm lever 744 in a clockwise direction bringing pinion 742 (Fig. 78) into engagement with gears 738 and 739 (Fig. 4), thereby conditioning the resetting mechanism for operation. It will also be remembered that cam plate 186 (Fig. 78) which is provided with the notches 187 and 189 is also fixed to shaft 185. Thus, when the control lever is moved to reset consecutive counter position, the first notch 187a provided in plate 186 will register with stud 190 on pitman 181. Now, upon depression of the no sale key, a clerk's key, and the motor bar 43, the motor switch will be tripped and the machine will be operated. When the motor bar is depressed, stud 126 (Fig. 23) carried by plate 127 will rock shaft 123 in a counterclockwise direction, as viewed in Figs. 23 and 24. Stud 126 will also release latch 138 from engagement with the depending arm 136 fixed to shaft 137, thereby permitting shaft 137 to rock in a counterclockwise direction by the action of spring 147 (Fig. 23) on link 141 with the result that arm 30 will be rocked to release the motor switch control mechanism. When shaft 123 is rocked in this manner, pitman 181 (Fig. 78) will be elevated slightly, thereby bringing projection 190 thereon into notch 187a. If the notch is out of alinement with projection 190, it is clear that shaft 123 will be held against movement and the machine will thus be locked against operation. When the control lever is moved to reset consecutive counter position, as was pointed out before, pinion 742 (Fig. 4) is rocked into engagement with gears 738 and 739 which operate, respectively, the printing mechanism and the resetting mechanism.

From the aforegoing, it is seen that during an operation of the machine, when the control lever is so positioned, printing first will be effected from the consecutive counter mounted in the reel after which the resetting mechanism will become effective to reset both the consecutive counter mounted in the reel and also that associated with the check and slip printing mechanism.

When the control lever is moved to open drawer position, plate 186 (Fig. 78) will be moved to bring the second notch 187b into registering position with respect to stud 190 provided on pitman 181. Thus, when shaft 123 (Fig. 23) is rocked by plate 127 in the manner aforesaid, pitman 181 (Fig. 78) will be elevated to bring stud 190 into notch 187b and the machine will be released for operation.

It will be seen that plate 186 is formed with an opening 850 therein. Plate 186 is also provided with an enlarged portion 851 which projects into slot 850 and which is concentric with shaft 185. Pivoted on shaft 145 is an arm 853 which is provided with a laterally extending stud 854. When the control lever 180 is in either reset consecutive counter position or in open drawer position, stud 854 rests upon the concentric portion 851 of plate 186. Arm 853 has formed at the upper end thereof an ear 857 which is adapted to engage over a rearwardly projecting finger 859 formed on pitman 181 near the lower end thereof. When stud 854 on arm 853 engages the concentric portion 851 of plate 186, ear 857 is held out of engagement with finger 859 and the pitman may then be elevated when shaft 123 is rocked in the manner previously described. Also pivoted on shaft 145 is a three-arm lever 852, one arm 855 thereof being adapted to engage arm 853 at a point intermediate its ends. Another arm 856 of lever 852 carries a compression spring 858 which engages the rear side of arm 853 at a point intermediate its ends. This spring tends to rock arm 853 in a counterclockwise direction into engagement with arm 855 of lever 852. A depending arm 1860 of lever 852 is provided with an open slot into which projects a stud 1861 carried at the upper end of arm 1862 which is fixed to one end of shaft 1863. Shaft 1863 is journaled in a pair of depending ears provided in a bracket 1864 which is fixed to base plate 10. Also fixed to shaft 1863 at the opposite end thereof is a depending arm 1865 (Fig. 67) carrying a stud 1866 at the lower end thereof, said stud projecting into a closed cam slot 1867 provided at the forward end of arm 1869 of a lever 1868. Lever 1868 is pivoted on a stud 1870 provided in another depending ear formed in bracket 1864. A rearwardly extending arm 1871 of lever 1868 has pivoted thereto at 1872 a two-arm pawl 1873. A spring 1874 normally urges pawl 1873 against a projection 1875 formed in lever 1868. A projection 1876 is formed in arm 1871 to limit the movement of pawl 1873 in a clockwise direction about its pivot 1872. Pinned to shaft 821 is collar 1880 provided with a substantially frusto conical surface 1881. The lever 1868 lies adjacent shaft 821 and is adapted to be engaged by the upper flat end of collar 1880.

When control lever 180 (Fig. 78) is moved to closed drawer position the enlarged portion 851 of plate 186 is moved to the position shown in Fig. 78. It is also seen that notch 187c of plate 186 is brought into registering position with respect to stud 190 on pitman 181. When these parts are thus positioned and the machine is operated, the elevation of the finger shaft 821 (Fig. 67) during the operation causes collar 1880 to engage lever 1868 and rock the same in a counterclockwise direction. By this action cam 1867 will rock arm 1865 and shaft 1863 in a counterclockwise direction (Fig. 67, and clockwise as viewed in Fig. 78) with the result that arm 1862 will rock lever 852 and the arm 853 in a counterclockwise direction bringing ear 857 over finger 859 of pitman 181, the pitman and finger having been returned by this time to their original positions shown in Fig. 78. This movement of arm 853 is permitted because stud 854 thereon will enter the depression to the left of the enlarged portion 851 of plate 186. The selected drawer will be released when the shaft 821 is elevated in the manner, as previously described, and its spring will project it to exposed position. Since the ear 857 now lies over the finger 859 of pitman 181, shaft 123 (Figs. 23 and 78) will be held against further operation and the machine cannot be again released for operation. Toward the end of an operation of the machine shaft 821 (Fig. 67) will be lowered to normal position. Lever 1868 will remain in operated position while shaft 821 is lowered to normal position with the result that the inner end of pawl 1873 carried thereby will be engaged by the enlarged portion of collar 1880 and will thus be rocked in a clockwise direction about its pivot. No motion, however, will be imparted to lever 1868, because the spring 1874 will exert a force only great enough to restore pawl 1873 to normal position against projection 1875. Since lever 1868 remains in operated position ear 857 will remain over the finger 859, and the machine, as before stated, cannot be operated until these parts are moved to normal position.

When the released drawer is moved to closed position, however, the cam surface 1882 (Fig. 67), provided at the end of the related drawer catch 846 will engage the end of its associated latch lever 845 and rock the same upwardly. The inner end of each latch lever 845, it will be remembered, engages a collar 840 pinned to the finger shaft 821 and consequently the latter, by this action, will be elevated slightly to bring the slanting surface of member 1881 into engagement with the inner end of pawl 1873, which at this time will be lying in the dotted line position shown in Fig. 67. When pawl 1873 is in this position the point of contact thereof with member 1881 is on a line with the pivot point 1872 of said pawl and consequently as the shaft 821 rises, the member 1881 will rock lever 1868 clockwise to normal position, thereby causing arm 855 of lever 852 to rock arm 853 in a clockwise direction (Fig. 78) to bring ear 857 thereof out of alignment with finger 859 of pitman 181. The movement of shaft 821 by cam 1882 (Fig. 67) when the drawer is moved to closed position is not as great as the movement imparted thereto by arm 830 to release a selected drawer for operation and thus collar 1880 will not engage lever 1868 as is done in the latter case. The machine may now be operated in the usual manner.

Figure 27:
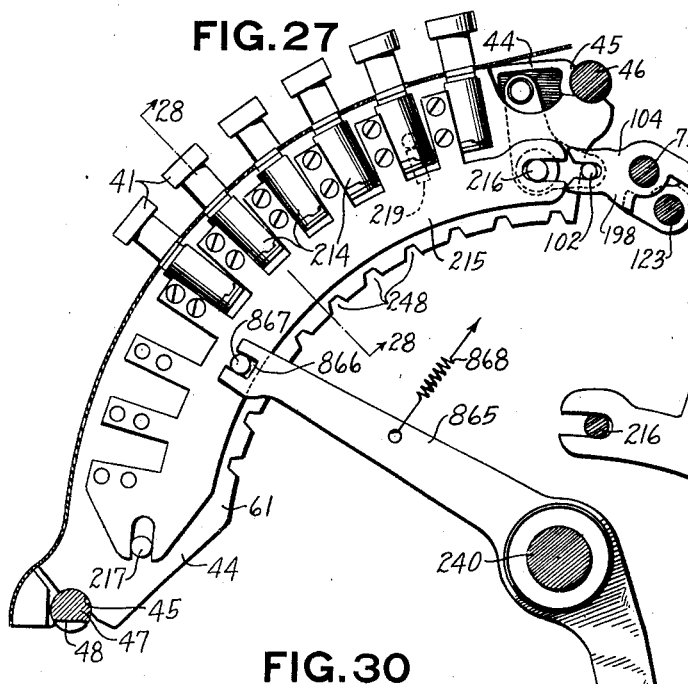
Fig. 27 is a side view of the individual locks for the clerks' keys and the control means therefor.
Figure 80:
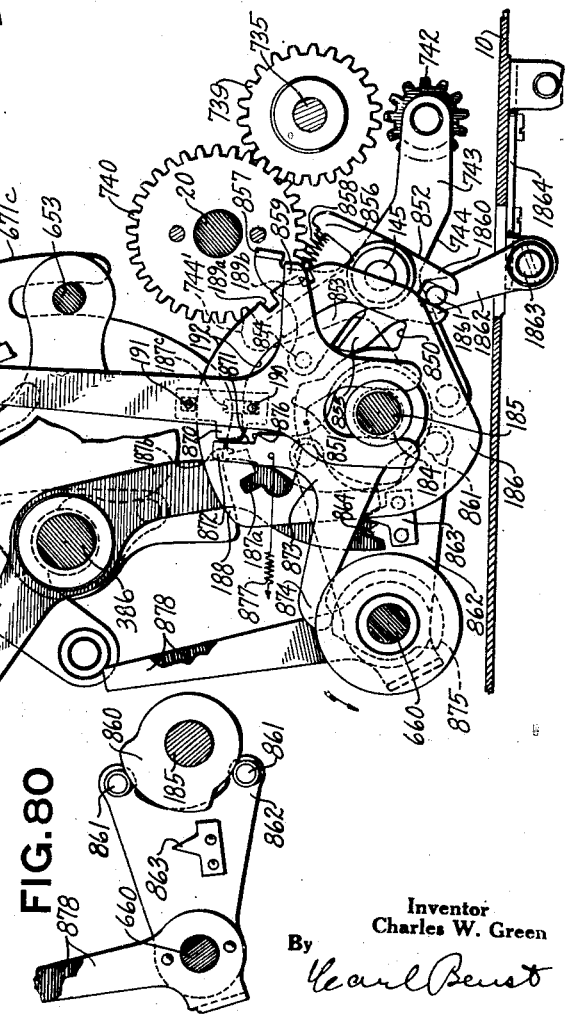
Fig. 80 is a detail view of the cam which is fixed to the control shaft for locking the clerks and transaction differentials during total taking.

When the control lever 180 (Fig. 78) is moved to unlock clerk's position plate 186 will be moved so as to bring the unnotched portion thereof located substantially midway between notch 187c and notch 189a, between studs 190 and 191 of pitman 181. When moved in this position it is obvious that shaft 123 will not be permitted to rock in the usual manner to release the machine for operation. Fixed to shaft 185 (Fig. 80) is a cam 860 which engages a pair of rollers 861 provided at the rearward end of an arm 862 pivoted on shaft 660. Lever 862 is provided with a detent 863 intermediate its ends which is adapted to engage in either one of two notches 864 (Fig. 78) provided at the lower end of a bell crank lever 865 pivoted on shaft 240. The upper forwardly extending arm of bell crank lever 865 is provided with an open slot 866 which receives a stud 867 fixed to supporting plate 215 for the individual clerk's locks 214 (Fig. 27). A spring 868 tends to rock bell crank lever 865 in a clockwise direction. Thus, it is seen that when the control lever is moved to unlock clerk's keys position cam 860 will rock arm 862 downwardly thereby bringing detent 863 out of engagement with the notches 864 of bell crank lever 865. Plate 215 which supports the individual clerk's locks 214 may now be moved downwardly against the tension of spring 868 to bring the projecting portions 219 (Fig. 29) of the lock bolts out of engagement with their corresponding laterally projecting studs 218 provided on the keys 41 (Fig. 28). Now, upon movement of the control lever back to either open drawer or closed drawer position detent 863 (Fig. 27) will be brought into the forward notch 864 of bell crank lever 865 thereby positively holding plate 215 in unlocked position. This mechanism is provided to enable the proprietor to release all of the clerks' keys from locking engagement with the individual locks 214 when it is not desired to make use of these locks.

When the control lever is moved to lock register position the inner cam surface 192 (Fig. 78) of plate 186 will engage stud 190, thereby moving pitman 181 downwardly. By this action arm 183 will rock shaft 123 in a clockwise direction with the result that arm 124 (Fig. 23) will also be moved in a clockwise direction bringing the top side thereof adjacent stud 126 carried by plate 127. When shaft 123 is rocked in this manner it will be remembered that all of the keys are locked against operation due to the engagement of the lower arms 195, 193 and 196 (Fig. 14) of detents 96, 86 and 107 respectively with their respective release arms 93, 83 and 104. When the control lever has been fully moved to lock register position notch 189a (Fig. 78) will register with projection 191 of pitman 181. This also is the position of notch 189a in plate 186 when the control lever has been moved to sub-total position since, as will be pointed out hereinafter, shaft 185 does not move during movement of control lever 180 from lock register position to sub-total position. To prevent release of the machine when the control lever is in lock register position, the following mechanism is provided.

As shown in Fig. 78, a forwardly extending projection 870 is provided on pitman 181. Projection 870 is adapted to engage in an open notch 871 provided in the substantially vertical arm 872 of a two-arm lever 873 which is loosely pivoted on shaft 185. A substantially horizontal arm 874 of lever 873 is provided with a nose portion which engages a cam 875 fixed to shaft 660. It will be remembered that during movement of the control lever 180 from reset consecutive counter position to lock register position shaft 660 remains stationary since stud 672 (Fig. 75) provided on the upper arm of segment 674 for actuating shaft 660 is then still in engagement with the concentric portion of cam 671. Thus, no motion is imparted to shaft 660 during this period. However, by movement of control lever 180 between the positions just mentioned shaft 185 will be rocked by gear segment 652 (Fig. 47) to position plate 186 in the manner just described. Thus, when control lever 180 is moved to lock register position cam 875 (Fig. 78) remains stationary and holds arm 874 of two-arm lever 873 in the position shown in Fig. 78. During this movement of the control lever pitman 181 as was pointed out before will be cammed downwardly by the inner cam surface 192 engaging stud 199 in the manner just described. When this occurs the end of projection 870 will just engage shoulder 876 and thus prevent further downward movement of pitman 181 which is necessary to release the machine for operation. It, therefore, is seen that if the motor bar 43 (Fig. 23) is now depressed the motor switch will not be closed since shaft 123 is held against movement by the engagement of projection 870 (Fig. 78) on pitman 181 with the shoulder 876 of lever 873. Thus, when the control lever is moved to lock register position all of the keys are locked against operation and by virtue of projection 870 engaging shoulder 876 of lever 873 downward movement of pitman 181 is prevented, which, as was stated before, is necessary to effect release of the machine for operation. It will be remembered that when control lever 180 is moved to unlock clerks' keys position cam 860 (Fig. 80) will rock arm 862 downwardly to release detent 863 from engagement with a notch 864 (Fig. 78) provided at the lower end of bell crank lever 865. Referring to Figs. 11, 77, and 78, it will be seen that also fixed to arm 862 (Fig. 78) and journaled on shaft 660 are a pair of substantially vertical arms 878. These arms act as zero stops for the differential segments 242 for the clerks' and transaction banks of keys, respectively, during total taking operations of the machine. Thus, it is seen that when control lever 180 is moved to unlock clerks' keys position arms 878 will be moved under studs 316 provided on the differential segments 242 for the clerks' and transaction banks of keys. Cam 860 for rocking arm 862 and arms 878 is so constructed that it will hold these arms in operated position when the control lever is also moved to lock register, sub-total, and grand total positions.

When the control lever is moved to sub-total position the dwell portion of cam slot 650' (Fig. 47) will engage stud 651' in segment 652' and thus no movement will be imparted to gear segment 652', with the result that plate 186 (Fig. 78) will remain in the same position that it occupied when the control lever had been moved to lock register position. However, when the control lever is moved from lock register position to sub-total position cam portion 671 (Fig. 75) on the upper edge of control lever 180 will engage stud 672 on an arm 673 of segment 674 with the result that the latter will be rocked in a clockwise direction thereby rotating shaft 660 in a counterclockwise direction. When this occurs pinions 675a and 675b will actuate side frames 265 and 266 of the transmission line to swing the latter outwardly to disengage the gears thereof from the cooperating gears of the machine, in the manner described hereinbefore. At the same time cam 875 (Fig. 78) fixed to shaft 660 will be moved in the direction of the arrow, causing a cutaway portion thereof to register with the end of arm 874 of two-arm lever 873. Spring 877 attached to the lever 873 will then rock the latter in a counterclockwise direction removing the shoulder 876 from engagement with projection 870 of pitman 181. Thus, when one of the totalizers on the reel is moved to printing position and the motor bar 43 (Fig. 23) is operated, the shaft 123 may be rocked in clockwise direction to permit release of the motor switch control mechanism. When this occurs the printing mechanism will be operated to effect a printing impression from the selected totalizer, upon the detail record strip.

From the foregoing description, it is seen that upon operation of the machine, for a total taking operation, the latch pawls 245 (Fig. 10) associated with the clerks' and transaction differential segments 242 will be disengaged from their drivers in the zero position. The drivers for these differential segments 242 however, will continue their movement to operated position and will then return to normal position as in other operations of the machine. It is not necessary to provide an arm 878 (Fig. 78) for each of the amount differentials 242 since each of these segments, it will be remembered, has associated therewith a zero stop pawl 72 (Fig. 10) which is effective to break the associated differential latch when no key has been depressed as was pointed out hereinbefore. Since all of the keys are locked against operation from the time the control lever is moved to lock register position the drivers associated with the amount banks of keys will also have an idle movement similar to the drivers associated with the clerks' and transaction differential segments 242 for total taking operation.

As pointed out hereinbefore the machine is provided with an auditor's lock by which the grand total printing and resetting is controlled. The control lever is moved to each of the above referred to positions by means of a key inserted in a lock 893 (Fig. 75). An arcuate notched plate 887 is fixed to the inner side of the frame 11

(Fig. 57). The lock 893 is provided with a tubular bolt 892', having a locking portion 894 which is normally adapted to register with a series of notches 887' formed in plate 887. There is one notch 887' for each position of the control lever except the unlock clerks' position and the grand total position. Fixed to the plate 887 at the front thereof is a block 888.

The lock 893 is adapted to be operated in two different manners with two different keys in the following manner:

Referring to Figs. 65 and 66, it will be noted that the bolt 892' of the lock 893 has been provided with two peripheral grooves 890. These two grooves are alined and extend substantially 90° to the left (Fig. 65) of the two lower tumblers 890'. Therefore, if a key is provided for unlocking all of the tumblers 890' except the two associated with the grooves 890, the bolt of the lock may be rotated, but in only one direction and to the extent or limit of the peripheral grooves 890. Such a key is provided and placed in the hands of an authorized person such as the manager of the store. Consequently, the manager has a limited access to the lock 893 with the result that he can only move the locking portion 894 to the right as indicated by the arrow in Fig. 64. When the lock is used thus, it will be noted that the locking portion 894 thereof will abut against block 888 when the control lever has been brought to sub-total position. Therefore, it will be seen that it is not possible to bring the control lever to grand total position, wherein as pointed out hereinbefore, the totalizer may be printed from and reset to zero. However, if a proper key is inserted in the bolt 892' of the lock 893, viz, one capable of setting all of the plungers 890' in line with the outer surface of the bolt, it will permit the rotation of the said bolt 892' in either direction. Thus, a key of this type is entrusted to an auditor and he may remove the locking portion 894 from engagement with the plate 887 by a counterclockwise rotation of the bolt 892' with the result that the control lever may now be brought to grand total position as is clearly seen by the dash and dot position of the portion 894 in Fig. 64.

It will be noted that when an auditor's key is placed in the lock bolt 892' (Fig. 65) the breaking point between the tumblers and the revolving parts at the point 893' between sleeve 892a and the lock housing 893. Thus, if the bolt of the lock is rotated to the right at this time the tumblers 890' will be prevented from entering the grooves 890 by virtue of the sleeve 892a which it is seen will be engaged with the tumblers 890a and will move therewith. However, when the lock is operated by the manager's key the sleeve 892a will not move, being held by the two lower tumblers 890'.

In order to locate the different positions of adjustment of the control lever 180 (Fig. 75) in respect to the plate 887, control lever 180 is provided with a spring detent 889. Detent 889 is adapted to register with the notches 889' provided in the under concentric portion of plate 887. There is one notch 889' for each of the positions of the control lever and by this means the manager or auditor can readily aline the locking portion 894 with the notches 887'.

Now, when the control lever is moved to grand total position, by means of the auditor's key, shaft 185 will be given an additional rocking movement in a counterclockwise direction by the action of the cam portion provided at the lower end of slot 650' engaging stud 651' of segment 652' (Fig. 47). When shaft 185 is moved in this manner plate 186 (Fig. 78) will also be moved in the same direction to bring notch 189b into registering position with respect to projection 191 provided on pitman 181. During movement of the control lever from sub-total to grand total position shaft 660, however, will be held stationary since during this movement a second concentric portion 671c provided on cam edge 671 of control lever 180 will have moved into registering position with stud 672 of segment 674 (Fig. 75). When shaft 185 is moved upon movement of the control lever from sub-total to grand total position, portion 746' (Fig. 49) of the cam 746 will engage stud 747 on three-arm lever 744 thereby rocking the latter in a clockwise direction to engage pinion 742 (Fig. 4) with gears 738 and 739 to condition the resetting mechanism for operation. Now, when the reel is rotated to bring a totalizer to printing position and the motor release bar 43 is depressed, a printing impression will be effected from the selected totalizer after which resetting thereof and of the special counter associated therewith will be effected by the resetting mechanism in the manner described hereinbefore.

Figure 81:
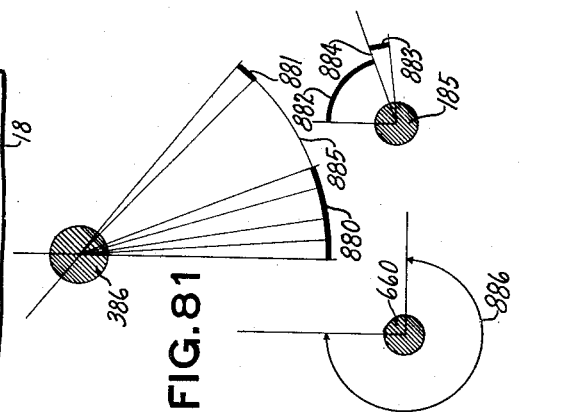
Fig. 81 is a diagrammatical view illustrating the relative movements of the control shafts during the movement of the control lever.

Fig. 81 illustrates diagrammatically the relative movements of shafts 185 and 660 during movement of the control lever 180 to its various positions of adjustment. The heavy portion 880 illustrates the movement of the control lever from reset consecutive counter position to lock register position while the heavy portion 881 illustrates the movement thereof from sub-total position to grand total position. The heavy portion 882 associated with shaft 185 illustrates the angular movement of shaft 185 during movement of the control lever from reset consecutive counter position, to lock register position, while the heavy portion 883 shows the angular movement of shaft 185 during movement of control lever 180 from sub-total to grand total position. The radial line 884 connecting the heavy portions 882 and 883 illustrates the dwell in cam slot 650' (Fig. 75) during which time motion is transmitted to shaft 660 by cam 671. The light line 885, shown in Fig. 81, illustrates the movement of control lever 180 from lock register position to sub-total position and light portion 886, shown in connection with shaft 660, illustrates the angular movement of shaft 660 during movement of the control lever from lock register position to sub-total position which is a distance equal to substantially 270°. Thus, it is clear that during movement of control lever 180 from reset consecutive counter to grand total position, shaft 185 is intermittently moved through an angle of substantially 90° while shaft 660 is moved through an angle of substantially 270°. During movement of the control lever from lock register to sub-total position, it is seen, is the only time at which motion is imparted to shaft 660.

A novel construction is shown in the machine for identifying the sub or grand totals which are printed upon the record strip. This identification protects the record to the extent that when the grand total symbol is printed, it is a proof that the corresponding totalizer is reset to zero. This construction will now be described. Referring to Figs. 33, 51, 61 and 62, it will be noted that a disc 4501 is keyed to each totalizer shaft 396 and is positioned adjacent the aforementioned type disc 450 which, it is pointed out, is located adjacent each special counter associated with each totalizer.

As was seen in the description of the resetting mechanism, each shaft 396 is adapted to be moved axially to the left (Fig. 51) and is then rotated clockwise (Fig. 52). It will be remembered that this movement does not disturb the setting of the totalizer wheels. This movement of shaft 396 takes place in the present machine before the printing mechanism has effected an imprint of the total standing on the totalizer wheels. Therefore, it will be clear that if a type 4501', as shown in Figs. 61 and 62 is provided on the disc 4501, it will be moved around to printing position by the aforesaid movement of the shaft 396 and when the printing mechanism is subsequently operated this type will also appear adjacent the printed total. By keying the disc 4501 to the shaft 396 in the manner shown in Figs. 61 and 62, a relative movement between the disc 4501 and the shaft 396 is permitted to allow for the axial movement of said shaft. It will, of course, be understood that when no resetting of the totalizers takes place, such as in the sub-total position of the control lever, the shaft 396 will remain stationary and thus the disc 4501 will not be moved. To identify this sort of total the disc 4501 is provided with another raised character 4502 which is normally printed for identifying a sub-total. This character in the present machine represents the letter S, as will be viewed in Fig. 61. The character designating a grand total, as will also be viewed in the above figures, represents the letter G. Thus, by the above arrangement a positive means is provided to distinguish the totals so that the presence of the letter G adjacent to any printed total is proof that the corresponding totalizer has been reset to zero.

It will also be remembered that when the control lever is moved to lock register position, the transmission line is still in normal position, but the cam shaft 430 (Fig. 46) provided in the reel, as well as the other moving parts therein are locked against operation. The keys are also locked against operation. The shoulder 876 (Fig. 78) of three-arm lever 873 is still in alignment with projection 870 of pitman 181 and therefore the machine will not be released for operation upon depression of motor bar. However, if by any chance the machine were accidentally operated when the parts are in this position several of the locked parts would be damaged. In order to insure against any such mishaps, mechanism is provided which compels rotation of the reel to release the machine for operation when the parts have been adjusted to this position. To this end, as will be seen in Figs. 49 and 50, a bell crank lever 900 is provided. Bell crank lever 900 is pivoted on 791 and is provided with an upper arm 901 having a projecting portion 902 which is adapted to engage in a notch 903 of plate 904 which plate is fixed to notched disc 795. The lower arm 905 of bell crank lever 900 is formed with an ear 906 which is adapted to engage the outer edge of cam plate 745. Intermediate the pivot 791 and ear 906 arm 905 is provided with a shoulder 907 which is adapted to engage arm 796 which arm it will be remembered is fixed to shaft 145. A spring 908 urges bell crank lever 900 in a clockwise direction. The edge of cam plate 745 is so constructed that during movement of the control lever from reset consecutive counter position to unlock clerks' keys position, ear 906 will ride on the concentric portion of cam plate 745. Upon movement of control lever 180 to lock register position, however, the cutaway portion 909 of cam plate 745 will register with ear 906 and permit spring 908 to rock bell crank lever 900 in a clockwise direction bringing nose portion 902 into notch 903 of disc 904. At the same time, shoulder 907 provided on bell crank lever 900 will move over the end of lever 796 and thereby prevent rocking of shaft 145 to release the machine for operation. It will also be remembered that during movement of the control lever from lock register position to sub-total position shaft 185 carrying cam plate 745 will not be moved. Movement of the control lever to this position simply causes the transmission line to be swung out of normal position. Thus, upon rotation of the reel to bring a selected totalizer to total printing position notch 903 of disc 904 will cam bell crank lever 900 in a counterclockwise direction removing the shoulder 907 thereof from engagement with arm 796. The nose portion 902 will then engage the concentric portion of disc 904 and ride thereon until the reel is restored to normal position, when the nose portion 902 will again be moved into notch 903 by spring 908. This condition also exists when the control lever is moved to grand total position, since it will be seen in Fig. 49, that the cutaway portion 909 extends to the end part of cam 745 which allows for the further movement of cam 745 when the control lever is moved from sub-total to grand total position. From the above it is clear that an effective interlocking mechanism is provided which prevents any mis-operations of the machine by making it necessary to rotate the reel to properly position a totalizer into printing position before the machine can be released for operation.

*General Summary of Operations*

The nature of the present invention is such that in order to make the foregoing description as clear as possible it was necessary to state the structure and operation of each feature considerably in detail. A complete restatement of the operation of the present invention is therefore believed to be unnecessary, however, a résumé of the general operation of the machine will not be given to coordinate the operation and functions of the various parts which have been described in detail.

Let us assume that all of the parts of the machine are in normal position, and that the control lever 180 (Figs. 1 and 79) is in open drawer position, and that the A clerk has just made a sale amounting to $1.25. In order to operate the machine, the A clerk will first insert his key into his lock 214 (Figs. 27 to 29) and then rotate the bolt to bring the projection 219 of the bolt out of engagement with the stud 218 attached to that key. He then will depress the 5-key in the penny bank, the 2-key in the dime bank, the 1-key in the dollar bank, the A-key and the cash key, and then the motor bar 43. The machine is now released for operation and the motor will operate the same to enter this item in the A totalizer, the cash totalizer, and the grand totalizer, and record the same upon the detail record strip. When the 5-key in the penny bank is depressed, the segmental cam plate 58 (Figs. 10, 17 and 30) associated with that bank of keys will be cammed upwardly thus rocking the zero stop pawl 72 in a clockwise direction about its pivot 73. At the same time, the associated detent plate 57 will also be cammed upwardly until the pin 53 moves past the detent 57' associated therewith when spring 68 will move the detent plate downwardly and hold the key in depressed position. If the operator discovers that he has made a mistake and that he should have depressed another key in that bank, upon depression of the proper key, detent plate 57 will again be moved upwardly, with the result that the previously depressed key will be released and its associated spring 52 will restore it to normal, and the second key will be held in depressed position by its associated detent 57'.

When zero stop pawl 72 (Figs. 8, 14 and 17) is rocked in the manner aforesaid, its arm 74 will be moved away from its associated differential segment 242. At the same time, the arm 76 of pawl 72 will rock the arm 78 and the rod 79 counterclockwise direction carrying all of the arms 78 associated with the amount banks of keys downwardly. Thereupon the lever 80 will rock the release arm 83 counterclockwise thus disengaging the projection 84 from the arm 85 of the detent 86 pinned to shaft 123. Therefore, it is seen that when the 2-key in the dime bank and the 1-key in the dollar bank are depressed, no further movement will be imparted to rod 79. Now, upon depression of the A-key in the clerks' bank, the lever 99 is rocked clockwise (Fig. 16) to rock the release arm 104 counterclockwise to move the projection 105 thereof away from the detent 107 (Fig. 14) which also is fixed to shaft 123. The detent plate 57 associated with this bank of keys will hold the A-key in depressed position.

Now, upon depression of the cash key (Figs. 19 and 20) the cam plate 58 associated therewith will be rocked upwardly thereby rocking its associated bell crank lever 88 clockwise to rock release arm 93 counterclockwise to move the projection 94 away from the detent 96 which also is fixed to shaft 123. It is now seen that release arms 83, 93 and 104 are moved out of engagement with their associated detents 86, 96 and 107. Referring to Figs. 23 to 26, it will be remembered that pinned to the shaft 123 is an arm 124 with a slot 125 receiving a stud 126 on a link 127 with a foot normally engaging a roller 133 on the plate 43' fixed to a motor bar 43. Now, upon depression of motor bar 43, roller 133 will be moved out of engagement with foot 134 and spring 135 will urge link 127 downwardly and rock the shaft 123 counterclockwise.

When link 127 is moved downwardly by its spring 135 the latch 138 will be disengaged from arm 136 and spring 147 will urge the link 141 upwardly thereby rocking the shaft 145 clockwise to move the finger 30 away from the motor switch control mechanism and the motor switch will be closed and the machine will be operated. It will be also remembered that link 127 carries the stud 157, and immediately upon release of arm 136 from latch 138, spring 147 will urge link 141 upwardly thereby rocking shaft 137 and arm 136 counterclockwise causing arm 136 to engage stud 157 and thus move link 127 upwardly slightly beyond normal position. When this occurs, the spring 150 will restore the motor bar 43 to normal position bringing the roller 133 into alinement with the end of foot 134. When shaft 137 is rocked in a counterclockwise direction by spring 147 the arms 154 fixed to shaft 137, through the connections shown in Figs. 30 and 31, will rock their associated bell crank levers 64 counterclockwise causing the detents 62 to further embrace the key pins 53. At the same time the flat surfaces 156 will be brought under the related pins 53 of all of the undepressed keys.

Near the end of an operation of the machine, the stud 163 (Figs. 10 and 23) on the gear 162 will through the lever 165 lower the link 141 which will rock shaft 137 clockwise substantially 20° beyond its normal position. When this occurs, the arm 136 will cam latch 138 downwardly against the tension of its spring 169 until clearing the end thereof, when spring 169 will restore latch 138 to normal position. When shaft 137 is rocked in this manner, all of the detents 57 through the connections shown in Figs. 30 and 31 will be moved upwardly beyond normal positions to permit the key springs 51 to restore the latter to normal positions. When shaft 123 is rocked counterclockwise by link 127, the projection 177 thereon will move into engagement with pawl 175 to prevent movement of shaft 20, until link 127 has been moved upwardly by spring 147. It also follows that when the machine is operated, pawl 175 will be moved beneath projection 177 to prevent link 127 to be rocked downwardly during movement of rotation shaft 20. When the arm 30 is moved away from the motor switch control mechanism, the motor switch will be closed and the electric motor 21 will drive the main shaft 20 through one complete revolution.

As shown in Figs. 3, 4, 8 and 10 a cam 230 and its follower 231 through the segments 238 and 239, the shaft 240, the driving segments 241 and pawls 245, drive the differential segments 242. Cam 230 and its follower 231 are so designed that the segments 241 will first, be rocked downwardly and then, restored to normal position at each operation of the machine. If no key in the bank is depressed, the zero stop pawl 72 will disengage the pawl 245 from segment 241 and the differential segment 242 will stop in zero position. When a key is depressed, zero stop pawl 72 is rocked clockwise and the segment 241 then rocks the differential segment 242 downwardly until the end of pawl 245 strikes a depressed key, which disengages said pawl from the segment 241 and the differential segment stops in such position. Thus, it is seen that when the 5-key in the penny bank is depressed the differential segment 242 is set in the 5 position. In a like manner, the differential segments 242, associated with the dime and dollar banks of keys respectively, will be actuated until stopped by the keys depressed in those banks.

The differential segments 242 through the segments 262, gears 263, shaft 264, side frames 265, 266 and 1014, shafts 270, and pinions 271 (Fig. 2) transmit motion from the amount differential segments 242 to the various mechanisms of the machine.

As shown in Figs. 3, 4, 11 and 12, the driving segments 241' for actuating the differential segments 242 associated with the clerks' and transaction banks are actuated in a manner similar to the amount differentials as previously described.

The mechanism for selecting and operating the totalizers will now be reviewed. When the keys previously mentioned are depressed motion of the differential segments 242 associated with the pennies, dimes and dollars banks of keys will be transmitted to the actuating gears 275 which are pivotally mounted on the sleeve 389 provided on shaft 386 in axial alinement with shaft 240 (Figs. 3 and 57). The movement of the differential segment 242 associated with the clerks' bank of keys will be transmitted by shaft 268 to selector plate 283, actuating gear 287, and selector plate 307 to adjust these members to a position corresponding to the key depressed, which in this case is the A-key. Motion is also transmitted from the differential segment 242 associated with the transaction bank of keys through shaft 269, to selector plate 300, actuating gear 304 and selector plate 290. These members will also be positioned an amount corresponding with the distance travelled by the transaction differential segment 242 from normal position until stopped by the cash key. During adjustment of the actuating gears 275 in this manner the totalizers are held out of engagement therewith. Operation of the selected totalizers by the actuating gears 275 takes place during the return movement of these gears. The mechanism for selecting and engaging the totalizers with actuating gears will now be briefly summarized.

Referring to Figs. 33 to 40, it will be recalled that the six clerks' totalizers 372, A, B, D, E, H and K; the four transaction totalizers 373 representing cash, received on account, paid out, and charge transactions respectively; and the grand totalizer 374 are rockably supported in the totalizer reel 375 held stationary by suitable locking mechanism. Upon an operation of the machine, when the A-key is depressed, selector plate 283 will be moved substantially 3° to bring the projection 398 thereon associated with the A-totalizer beneath the ear 399 on the rock arm 400. The stud 404 on the lever 402 engages the notch 405 in the operating plate 406 and the cam slot 407 receives the stud 408 the ends of the rock arm 409 which has the closed cam slot 412 to receive the end of the shaft 496 supporting the A-totalizer.

As shown in Fig. 35, operating plate 406 carries the studs 432 and 433 engaged by the cam 431 and its follower 431' respectively. At substantially the same time that selector plate 283 is positioned, the selector plate 300 is moved through substantially 3° to bring the projection 398' beneath ear 399' of rock arm 400' associated with the cash totalizer. There are a similar series of connections 402' and 409' leading from rock arm 400' to the cash totalizer shaft 396 as are provided for the A-totalizer just described.

There are a similar series of connections provided for the grand totalizer except that no projection 398 is provided on either of the selecting plates 283 or 300 for the grand totalizer. Instead of stud 425 is provided on the end plate 382 for engaging the ear formed on the rock arm associated with that totalizer. Thus, it is seen that upon rotation of shaft 430, the cam 431 and its follower 431' will rock plate 406 counterclockwise thereby causing arms 409, 409' and 413 to engage their respective totalizers with the actuating gears 275. These totalizers will remain in mesh with the actuating gears 275 until the latter are fully restored to normal position. When gears 275 have thus been restored to normal positions the plate 406 is rocked in the reverse direction, which through the connections just described disengages the totalizers from their actuating gears 275.

In total printing operations it will be recalled that it is necessary to rotate the totalizer reel 375 to bring the desired totalizer into position to effect either total or sub-total printing therefrom. First the control lever 180 is moved to either sub-total or total position, depending upon whether a sub-total or a total is wanted, after which the totalizer reel is moved by means of the thumb wheel 721 to bring the desired totalizer opposite the platen 493, after which the machine is released by depression of the motor bar 43, and the platen 493, by the mechanism shown in Fig. 63, is moved against the selected totalizer 377 to print either the total or the sub-total therefrom.

To prevent movement of the reel 375 during the taking of either a sub-total or a total from a selected totalizer therein, or to prevent operation of the machine when a totalizer has not been properly brought into its printing position, the bell crank lever 790 (Figs. 49, 50 and 57) is adapted to engage any one of a plurality of notches 794 in the discs 795 of the sleeve 802. It will be recalled that the arm 30 (Figs. 4 and 23), which is associated with the motor switch control mechanism, is secured to the shaft 145 and that the arm 796 is also secured to this shaft. The bell crank 790 is adapted to be moved into engagement with this arm 796 and therefore it is obvious that when the reel is rotated and the arm 792 of the lever 790 rests upon the high portion between the notches of the disc 795, the lever 790 will be rocked clockwise, thus bringing its lower end over the arm 796 and preventing operation of the shaft 145, which is necessary to release the machine.

From the above it also follows that when the machine is released for operation and the shaft 145 is rocked counterclockwise, the arm 796 will be brought into engagement with the arm 798, thus preventing rotation of the reel, this mechanism forming an effective interlock to prevent misoperation of the associated parts.

The control mechanism, or single lock control, has been described in full detail near the end of this specification and it is therefore felt that it is not necessary to give any further discussion in connection with this mechanism at this time.

While the form of mechanism herein shown and described is admirably adapted to fulfill the objects primarily stated, it is to be understood that it is not intended to confine the invention to the one form or embodiment herein disclosed, for it is susceptible of embodiment in various forms, all coming within the scope of the claims which follow.

What is claimed is:

1. In a machine of the class described, a main operating mechanism, locking means therefor, a plurality of groups of keys, a shaft, a plurality of pivoted members mounted on said shaft, one for each group of keys, a second shaft having fixed thereto a plurality of detents, one engaging each of said pivoted members, means associated with each group of keys for rocking its pivoted member out of engagement with its detent upon depression of a key in that group, a slotted arm fixed to one end of said last mentioned shaft, a motor bar, spring-urged means engaging said bar, a control shaft, a latch for retaining said control shaft in ineffective position, a projection on said spring-urged means engaging in the slot of said slotted arm and engaging said latch, said parts being so constructed and arranged that upon depression of a key in each group and of the motor bar, said last mentioned shaft will be rocked by said spring-urged member thereby releasing said latch to release the motor control mechanism for operation.

2. In a machine of the class described, a normally inoperative operating mechanism, a plurality of groups of keys of different classes operable in a predetermined sequence to render the operating mechanism operable, a shaft, release means controlled by means on the shaft to release the operating mechanism, a plurality of detents fixed to said shaft, one for each class of keys, means operated upon the depression of a key of each class to release its associated detent, spring-urged means operable after the detents have been released and operable to rock said shaft in one direction to allow the release means to operate to release the operating means for operation, manipulative means, means operated by said manipulative means for moving said shaft in the opposite direction from which it is moved by said spring-urged means thereby conditioning the release mechanism to be operated independently of said keys.

3. In a machine of the class described, the combination with a normally inoperative operating mechanism, latch means therefor, a plurality of groups of keys operable in a predetermined sequence, a shaft, a plurality of two-arm detents, one for each group of keys fixed to said shaft, means operated by a key in each group to release its related detent, means including a spring-urged means operable to rock said shaft in one direction after a key in each group has been depressed, means on the spring-urged means to release said latch, when the spring-urged means is operated to thereby permit operation of the main operating mechanism, manipulative means, means operated by said manipulative means for rocking said shaft in the reverse direction and causing one of the arms of each of said detents to move into engagement with said first mentioned means to lock all of the keys against operation and conditioning said spring-urged means to release said latch to permit operation of the main operating mechanism independently of said keys.

4. In a machine of the class described, a normally inoperative operating mechanism, a plurality of groups of keys operable in a predetermined sequence to release said operating mechanism for operation comprising a shaft, a plurality of detents, one for each group of keys, fixed to said shaft, a spring-urged member having a projection thereon, a forked arm fixed to said shaft which receives said projection; a second shaft, a depending arm fixed to said second shaft, a latch normally engaging said depending arm; a motor bar controlling said spring-urged means, said parts being so constructed and arranged that upon depression of a key in each group followed by the depression of the motor bar, said spring-urged means will rock said first mentioned shaft and will release said latch; a spring-urged member connected to said second mentioned shaft, said last mentioned spring-urged member being effective when said latch is released to release said main operating mechanism for operation; additional means carried by said first mentioned spring-urged member adapted to be engaged by said depending arm on said second mentioned shaft when said second mentioned spring-urged member is operated, for restoring said first mentioned spring-urged member to normal position.

5. In a machine of the class described, a normally inoperative mechanism, a plurality of groups of keys, a shaft provided with a plurality of detents, one for each group of keys; a second shaft, a depending arm fixed thereto; a third shaft having a latch member pivoted thereon adapted to engage said depending arm; a release key, a spring-urged member controlled thereby; a second spring-urged member adapted to rock said second mentioned shaft to release the main operating mechanism for operation; a manipulative member having a plurality of positions of adjustment, said parts being so constructed and arranged that upon operation of a key in each group and of said release key, said first mentioned spring-urged member will release said latch thereby permitting said second mentioned spring-urged member to rock said second mentioned shaft and to release the main operating mechanism for operation, said manipulative member being movable to a plurality of positions of adjustment and when moved to one of its positions of adjustment, it will lock all keys against operation and condition the parts so that upon depression of said release key, said first mentioned spring-urged member will release said latch to permit said second mentioned spring-urged member to release the main operating mechanism for operation, independently of said keys.

6. In a machine of the class described, the combination with a normally inoperative operating mechanism, a plurality of groups of keys, a release key, a shaft having a plurality of detents fixed thereto, one for each group of keys, a manipulative member having a plurality of positions of adjustment, a member fixed to said shaft, a spring-urged member having connections with said last mentioned member, said parts being so constructed and arranged that upon the depression of a key in each group and of the release key, said shaft will be rocked in one direction and the spring-urged member will release the main operating mechanism for operation, means operated by said manipulative member when moved to one of its positions of adjustment for rocking said shaft in the reverse direction, thereby locking all of the keys against operation and conditioning the parts so that upon depression of said release key, said spring-urged member will become effective to release the machine for operation.

7. In a machine of the class described, a bank of Clerks keys, a plurality of banks of amount keys, and a bank of special Transaction keys; means requiring the depression of an amount key before a Clerks key can be depressed comprising a shaft, a bail mounted on said shaft having fixed thereto a locking detent, a rockable member operable by a Clerks key, said detent normally preventing operation of said rockable member, a second shaft, a plurality of arms fixed thereto, one for each bank of amount keys, a member fixed to said last mentioned shaft having means adapted to cooperate with said bail upon the depression of a key in any one of the amount banks to disengage said detent from said rockable member, and means operable by one of said Transaction keys to actuate the bail to release the Clerks keys in an operation in which no amount keys are to be depressed.

8. In a machine of the class described, a plurality of amount keys, a plurality of Clerks keys, and a plurality of Transaction keys, an interlocking mechanism requiring the depression of an amount key before a Clerks key can be depressed for item entering operations and the depression of a No Sale key before a Clerks key can be depressed for No Sale transactions comprising a bail, a detent fixed to said bail, a rockable member operable by the depression of a Clerks key normally engaged by said detent and locked against operation thereby, and means operable upon the depression of an amount key to disengage said detent from said rockable member, said means being also operated by a No Sale key when the latter is depressed.

9. In a machine of the class described, a plurality of groups of depressible keys, a main operating mechanism, latch means for normally locking said main operating mechanism, a rockable shaft, a plurality of detents, one for each group of keys, fixed to said shaft, a locking member cooperating with each of said detents for preventing said shaft from rocking in one direction, means associated with each group of keys for rocking said locking members out of engagement with said detents, a motor bar, a spring-urged member controlled by said motor bar, means carried by said spring-urged member engaging an arm fixed to one end of said rockable shaft and also engaging said latch, said parts being so constructed and arranged that when a key in each group has been depressed to remove said locking members from engagement with said detents, followed by an operation of said motor bar, said spring-urged member will rock said shaft in one direction and will release the latch normally locking said main operating mechanism against operation, a control member movable to a plurality of positions of adjustment, means operated by said control member when moved to certain of its positions of adjustment for rocking said rockable shaft in the reverse direction from that in which it is rocked by said spring-urged member, thereby causing said detents to engage their cooperating locking members to lock all of the keys against operation and conditioning said spring-urged member to release the machine independently of said keys, an additional locking means for the main operating mechanism rendered effective by the control member when moved to said certain of its positions, a totalizer reel, and means on said reel for releasing the additional locking means upon movement of the reel so that when the motor bar is depressed after the reel has been positioned, the machine will be released for operation.

10. In a machine of the class described, the combination of a control member, a plurality of groups of keys, a shaft, means operated by said keys for releasing said shaft for operation, a second shaft, a plate carried by said second shaft and having a plurality of notches therein, a pitman attached to said first mentioned shaft and having projections thereon adapted to register with said notches, means operated by said control member for bringing any one of said notches to registering position with respect to said projections, and a machine release bar, said parts being so constructed that upon depression of said machine release bar and of a key in each of said groups, said first mentioned shaft will be actuated to release said machine for operation, when one of said notches in said plate registers with a projection on said pitman, said plate preventing actuation of said shaft when said notches are out of registering position with respect to said projections on said pitman.

11. In a machine of the class described, the combination of a plurality of groups of keys, a shaft normally locked by connections to said keys, a control member, and means controlled by said control member when the control member is moved to certain of its positions of adjustment including an element operable to permit movement of said shaft in one direction to release the machine for operation when a key in each of said groups has been depressed, said element being shifted when the control member is moved to another of its positions of adjustment, to rock said shaft in the reverse direction, to condition the machine for operation independently of said keys.

12. In a machine of the class described, the combination of a control member movable to a plurality of positions of adjustment, a main operating mechanism, a shaft actuated by said control member when moved to certain positions of adjustment, a second shaft, a cam provided on said last mentioned shaft, a locking pawl pivoted on said first mentioned shaft engaging means for locking the main operating mechanism against operation, means operated by said control member when moved to one of its positions of adjustment for rotating said second mentioned shaft to disengage said cam from said locking pawl, and means for urging said pawl out of engagement with said first mentioned means to release the first mentioned means for operation.

13. In a machine of the class described, the combination of a series of clerks' keys, a series of individual locks for said keys mounted on a common supporting means for simultaneous movement to effective or ineffective position relative to said keys, means connected to the supporting means and movable therewith, a control member, a shaft actuated thereby, cams provided on said shaft for engaging a lever pivoted on a second shaft, a detent provided on said lever and cooperable with the means connected to the supporting means for retaining said supporting means in effective or ineffective position, and means operated by said control member when moved to one of its positions of adjustment for moving said detent to ineffective position to permit adjustment of said supporting means for the individual locks.

14. In a machine of the class described, the combination of a main operating mechanism, a control member, a shaft, a plurality of differentially movable members normally occupying a zero position and actuated by said main operating mechanism, a plurality of arms mounted on said shaft adapted to engage said differentially movable members to prevent movement thereof from zero position upon operation of said main operating mechanism, a second shaft, and means provided on said second shaft, and actuated by said control member for moving said arms to effective or ineffective positions.

15. In a machine of the class described the combination of a control lever movable to a plurality of positions of adjustment for controlling the different operations of said machine, a lock mounted on said lever, a plate adjacent said control lever to cooperate with said lock, a block on said plate and a projection on said lock for preventing adjustment of said lever to certain of its positions, a plurality of keys for said lock, and means in said lock, operable when said lock is operated by one of said keys, to allow only certain positions of adjustment to said lever as determined by the block on the plate, and operable when said lock is operated by another key to allow said control lever to be moved to any of its positions of adjustment.

16. In a machine of the class described, the combination of a main operating mechanism; a plurality of groups of keys for controlling the release of said main operating mechanism; a shaft having a series of detents fixed thereto; a series of obstructions cooperable with the detents to prevent the operation of the shaft and the release of the main operating mechanism; means operated by the keys in each group for moving one of said obstructions from its detent; and preventing means included in one of said removing means for preventing the operation of a certain key in another group when any of the keys in the group controlling said one removing means has been operated, said preventing means including a blocking means which is moved to blocking position when said one removing means is operated to remove its obstruction, said blocking means cooperating with a slidable element which is movable only by said certain key whereby said certain key cannot be operated after said one removing means has been operated by any of its group of keys.

17. In a machine of the class described, the combination of a control lever movable to a plurality of positions of adjustment for controlling different operations of the machine; a lock differentially operated by two keys for controlling the extent of movement of said lever, said lock comprising a casing fastened to said lever, a rotatable bolt in said casing and having a locking projection extending therefrom, a plurality of spring pressed tumblers of various lengths for locking said bolt to said casing, said bolt having sectional grooves therein in alignment with certain of said tumblers, other of said tumblers being operable by one of said keys to release the bolt for limited movement to the extent and limit of the grooves, and all the tumblers being operable by the other key to free the bolt for complete rotation; and a plate adjacent the control lever and having control means thereon cooperable with the projection on the bolt to control the extent of movement of the lever, said projection and control means being cooperable to limit the movement of the lever when the bolt is freed for limited movement and said projection being freed from control by the control means on the plate when the bolt is released for complete rotation whereby the control lever can be moved to any of its positions of adjustment.

18. In a machine of the class described, the combination of a plurality of groups of keys, a shaft normally locked by connections to said keys, means coupled to said shaft, a control member, and control means actuated thereby and cooperable with the means coupled to said shaft, said control means, when said control member is in certain of its adjusted positions, having means thereon permitting the shaft and the member coupled thereto to move in one direction to release the machine for operation when a key in each of said groups has been depressed, said control means, when said control member is in another of its adjusted positions, having means thereon engaging the means coupled to the shaft to move the shaft and the means coupled thereto in a reverse direction to condition the machine for operation independently of said keys.

19. In a machine of the class described, a series of keys, a series of individual locks for said keys, a shiftable supporting means common to all of said locks and shiftable to move the locks to effective and ineffective positions relative to said keys, means to retain the supporting means in its shifted positions, and means to release the retaining means so that the supporting means may be shifted.

20. In a machine of the class described, the combination of a series of keys; a series of individual locks for said keys; a support upon which said locks are mounted; resilient means urging said support to a position where said locks are effective to control the operation of their keys; said support being movable to a position where said locks are ineffective to control the operation of their keys; means to lock the support in the positions where the locks are effective or ineffective; a mode of operation lever settable to a plurality of positions to control machine operations; and means operated by the mode of operation lever for releasing the lock for the support when the mode of operation lever is set to one of its positions, whereupon the support can be operated to move the individual locks to effective or ineffective position.

21. In a machine of the class described, the combination of a mode of operation lever settable to a plurality of positions, a motor bar, a manipulative device operable to latch the motor bar in depressed position when said mode of operation lever is in certain of its positions, and means actuated by the mode of operation lever, when it is moved to other of its positions, for cooperating with the latching means to release the motor bar if it has been latched and to prevent the latching of the motor bar when the lever is in said other position.

22. In a machine of the class described, the combination of a bank of keys; a series of individually operable locks, one for each of said keys, and each lock cooperable with its related key in the bank when the lock is in its effective position to control whether the key will be locked or free for operation; means for simultaneously moving all of the individually operable locks relative to said keys to ineffective positions whereby any of the keys may be operated independently of the control of the locks; and means to retain the locks in their effective or ineffective positions.

23. In a machine of the class described, a key; a lock movable to a plurality of positions relative to said key, said key being locked or free for operation according to the locked or unlocked condition of the lock while the lock is in one of said positions and said key being free for operation at all times irrespective of the locked or unlocked condition of the lock while the lock is in another of said positions; and shiftable means for supporting said lock for movement relative to said key.

CHARLES W. GREEN.